United States Patent [19]
Davis et al.

[11] Patent Number: 5,812,534
[45] Date of Patent: Sep. 22, 1998

[54] VOICE OVER DATA CONFERENCING FOR A COMPUTER-BASED PERSONAL COMMUNICATIONS SYSTEM

[75] Inventors: Jeffrey P. Davis, Ham Lake; Harinarayana Arimilli, Coon Rapids; Raghu N. Sharma, North Oaks, all of Minn.

[73] Assignee: Multi-Tech Systems, Inc., Mounds View, Minn.

[21] Appl. No.: 699,138

[22] Filed: Aug. 16, 1996

Related U.S. Application Data

[63] Continuation of Ser. No. 349,505, Dec. 2, 1994, which is a continuation-in-part of Ser. No. 2,467, Jan. 8, 1993, Pat. No. 5,452,289.

[51] Int. Cl.$^6$ ........................................................ H04J 3/16
[52] U.S. Cl. ........................... 370/260; 370/468; 370/537
[58] Field of Search .................................. 370/62, 79–82, 370/94.2, 112, 110.1, 85.6, 94.1, 476, 433, 435, 434, 468, 470, 471, 472, 535, 537, 542, 260; 375/220, 222; 379/202, 93, 96, 97

[56] References Cited

U.S. PATENT DOCUMENTS

| | | | |
|---|---|---|---|
| Re. 34,034 | 8/1992 | O'Sullivan | 379/59 |
| 3,304,372 | 2/1967 | Filipowsky et al. | 179/2 |

(List continued on next page.)

FOREIGN PATENT DOCUMENTS

| | | |
|---|---|---|
| 0 650 286 A2 | 4/1974 | European Pat. Off. . |
| 0 429 054 A3 | 5/1991 | European Pat. Off. . |
| 0 443 548 A3 | 8/1991 | European Pat. Off. . |
| 488865A2 | 6/1992 | European Pat. Off. . |
| 0 510 411 A3 | 10/1992 | European Pat. Off. . |
| 0 526 104 A2 | 2/1993 | European Pat. Off. . |
| 0 581 528 A1 | 2/1994 | European Pat. Off. . |
| 0 582 537 A2 | 2/1994 | European Pat. Off. . |
| 0 614 305 A3 | 9/1994 | European Pat. Off. . |
| 3504064 | 8/1986 | Germany . |
| 3630469 | 3/1988 | Germany . |
| 3409532 | 4/1989 | Germany . |
| 63-054052 | 8/1988 | Japan . |
| 193489 | 7/1990 | Japan . |
| 257748 | 10/1990 | Japan . |
| 3162052 | 7/1991 | Japan . |
| 2210237 | 1/1989 | United Kingdom . |
| 2 260 670 | 4/1993 | United Kingdom . |
| 2 268 663 | 1/1994 | United Kingdom . |
| WO 91/07044 | 5/1991 | WIPO . |
| WO 92/06550 | 4/1992 | WIPO . |
| WO 92/20038 | 11/1992 | WIPO . |
| WO 93/11643 | 6/1993 | WIPO . |
| WO 93/22869 | 11/1993 | WIPO . |
| WO 94/26056 | 11/1994 | WIPO . |

OTHER PUBLICATIONS

"Video Calls Use Basic Phone Lines", Mitch Radcliffe, *MacWeek*, (Aug. 3, 1992).
"Radish System Lets Phone Users Send Voice, Data Simultaneously", *PC Week*, 9, 19, p. 53, (May 11, 1992).

(List continued on next page.)

*Primary Examiner*—Chau Nguyen
*Attorney, Agent, or Firm*—Schwegman, Lundberg, Woessner & Kluth, P.A.

[57] ABSTRACT

A personal communications system enables the operator to simultaneously transmit voice and data communication to a remote site. The personal communications system is equipped with two telephone line interfaces to allow connection over a communications link between two remote sites. The personal communications system incorporates advanced priority statistical multiplexing of non-time-critical data with time-critical data over the communications link to increase channel throughput without a reduction in quality of the time-critical data. The personal communications system may be networked in different topological configurations to enable conferencing in a variety of time-critical and non-time-critical communications.

18 Claims, 44 Drawing Sheets

Microfiche Appendix Included
(1 Microfiche, 92 Pages)

U.S. PATENT DOCUMENTS

| | | | |
|---|---|---|---|
| 3,789,165 | 1/1974 | Campanella et al. | 179/170 |
| 3,904,830 | 9/1975 | Every, Sr. et al. | 179/18 |
| 3,973,081 | 8/1976 | Hutchins | 179/1 SA |
| 3,997,732 | 12/1976 | Every, Sr. et al. | 179/18 |
| 4,100,377 | 7/1978 | Flanagan | 179/15 |
| 4,107,471 | 8/1978 | Reed | 179/15 |
| 4,205,202 | 5/1980 | Kahn | 370/81 |
| 4,284,850 | 8/1981 | Clingenpeel | 370/81 |
| 4,354,273 | 10/1982 | Araseki et al. | 375/27 |
| 4,377,860 | 3/1983 | Godbole | 370/84 |
| 4,403,322 | 9/1983 | Kato et al. . | |
| 4,425,661 | 1/1984 | Moses et al. | 375/1 |
| 4,445,213 | 4/1984 | Baugh et al. | 370/94 |
| 4,476,559 | 10/1984 | Brolin et al. . | |
| 4,479,195 | 10/1984 | Herr et al. | 364/900 |
| 4,479,213 | 10/1984 | Galand et al. . | |
| 4,495,620 | 1/1985 | Steele et al. . | |
| 4,500,987 | 2/1985 | Hasegawa | 370/60 |
| 4,524,244 | 6/1985 | Faggin et al. | 179/2 |
| 4,534,024 | 8/1985 | Maxemchuk et al. | 370/85 |
| 4,546,212 | 10/1985 | Crowder, Sr. | 179/2 |
| 4,578,537 | 3/1986 | Faggin et al. | 179/2 |
| 4,587,651 | 5/1986 | Nelson et al. | 370/88 |
| 4,593,389 | 6/1986 | Wurzberg et al. . | |
| 4,598,397 | 7/1986 | Nelson et al. . | |
| 4,609,788 | 9/1986 | Miller et al. | 179/170.6 |
| 4,610,022 | 9/1986 | Kitayama et al. | 381/36 |
| 4,629,829 | 12/1986 | Puhl et al. | 379/58 |
| 4,652,703 | 3/1987 | Lu et al. | 379/339 |
| 4,660,218 | 4/1987 | Hashimoto | 379/93 |
| 4,670,874 | 6/1987 | Sato et al. | 370/110.1 |
| 4,697,281 | 9/1987 | O'Sullivan | 379/59 |
| 4,700,341 | 10/1987 | Huang | 370/82 |
| 4,707,831 | 11/1987 | Weir et al. | 370/94 |
| 4,718,082 | 1/1988 | Parker et al. | 379/98 |
| 4,740,963 | 4/1988 | Eckley . | |
| 4,750,169 | 6/1988 | Carse et al. | 370/109 |
| 4,751,510 | 6/1988 | De Saint Michel et al. | 340/825.07 |
| 4,751,736 | 6/1988 | Gupta et al. | 381/31 |
| 4,757,527 | 7/1988 | Beniston et al. | 379/410 |
| 4,764,955 | 8/1988 | Galand et al. | 379/411 |
| 4,794,595 | 12/1988 | Ohyama . | |
| 4,807,250 | 2/1989 | Tanaka | 375/28 |
| 4,809,271 | 2/1989 | Kondo et al. | 370/110.1 |
| 4,813,040 | 3/1989 | Futato . | |
| 4,827,085 | 5/1989 | Yaniv et al. | 178/18 |
| 4,835,765 | 5/1989 | Bergmans et al. . | |
| 4,839,802 | 6/1989 | Wonak et al. | 364/200 |
| 4,845,746 | 7/1989 | Li | 379/411 |
| 4,847,900 | 7/1989 | Wakim | 379/424 |
| 4,862,449 | 8/1989 | Hoefkens et al. . | |
| 4,864,559 | 9/1989 | Perlman . | |
| 4,866,732 | 9/1989 | Carey et al. | 375/1 |
| 4,873,715 | 10/1989 | Shibata | 379/93 |
| 4,887,265 | 12/1989 | Felix | 370/94.1 |
| 4,890,282 | 12/1989 | Lambert et al. | 370/79 |
| 4,890,316 | 12/1989 | Walsh et al. | 379/98 |
| 4,901,333 | 2/1990 | Hodgkiss . | |
| 4,905,282 | 2/1990 | McGlynn et al. | 380/48 |
| 4,912,756 | 3/1990 | Hop | 379/60 |
| 4,912,758 | 3/1990 | Arbel | 379/388 |
| 4,914,650 | 4/1990 | Sriram | 370/60 |
| 4,926,448 | 5/1990 | Kraul et al. | 375/121 |
| 4,932,048 | 6/1990 | Kenmochi et al. | 379/67 |
| 4,935,954 | 6/1990 | Thompson et al. | 379/89 |
| 4,942,569 | 7/1990 | Maeno | 370/60 |
| 4,953,210 | 8/1990 | McGlynn et al. | 380/48 |
| 4,965,789 | 10/1990 | Bottau et al. . | |
| 4,972,457 | 11/1990 | O'Sullivan | 379/59 |
| 4,972,462 | 11/1990 | Shibata | 379/89 |
| 4,972,483 | 11/1990 | Carey | 381/31 |
| 4,977,591 | 12/1990 | Chen et al. | 379/410 |
| 4,991,169 | 2/1991 | Davis et al. | 370/77 |
| 4,995,059 | 2/1991 | Ishikawa . | |
| 4,998,241 | 3/1991 | Brox et al. . | |
| 5,001,710 | 3/1991 | Gawrys et al. . | |
| 5,001,745 | 3/1991 | Pollock | 379/96 |
| 5,005,183 | 4/1991 | Carey et al. . | |
| 5,008,901 | 4/1991 | Wallach et al. . | |
| 5,008,926 | 4/1991 | Misholi | 379/89 |
| 5,014,232 | 5/1991 | André | 364/724 |
| 5,020,058 | 5/1991 | Holden et al. . | |
| 5,025,443 | 6/1991 | Gupta . | |
| 5,036,513 | 7/1991 | Greenblatt . | |
| 5,044,010 | 8/1991 | Frenkiel et al. | 379/61 |
| 5,046,188 | 9/1991 | Molnar | 379/94 |
| 5,051,720 | 9/1991 | Kittirutsunetorn | 340/310 |
| 5,062,133 | 10/1991 | Melrose | 379/94 |
| 5,065,395 | 11/1991 | Shenoi et al. . | |
| 5,065,425 | 11/1991 | Lecomte et al. | 379/93 |
| 5,081,647 | 1/1992 | Bremer . | |
| 5,083,310 | 1/1992 | Drory | 381/30 |
| 5,086,471 | 2/1992 | Tanaka et al. | 381/36 |
| 5,099,472 | 3/1992 | Townsend et al. . | |
| 5,107,519 | 4/1992 | Ishikawa | 375/27 |
| 5,115,429 | 5/1992 | Hluchyj et al. . | |
| 5,121,385 | 6/1992 | Tominaga et al. . | |
| 5,127,001 | 6/1992 | Steagall et al. . | |
| 5,127,041 | 6/1992 | O'Sullivan | 379/59 |
| 5,132,966 | 7/1992 | Hayano et al. . | |
| 5,136,586 | 8/1992 | Greenblatt . | |
| 5,138,662 | 8/1992 | Amano et al. | 381/36 |
| 5,146,470 | 9/1992 | Fujii et al. . | |
| 5,150,410 | 9/1992 | Bertrand | 380/28 |
| 5,151,937 | 9/1992 | Chujo et al. | 379/410 |
| 5,153,897 | 10/1992 | Sumiyoshi et al. . | |
| 5,162,812 | 11/1992 | Aman et al. . | |
| 5,164,982 | 11/1992 | Davis | 379/96 |
| 5,177,734 | 1/1993 | Cummiskey et al. . | |
| 5,182,762 | 1/1993 | Shirai et al. . | |
| 5,187,591 | 2/1993 | Guy et al. | 358/425 |
| 5,187,692 | 2/1993 | Haneda et al. | 367/135 |
| 5,193,110 | 3/1993 | Jones et al. | 379/94 |
| 5,195,130 | 3/1993 | Weiss et al. | 379/90 |
| 5,208,812 | 5/1993 | Dudek et al. . | |
| 5,208,850 | 5/1993 | Kino | 379/88 |
| 5,214,656 | 5/1993 | Chung et al. | 371/43 |
| 5,228,026 | 7/1993 | Albrow et al. . | |
| 5,233,660 | 8/1993 | Chen | 381/38 |
| 5,235,595 | 8/1993 | O'Dowd . | |
| 5,249,218 | 9/1993 | Sainton | 379/59 |
| 5,258,983 | 11/1993 | Lane et al. . | |
| 5,261,027 | 11/1993 | Taniguchi et al. | 395/2 |
| 5,263,019 | 11/1993 | Chu . | |
| 5,272,695 | 12/1993 | Makino et al. . | |
| 5,276,703 | 1/1994 | Budin et al. . | |
| 5,278,900 | 1/1994 | Van Gerwen et al. | 379/410 |
| 5,282,197 | 1/1994 | Kreitzer . | |
| 5,283,638 | 2/1994 | Engberg et al. | 348/14 |
| 5,283,819 | 2/1994 | Glick et al. | 379/90 |
| 5,289,539 | 2/1994 | Maruyama | 379/410 |
| 5,295,136 | 3/1994 | Ashley et al. . | |
| 5,297,203 | 3/1994 | Rose et al. | 380/9 |
| 5,305,312 | 4/1994 | Fornek et al. . | |
| 5,307,413 | 4/1994 | Denzer | 380/49 |
| 5,309,562 | 5/1994 | Li | 395/200 |
| 5,313,498 | 5/1994 | Sano . | |
| 5,317,614 | 5/1994 | Osterweil . | |
| 5,319,682 | 6/1994 | Clark . | |
| 5,327,520 | 7/1994 | Chen | 395/2.28 |
| 5,329,472 | 7/1994 | Sugiyama | 364/724 |
| 5,341,374 | 8/1994 | Lewen et al. . | |

| | | | |
|---|---|---|---|
| 5,343,473 | 8/1994 | Cidon et al. | 370/85.6 |
| 5,343,521 | 8/1994 | Jullien et al. | 379/410 |
| 5,355,365 | 10/1994 | Bhat et al. | |
| 5,365,577 | 11/1994 | Davis et al. | 379/96 |
| 5,371,853 | 12/1994 | Kao et al. | 395/2.32 |
| 5,384,780 | 1/1995 | Lomp et al. | |
| 5,390,239 | 2/1995 | Morris et al. | 379/93 |
| 5,406,557 | 4/1995 | Baudoin | |
| 5,414,796 | 5/1995 | Jacobs | 395/2.3 |
| 5,416,776 | 5/1995 | Panzarella et al. | |
| 5,438,614 | 8/1995 | Rozman et al. | 379/93 |
| 5,444,770 | 8/1995 | Davis et al. | 379/99 |
| 5,463,616 | 10/1995 | Kruse et al. | 370/24 |
| 5,472,351 | 12/1995 | Greco et al. | |
| 5,473,676 | 12/1995 | Frick et al. | 379/99 |
| 5,479,407 | 12/1995 | Ko et al. | |
| 5,479,475 | 12/1995 | Grob et al. | 379/58 |
| 5,490,060 | 2/1996 | Malec et al. | 364/401 |
| 5,493,609 | 2/1996 | Winseck, Jr. et al. | 379/962 |

OTHER PUBLICATIONS

"Don't Just Tell Them, Show Them!", Glenn A. Pierce, Jr., *Automation*, (Aug. 1990).

"Mitsubishi Still Color Picture TV Phone", *Techno Japan*, 23, 6, (Jun. 1990).

"The Photophone", (Product Borchure) GTE ( Feb. 15, 1990).

"Wrist TVs Still Fiction, but Police Videophones Take Hold", Ray Smith, *TE&M*, (Dec. 15, 1987).

"Audiographic Terminal", M. Laube, *Electrical Communication*, 60, 1, (1986).

"Comparison of Coding Schemes for Telewriting Systems", Tominaga et al., *ICCC*, (1986).

"Simultaneous Transmission of Voice and Handwriting Signals: Sketchphone System", Kishimoto et al., *IEEE*, (1981).

"Telewriting Terminal Equipment" (Recommendation T.150) *CCITT*, (1988).

"A Family of 2–Wire, Duplex Modems Operating at Data Signalling Rates . . . ", Facsimile Recommendation vol. 32 *CCITT*, (1988).

"*** PICFON Card Brochure", *Specom Technologies Corp.*, (Published Prior to Applicant's Invention).

Pen Telephone Brochure, Shimadzu, (Published Prior to applicant's Invention).

"Telewriter Product Description", *Optel Communications, Inc.*, (Published Prior to Applicant's Invention).

"Videowriter '91 Product Description", *Optel Communications, Inc.*, (1991).

Copy of PCT Search Report for Application Serial No. PCT/US 96/11313 completed on Nov. 7, 1996, 4 pages.

V. Cuperman, et al., Backward Adaptive Configuration For Low–Delay Vector Excitation Coding, *Advances In Speech Coding*, pp. 13–23, dated Jan. 1, 1991.

IBM Technical Disclosure Bulletin, Method and Apparatus for the Statistical Multiplexing of Voice, Data, and Image Signals, 35, No. 5, pp. 409–411, dated Nov. 1992.

IBM Technical Disclosure Bulletin, Speech Data Adaptive Multiplexer, 27, No. 2, p. 969, dated Jul. 1994.

Copy of PCT Search Report dated Apr. 25, 1996 by Areste Canosa for Application No. PCT/US95/05034 (8 pages).

Copy of PCT Search Report dated Apr. 10, 1996 by J. Lange for Application No. PCT/US95/14826 (7 pages).

Copy of PCT Search Report dated Mar. 28, 1996 by M. Vandevenne for Application No. PCT/US95/14829 (8 pages).

Copy of PCT Search Report dated May 24, 1996 by C. Canosa Areste for Application No. PCT/US95/14253 (6 pages).

Copy of European Search Report dated Apr. 18, 1996 by S. Lambley for Application No. EP 93403164 (5 pages).

Canadian Application No. 2,104,701, Computer–Based Multifunction Personal Communications System, pp. 1–105, and 52 sheets of drawings, dated Jul. 9, 1994.

AT&T Microelectronics, "High Speed Data Pump Chip Sets," published in Dec., 1991.

AT&T Microelectronics, "WE DSP16C Digital Signal Processor/CODEC Preliminary Data Sheet," 32 pages, published in May, 1991.

AT&T Microelectronics, "T7540 Digital Telephone CODEC Data Sheet Addentum," pp. 1–4, published in Jul., 1991.

AT&T Microelectronics, "T7540 Digital Telephone CODEC Preliminary Data Sheet," pp. 1–64, published in Jan., 1991.

Zilog Intelligent Peripheral Controllers, "Z84C01 Z80 CPU with Clock Generator/Controller," pp. 43–73, published in 1991.

Zilog Intelligent Peripheral Controllers, "Z84C90 CMOS Z80 KIO Serial/Parallel/counter/timer," pp. 205–224, published in 1991.

U.S. West Caller ID publication, received Jul. 18, 1994, one page.

J.D. Mills, et al., "A Data and Boice System for the General Service Telephone Network," *IECON*, pp. 1143–1148, 1987.

Copy of European Search Report (Application No. EP 94304742), completed Jun. 8, 1995 by Examiner Mikkelsen.

"TechTips—A Periodic Round–up of Technical Applications, Notes, and Information on MultiTech's Data Communications Products" by MultiTech Systems, vol. 2, No. 2, May 1992.

"MultiX25—X.25 Pad, The New MultiX25 Pad 8 Port X.25 Packet Assembler/Disassembler for Public and Private Data Networks," by MultiTech Systems, Mar. 1992.

Y. Akaiwa et al., "An Integrated Voice and Data Radio Access System," 1992, pp. 255–258, IEEE.

CCITT V.42, "Error–correcting Procedures for DCES Using Asynchronous–to–Synchronous Conversion", vol. VIII, pp. 296–370, dated 1988.

European Search Report for Application No. EP 93403164 completed on Sep. 21, 1995 by Examiner lambley; 4 pages.

S. Casale et al., Statistical Voice/High–Speed Data Multiplexing on a 64 KBIT/S Channel, *IEEE*, pp. 459–464, dated 1991, T. Komiya et al, "An Approach to the Multifunction Graphic Terminal for the ISDN Environment", *IEEE*, pp. 32–36, dated 1988.

D. Gulick et al., "Interface for the ISDN to Your PC with A Voice/Data Board", *Electronic Design*, pp. 85–88, dated Dec. 10, 1987.

S. Sasaki et al., "Variable Rate Voice Coding System", *IEEE*, pp. 364–367, dated 1992.

VOICE OVER DATA CONFERENCING FOR A COMPUTER-BASED PERSONAL COMMUNICATIONS SYSTEM

This is a continuation of U.S. patent application Ser. No. 08/349,505 filed Dec. 2, 1994, abandoned which is a continuation in part of application Ser. No. 08/002,467 filed Jan. 8, 1993 entitled "Computer-Based Multifunction Personal Communications System", U.S. Pat. No. 5,452,289.

MICROFICHE APPENDIX

A microfiche appendix of 1 microfiche sheet having 92 frames is included in this specification.

FIELD OF THE INVENTION

The present invention relates to communications systems and in particular to computer assisted digital communications including data, fax and, digitized voice transmitted over a modem connection using dynamic bandwidth allocation based upon the demands of the communication link.

BACKGROUND OF THE INVENTION

A wide variety of communications alternatives are currently available to telecommunications users. For example, facsimile transmission of printed matter is available through what is commonly referred to as a stand-alone fax machine. Alternatively, fax-modem communication systems are currently available for personal computer users which combine the operation of a facsimile machine with the word processor of a computer to transmit documents held on computer disk. Modem communication over telephone lines in combination with a personal computer is also known in the art where file transfers can be accomplished from one computer to another. Also, simultaneous voice and modem data transmitted over the same telephone line has been accomplished in several ways.

There is a need in the art, however, for a personal communications system which combines a wide variety of communication functions into an integrated hardware-software product such that the user can conveniently choose a mode of communication and have that communication automatically invoked from a menu driven selection system.

There is a further need in the art for a personal communications system which provides an efficient and high quality voice over data communications conferencing mode between two or more users.

SUMMARY OF THE INVENTION

The present disclosure describes a complex computer assisted communications system. The subject of the present invention is a personal communications system which includes components of software and hardware operating in conjunction with a personal computer. The user interface control software operates on a personal computer, preferably within the Microsoft Windows® environment. The software control system communicates with hardware components linked to the software through the personal computer serial communications port. The hardware components include telephone communication equipment, digital signal processors, and hardware to enable both fax and data communication with a hardware components at a remote site connected through a standard telephone line. The functions of the hardware components are controlled by control software operating within the hardware component and from the software components operating within the personal computer.

Communications between the software components running on the personal computer and the local hardware components over the serial communications link is by a special packet protocol for digital data communications. This bi-directional communications protocol allows uninterrupted bidirectional full-duplex transfer of both control information and data communication.

The major functions of the present system are a telephone function, a voice mail function, a fax manager function, a multi-media mail function, a show and tell function, a terminal function and an address book function. The telephone function allows the present system to operate, from the users perspective, as a conventional telephone using either hands-free, headset or handset operation. The telephone function is more sophisticated than a standard telephone in that the present system converts the voice into a digital signal which can be processed with echo cancellation, compressed, stored as digital data for later retrieval and transmitted as digital voice data concurrent with the transfer of digital information data.

The voice over data (show and tell) component of the present system enables the operator to simultaneously transmit voice and data communication to a remote site. This voice over data function dynamically allocates data bandwidth over the telephone line depending on the demands of the voice grade digitized signal. With the present system, the user may enter voice over data mode from a data transfer mode by lifting the handset of the telephone connected to the modem. The off-hook condition is sensed and software sends a supervisory packet to the remote site to invoke voice-over-data mode. The Remote telephone will simulate a ring to alert the remote user, and the local telephone will simulate a ringback to inform the caller that the remote unit is responding.

The computer assisted communications system of the present invention includes a dual telephone line interface to allow voice over data communication through a first telephone line interface and voice communication through a second telephone line interface. In one embodiment of the present invention, the first party establishes voice over data communication with the second party. The first party can then initiate a voice connection through the second telephone line interface of the second party to communicate in voice mode to a third party.

To facilitate the potentially large amount of voice packet transfer an advanced priority statistical multiplexing (APSM) scheme is incorporated into the voice over data embodiment of the present invention. The use of advanced priority statistical multiplexing provides efficient and high quality voice over data transmissions using a minimal amount of processor overhead.

In an alternate embodiment, the first party can initiate a data connection through the second telephone line interface of the second party to communicate in data mode to a third party.

In yet another embodiment, a first, second, and third party may conference through a series of daisy-chained interconnections.

In another embodiment, a first, second, and third party may conference through a common node in a combination of star connected and daisy chained interconnections.

These features of the hardware component of the present system along with the features of the software component of the present system running on a PC provides a user with a complete range of telecommunications functions of a modern office, be it a stationary or mobile.

DESCRIPTION OF THE DRAWINGS

In the drawings, where like numerals describe like components throughout the several views.

DETAILED DESCRIPTION OF THE PREFERRED EMBODIMENTS

The specification for the multiple inventions described herein includes the present description, the drawings and a microfiche appendix. In the following detailed description of the preferred embodiment, reference is made to the accompanying drawings which form a part hereof, and in which is shown by way of illustration specific embodiments in which the inventions may be practiced. These embodiments are described in sufficient detail to enable those skilled in the art to practice the invention, and it is to be understood that other embodiments may be utilized and that structural changes may be made without departing from the spirit and scope of the present inventions. The following detailed description is, therefore, not to be taken in a limiting sense, and the scope of the present inventions is defined by the appended claims.

Figure 1:
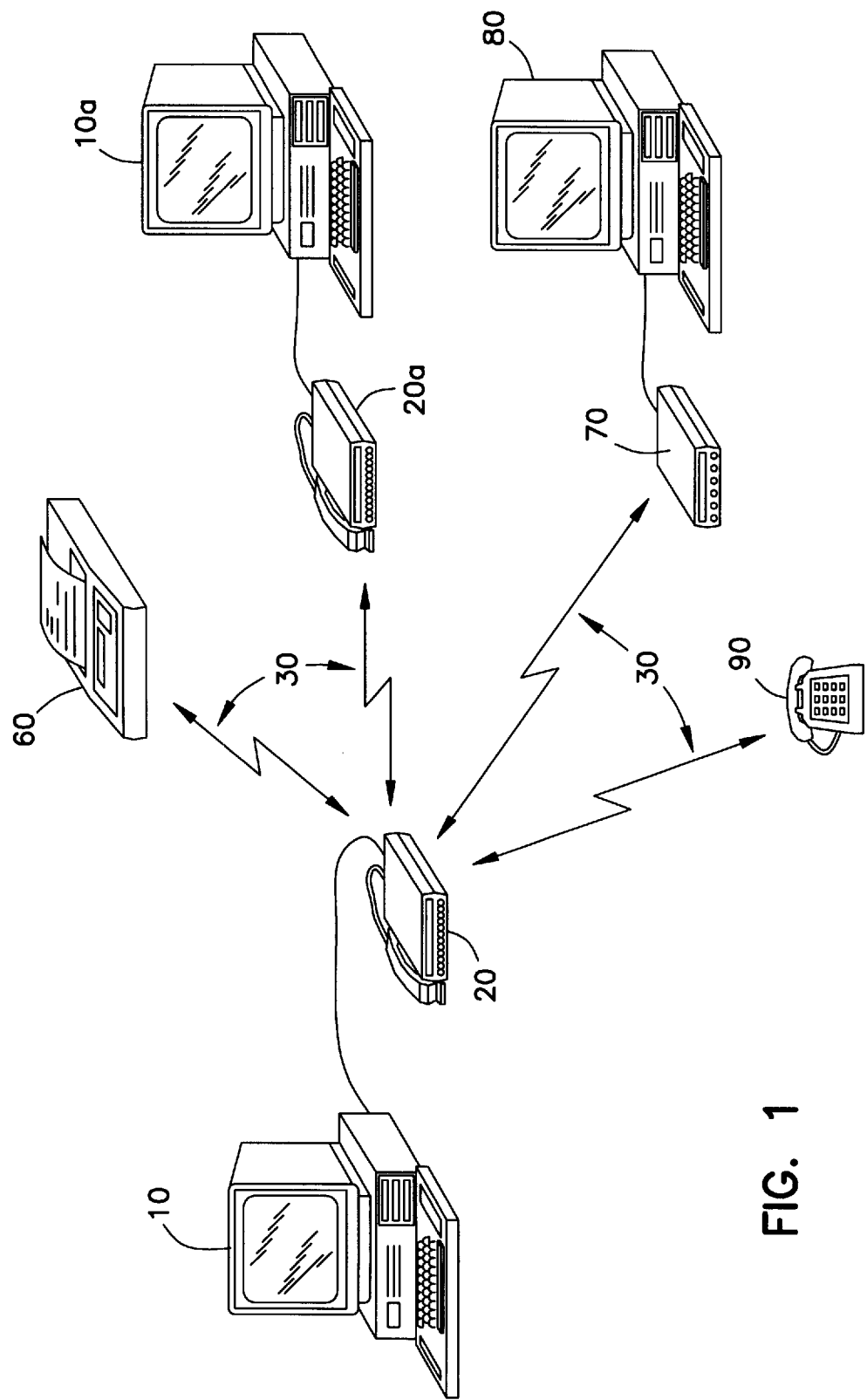
FIG. 1 shows the telecommunications environment within which the present invention may operate in several of the possible modes of communication.

FIG. 1 shows a typical arrangement for the use of the present system. Personal computer 10 is running the software components of the present system while the hardware components 20 include the data communication equipment and telephone headset. Hardware components 20 communicate over a standard telephone line 30 to one of a variety of remote sites. One of the remote sites may be equipped with the present system including hardware components 20a and software components running on personal computer 10a. In one alternative use, the local hardware components 20 may be communicating over standard telephone line 30 to facsimile machine 60. In another alternative use, the present system may be communicating over a standard telephone line 30 to another personal computer 80 through a remote modem 70. In another alternative use, the present system may be communicating over a standard telephone line 30 to a standard telephone 90. Those skilled in the art will readily recognize the wide variety of communication interconnections possible with the present system by reading and understanding the following detailed description.

The ornamental features of the hardware components 20 of FIG. 1 are claimed as part of Design patent application Ser. No. 29/001368, filed Nov. 12, 1992 entitled "Telephone/Modem case for a Computer-Based Multifunction Personal Communications System" assigned to the same assignee of the present inventions and hereby incorporated by reference.

General Overview

The present inventions are embodied in a commercial product by the assignee, MultiTech Systems, Inc. The software component operating on a personal computer is sold under the commercial trademark of MultiExpressPCS™ personal communications software while the hardware component of the present system is sold under the commercial name of MultiModemPCS™, Intelligent Personal Communications System Modem. In the preferred embodiment, the software component runs under Microsoft® Windows® however those skilled in the art will readily recognize that the present system is easily adaptable to run under any single or multi-user, single or multi-window operating system.

The present system is a multifunction communication system which includes hardware and software components. The system allows the user to connect to remote locations equipped with a similar system or with modems, facsimile machines or standard telephones over a single analog telephone line. The software component of the present system includes a number of modules which are described in more detail below.

Figure 2:
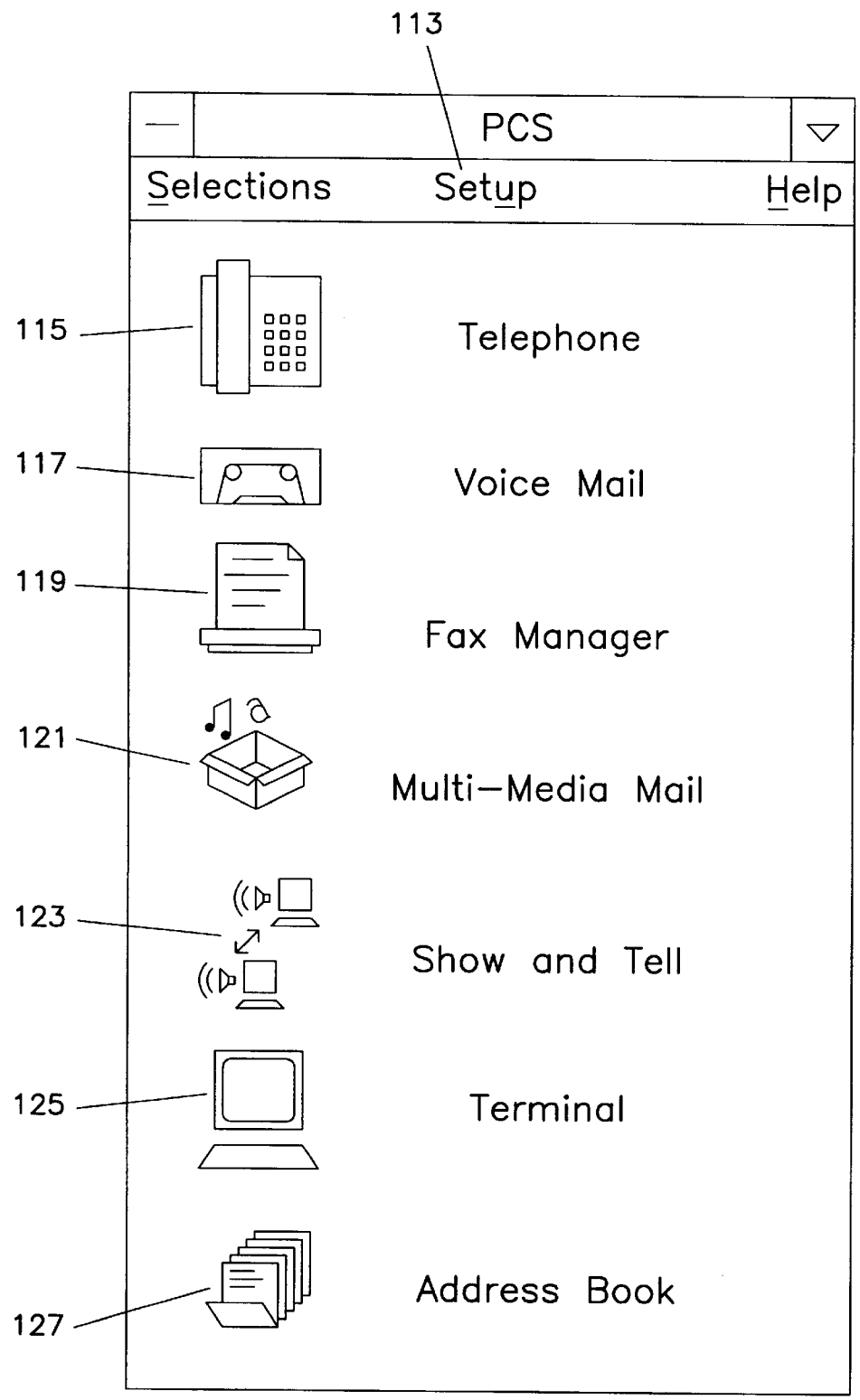
FIG. 2 is the main menu icon for the software components operating on the personal computer.

FIG. 2 is an example of the Windows®-based main menu icon of the present system operating on a personal computer. The functions listed with the icons used to invoke those functions are shown in the preferred embodiment. Those skilled in the art will readily recognize that a wide variety of selection techniques may be used to invoke the various functions of the present system. The icon of FIG. 2 is part of Design patent application Ser. No. 29/001397, filed Nov. 12, 1992 entitled "Icons for a Computer-Based Multifunction Personal Communications System" assigned to the same assignee of the present inventions and hereby incorporated by reference.

The telephone module allows the system to operate as a conventional or sophisticated telephone system. The system converts voice into a digital signal so that it can be transmitted or stored with other digital data, like computer information. The telephone function supports PBX and Centrex features such a call waiting, call forwarding, caller ID and three-way calling. This module also allows the user to mute, hold or record a conversation. The telephone module enables the handset, headset or hands-free speaker telephone operation of the hardware component. It includes on-screen push button dialing, speed-dial of stored numbers and digital recording of two-way conversations.

The voice mail portion of the present system allows this system to operate as a telephone answering machine by storing voice messages as digitized voice files along with a time/date voice stamp. The digitized voice files can be saved and sent to one or more destinations immediately or at a later time using a queue scheduler. The user can also listen to, forward or edit the voice messages which have been received with a powerful digital voice editing component of the present system. This module also creates queues for outgoing messages to be sent at preselected times and allows the users to create outgoing messages with the voice editor.

The fax manager portion of the present system is a queue for incoming and outgoing facsimile pages. In the preferred embodiment of the present system, this function is tied into the Windows "print" command once the present system has been installed. This feature allows the user to create faxes from any Windows®-based document that uses the "print" command. The fax manager function of the present system allows the user to view queued faxes which are to be sent or which have been received. This module creates queues for outgoing faxes to be sent at preselected times and logs incoming faxes with time/date stamps.

The multi-media mail function of the present system is a utility which allows the user to compose documents that include text, graphics and voice messages using the message composer function of the present system, described more fully below. The multi-media mail utility of the present system allows the user to schedule messages for transmittal and queues up the messages that have been received so that can be viewed at a later time.

The show and tell function of the present system allows the user to establish a data over voice (DOV) communications session. When the user is transmitting data to a remote location similarly equipped, the user is able to talk to the person over the telephone line while concurrently transferring the data. This voice over data function is accomplished in the hardware components of the present system. It digitizes the voice and transmits it in a dynamically changing allocation of voice data and digital data multiplexed in the same transmission. The allocation at a given moment is selected depending on the amount of voice digital information required to be transferred. Quiet voice intervals allocate greater space to the digital data transmission.

The terminal function of the present system allows the user to establish a data communications session with another computer which is equipped with a modem but which is not equipped with the present system. This feature of the present system is a Windows®-based data communications program that reduces the need for issuing "AT" commands by providing menu driven and "pop-up" window alternatives.

The address book function of the present system is a database that is accessible from all the other functions of the present system. This database is created by the user inputting destination addresses and telephone numbers for data communication, voice mail, facsimile transmission, modem communication and the like. The address book function of the present system may be utilized to broadcast communications to a wide variety of recipients. Multiple linked databases have separate address books for different groups and different destinations may be created by the users. The address book function includes a textual search capability which allows fast and efficient location of specific addresses as described more fully below.

Hardware Components

Figure 3:
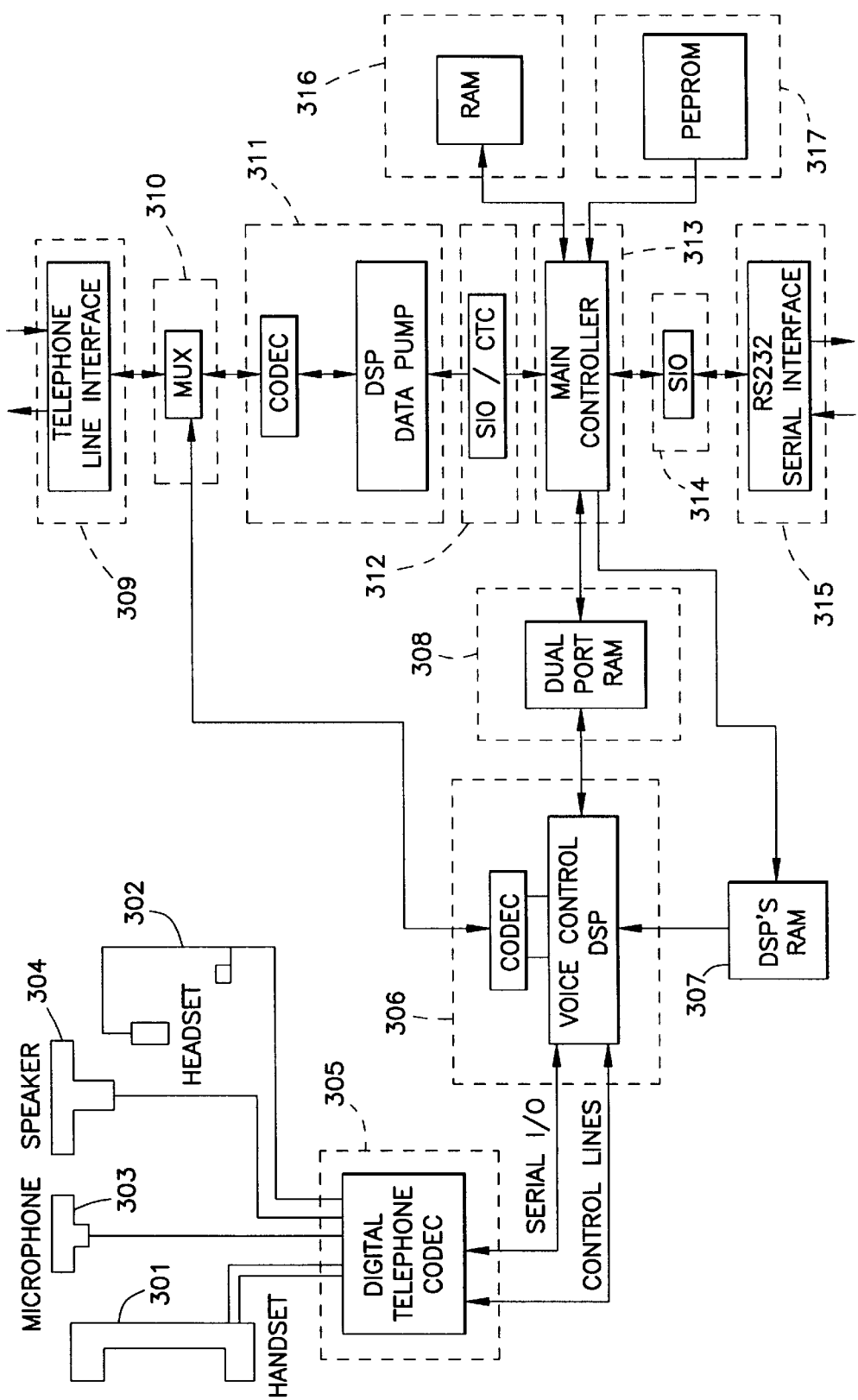
FIG. 3 is a block diagram of the hardware components of the present system.

FIG. 3 is a block diagram of the hardware components of the present system corresponding to reference number 20 of FIG. 1. These components form the link between the user, the personal computer running the software component of the present system and the telephone line interface. As will be more fully described below, the interface to the hardware components of the present system is via a serial communications port connected to the personal computer. The interface protocol is well ordered and defined such that other software systems or programs running on the personal computer may be designed and implemented which would be capable of controlling the hardware components shown in FIG. 3 by using the control and communications protocol defined below.

In the preferred embodiment of the present system three alternate telephone interfaces are available: the telephone handset 301, a telephone headset 302, and a hands-free microphone 303 and speaker 304. Regardless of the telephone interface, the three alternative interfaces connect to the digital telephone coder-decoder (CODEC) circuit 305.

The digital telephone CODEC circuit 305 interfaces with the voice control digital signal processor (DSP) circuit 306 which includes a voice control DSP and CODEC. This circuit does digital to analog (D/A) conversion, analog to digital (A/D) conversion, coding/decoding, gain control and is the interface between the voice control DSP circuit 306 and the telephone interface. The CODEC of the voice control circuit 306 transfers digitized voice information in a compressed format to multiplexor circuit 310 to analog telephone line interface 309.

The CODEC of the voice control circuit 306 is actually an integral component of a voice control digital signal processor integrated circuit, as described more fully below. The voice control DSP of circuit 306 controls the digital telephone CODEC circuit 305, performs voice compression and echo cancellation.

Multiplexor (MUX) circuit 310 selects between the voice control DSP circuit 306 and the data pump DSP circuit 311 for transmission of information on the telephone line through telephone line interface circuit 309.

The data pump circuit 311 also includes a digital signal processor (DSP) and a CODEC for communicating over the telephone line interface 309 through MUX circuit 310. The data pump DSP and CODEC of circuit 311 performs functions such as modulation, demodulation and echo cancellation to communicate over the telephone line interface 309 using a plurality of telecommunications standards including FAX and modem protocols.

The main controller circuit 313 controls the DSP data pump circuit 311 and the voice control DSP circuit 306 through serial input/output and clock timer control (SIO/CTC) circuits 312 and dual port RAM circuit 308 respectively. The main controller circuit 313 communicates with the voice control DSP 306 through dual port RAM circuit 308. In this fashion digital voice data can be read and written simultaneously to the memory portions of circuit 308 for high speed communication between the user (through interfaces 301, 302 or 303/304) and the personal computer connected to serial interface circuit 315 and the remote telephone connection connected through the telephone line attached to line interface circuit 309.

As described more fully below, the main controller circuit 313 includes, in the preferred embodiment, a microprocessor which controls the functions and operation of all of the hardware components shown in FIG. 3. The main controller is connected to RAM circuit 316 and an programmable and electrically erasable read only memory (PEROM) circuit 317. The PEROM circuit 317 includes non-volatile memory in which the executable control programs for the voice control DSP circuits 306 and the main controller circuits 313 operate.

The RS232 serial interface circuit 315 communicates to the serial port of the personal computer which is running the software components of the present system. The RS232 serial interface circuit 315 is connected to a serial input/output circuit 314 with main controller circuit 313. SIO circuit 314 is in the preferred embodiment, a part of SIO/CTC circuit 312.

Functional Operation of the Hardware Components

Referring once again to FIG. 3, the multiple and selectable functions described in conjunction with FIG. 2 are all implemented in the hardware components of FIG. 3. Each of these functions will be discussed in turn.

The telephone function 115 is implemented by the user either selecting a telephone number to be dialed from the address book 127 or manually selecting the number through the telephone menu on the personal computer. The telephone number to be dialed is downloaded from the personal computer over the serial interface and received by main controller 313. Main controller 313 causes the data pump DSP circuit 311 to seize the telephone line and transmit the DTMF tones to dial a number. Main controller 313 configures digital telephone CODEC circuit 305 to enable either the handset 301 operation, the microphone 303 and speaker 304 operation or the headset 302 operation. A telephone connection is established through the telephone line interface circuit 309 and communication is enabled. The user's analog voice is transmitted in an analog fashion to the digital telephone CODEC 305 where it is digitized. The digitized voice patterns are passed to the voice control circuit 306 where echo cancellation is accomplished, the digital voice signals are reconstructed into analog signals and passed through multiplexor circuit 310 to the telephone line interface circuit 309 for analog transmission over the telephone line. The incoming analog voice from the telephone connection through telephone connection circuit 309 is passed to the integral CODEC of the voice control circuit 306 where it is digitized. The digitized incoming voice is then passed to digital telephone CODEC circuit 305 where it is reconverted to an analog signal for transmission to the selected telephone interface (either the handset 301, the microphone/speaker 303/304 or the headset 302). Voice Control DSP circuit 306 is programmed to perform echo cancellation to avoid feedback and echoes between transmitted and received signals, as is more fully described below.

In the voice mail function mode of the present system, voice messages may be stored for later transmission or the present system may operate as an answering machine receiving incoming messages. For storing digitized voice, the telephone interface is used to send the analog speech patterns to the digital telephone CODEC circuit 305. Circuit 305 digitizes the voice patterns and passes them to voice control circuit 306 where the digitized voice patterns are digitally compressed. The digitized and compressed voice patterns are passed through dual port ram circuit 308 to the main controller circuit 313 where they are transferred through the serial interface to the personal computer using a packet protocol defined below. The voice patterns are then stored on the disk of the personal computer for later use in multi-media mail, for voice mail, as a prerecorded answering machine message or for later predetermined transmission to other sites.

For the present system to operate as an answering machine, the hardware components of FIG. 3 are placed in answer mode. An incoming telephone ring is detected through the telephone line interface circuit 309 and the main controller circuit 313 is alerted which passes the information off to the personal computer through the RS232 serial interface circuit 315. The telephone line interface circuit 309 seizes the telephone line to make the telephone connection. A pre-recorded message may be sent by the personal computer as compressed and digitized speech through the RS232 interface to the main controller circuit 313. The compressed and digitized speech from the personal computer is passed from main controller circuit 313 through dual port ram circuit 308 to the voice control DSP circuit 306 where it is uncompressed and converted to analog voice patterns. These analog voice patterns are passed through multiplexor circuit 310 to the telephone line interface 309 for transmission to the caller. Such a message may invite the caller to leave a voice message at the sound of a tone. The incoming voice messages are received through telephone line interface 309 and passed to voice control circuit 306. The analog voice patterns are digitized by the integral CODEC of voice control circuit 306 and the digitized voice patterns are compressed by the voice control DSP of the voice control circuit 306. The digitized and compressed speech patterns are passed through dual port ram circuit 308 to the main controller circuit 313 where they are transferred using packet protocol described below through the RS232 serial interface 315 to the personal computer for storage and later retrieval. In this fashion the hardware components of FIG. 3 operate as a transmit and receive voice mail system for implementing the voice mail function 117 of the present system.

The hardware components of FIG. 3 may also operate to facilitate the fax manager function 119 of FIG. 2. In fax receive mode, an incoming telephone call will be detected by a ring detect circuit of the telephone line interface 309 which will alert the main controller circuit 313 to the incoming call. Main controller circuit 313 will cause line interface circuit 309 to seize the telephone line to receive the call. Main controller circuit 313 will also concurrently alert the operating programs on the personal computer through the RS232 interface using the packet protocol described below. Once the telephone line interface seizes the telephone line, a fax carrier tone is transmitted and a return tone and handshake is received from the telephone line and detected by the data pump circuit 311. The reciprocal transmit and receipt of the fax tones indicates the imminent receipt of a facsimile transmission and the main controller circuit 313 configures the hardware components of FIG. 3 for the receipt of that information. The necessary handshaking with the remote facsimile machine is accomplished through the data pump 311 under control of the main controller circuit 313. The incoming data packets of digital facsimile data are received over the telephone line interface and passed through data pump circuit 311 to main controller circuit 313 which forwards the information on a packet basis (using the packet protocol described more fully below) through the serial interface circuit 315 to the personal computer for storage on disk. Those skilled in the art will readily recognize that the FAX data could be transferred from the telephone line to the personal computer using the same path as the packet transfer except using the normal AT stream mode. Thus the incoming facsimile is automatically received and stored on the personal computer through the hardware components of FIG. 3.

A facsimile transmission is also facilitated by the hardware components of FIG. 3. The transmission of a facsimile may be immediate or queued for later transmission at a predetermined or preselected time. Control packet information to configure the hardware components to send a facsimile are sent over the RS232 serial interface between the personal computer and the hardware components of FIG. 3 and are received by main controller circuit 313. The data pump circuit 311 then dials the recipient's telephone number using DTMF tones or pulse dialing over the telephone line interface circuit 309. Once an appropriate connection is established with the remote facsimile machine, standard facsimile handshaking is accomplished by the data pump circuit 311. Once the facsimile connection is established, the digital facsimile picture information is received through the data packet protocol transfer over serial line interface circuit 315, passed through main controller circuit 313 and data pump circuit 311 onto the telephone line through telephone line interface circuit 309 for receipt by the remote facsimile machine.

The operation of the multi-media mail function 121 of FIG. 2 is also facilitated by the hardware components of FIG. 3. A multimedia transmission consists of a combination of picture information, digital data digitized voice information. For example, the type of multimedia information transferred to a remote site using the hardware components of FIG. 3 could be the multimedia format of the MicroSoft® Multimedia Wave® format with the aid of an Intelligent Serial Interface (ISI) card added to the personal computer. The multimedia may also be the type of multimedia information assembled by the software component of the present system which is described more fully below.

The multimedia package of information including text, graphics and voice messages (collectively called the multimedia document) may be transmitted or received through the hardware components shown in FIG. 3. For example, the transmission of a multimedia document through the hardware components of FIG. 3 is accomplished by transferring the multimedia digital information using the packet protocol described below over the RS232 serial interface between the personal computer and the serial line interface circuit 315. The packets are then transferred through main controller circuit 313 through the data pump circuit 311 on to the telephone line for receipt at a remote site through telephone line interface circuit 309. In a similar fashion, the multimedia documents received over the telephone line from the remote site are received at the telephone line interface circuit 309, passed through the data pump circuit 311 for receipt and forwarding by the main controller circuit 313 over the serial line interface circuit 315.

The show and tell function 123 of the present system allows the user to establish a data over voice communication session. In this mode of operation, full duplex data transmission may be accomplished simultaneously with the voice communication between both sites. This mode of operation assumes a like configured remote site. The hardware components of the present system also include a means for sending voice/data over cellular links. The protocol used for transmitting multiplexed voice and data include a supervisory packet described more fully below to keep the link established through the cellular link. This supervisory packet is an acknowledgement that the link is still up. The supervisory packet may also contain link information to be used for adjusting various link parameters when needed. This supervisory packet is sent every second when data is not being sent and if the packet is not acknowledged after a specified number of attempts, the protocol would then give an indication that the cellular link is down and then allow the modem to take action. The action could be for example; change speeds, retrain, or hang up. The use of supervisory packets is a novel method of maintaining inherently intermittent cellular links when transmitting multiplexed voice and data.

The voice portion of the voice over data transmission of the show and tell function is accomplished by receiving the user's voice through the telephone interface 301, 302 or 303 and the voice information is digitized by the digital telephone circuit 305. The digitized voice information is passed to the voice control circuit 306 where the digitized voice information is compressed using a voice compression algorithm described more fully below. The digitized and compressed voice information is passed through dual port RAM circuit 308 to the main controller circuit 313. During quiet periods of the speech, a quiet flag is passed from voice control circuit 306 to the main controller 313 through a packet transfer protocol described below by a dual port RAM circuit 308.

Simultaneous with the digitizing compression and packetizing of the voice information is the receipt of the packetized digital information from the personal computer over interface line circuit 315 by main controller circuit 313. Main controller circuit 313 in the show and tell function of the present system must efficiently and effectively combine the digitized voice information with the digital information for transmission over the telephone line via telephone line interface circuit 309. As described above and as described more fully below, main controller circuit 313 dynamically changes the amount of voice information and digital information transmitted at any given period of time depending upon the quiet times during the voice transmissions. For example, during a quiet moment where there is no speech information being transmitted, main controller circuit 313 ensures that a higher volume of digital data information be transmitted over the telephone line interface in lieu of digitized voice information.

Also, as described more fully below, the packets of digital data transmitted over the telephone line interface with the transmission packet protocol described below, requires 100 percent accuracy in the transmission of the digital data, but a lesser standard of accuracy for the transmission and receipt of the digitized voice information. Since digital information must be transmitted with 100 percent accuracy, a corrupted packet of digital information received at the remote site must be re-transmitted. A retransmission signal is communicated back to the local site and the packet of digital information which was corrupted during transmission is retransmitted. If the packet transmitted contained voice data, however, the remote site uses the packets whether they were corrupted or not as long as the packet header was intact. If the header is corrupted, the packet is discarded. Thus, the voice information may be corrupted without requesting retransmission since it is understood that the voice information must be transmitted on a real time basis and the corruption of any digital information of the voice signal is not critical. In contrast to this the transmission of digital data is critical and retransmission of corrupted data packets is requested by the remote site.

The transmission of the digital data follows the CCITT V.42 standard, as is well known in the industry and as described in the CCITT Blue Book, volume VIII entitled Data Communication over the Telephone Network, 1989. The CCITT V.42 standard is hereby incorporated by reference. The voice data packet information also follows the CCITT V.42 standard, but uses a different header format so the receiving site recognizes the difference between a data packet and a voice packet. The voice packet is distinguished from a data packet by using undefined bits in the header (80 hex) of the V.42 standard. The packet protocol for voice over data transmission during the show and tell function of the present system is described more fully below.

Since the voice over data communication with the remote site is full-duplex, incoming data packets and incoming voice packets are received by the hardware components of FIG. 3. The incoming data packets and voice packets are received through the telephone line interface circuit 309 and passed to the main controller circuit 313 via data pump DSP circuit 311. The incoming data packets are passed by the main controller circuit 313 to the serial interface circuit 315 to be passed to the personal computer. The incoming voice packets are passed by the main controller circuit 313 to the dual port RAM circuit 308 for receipt by the voice control DSP circuit 306. The voice packets are decoded and the compressed digital information therein is uncompressed by the voice control DSP of circuit 306. The uncompressed digital voice information is passed to digital telephone CODEC circuit 305 where it is reconverted to an analog signal and retransmitted through the telephone line interface circuits. In this fashion full-duplex voice and data transmission and reception is accomplished through the hardware components of FIG. 3 during the show and tell functional operation of the present system.

Terminal operation 125 of the present system is also supported by the hardware components of FIG. 3. Terminal operation means that the local personal computer simply operates as a "dumb" terminal including file transfer capabilities. Thus no local processing takes place other than the handshaking protocol required for the operation of a dumb terminal. In terminal mode operation, the remote site is assumed to be a modem connected to a personal computer but the remote site is not necessarily a site which is configured according to the present system. In terminal mode of operation, the command and data information from personal computer is transferred over the RS232 serial interface circuit 315, forwarded by main controller circuit 313 to the data pump circuit 311 where the data is placed on the telephone line via telephone line interface circuit 309.

In a reciprocal fashion, data is received from the telephone line over telephone line interface circuit 309 and simply forwarded by the data pump circuit 311, the main controller circuit 313 over the serial line interface circuit 315 to the personal computer.

As described above, and more fully below, the address book unction of the present system is primarily a support function for providing telephone numbers and addresses for the other various functions of the present system.

Detailed Electrical Schematic Diagrams

Figure 4:
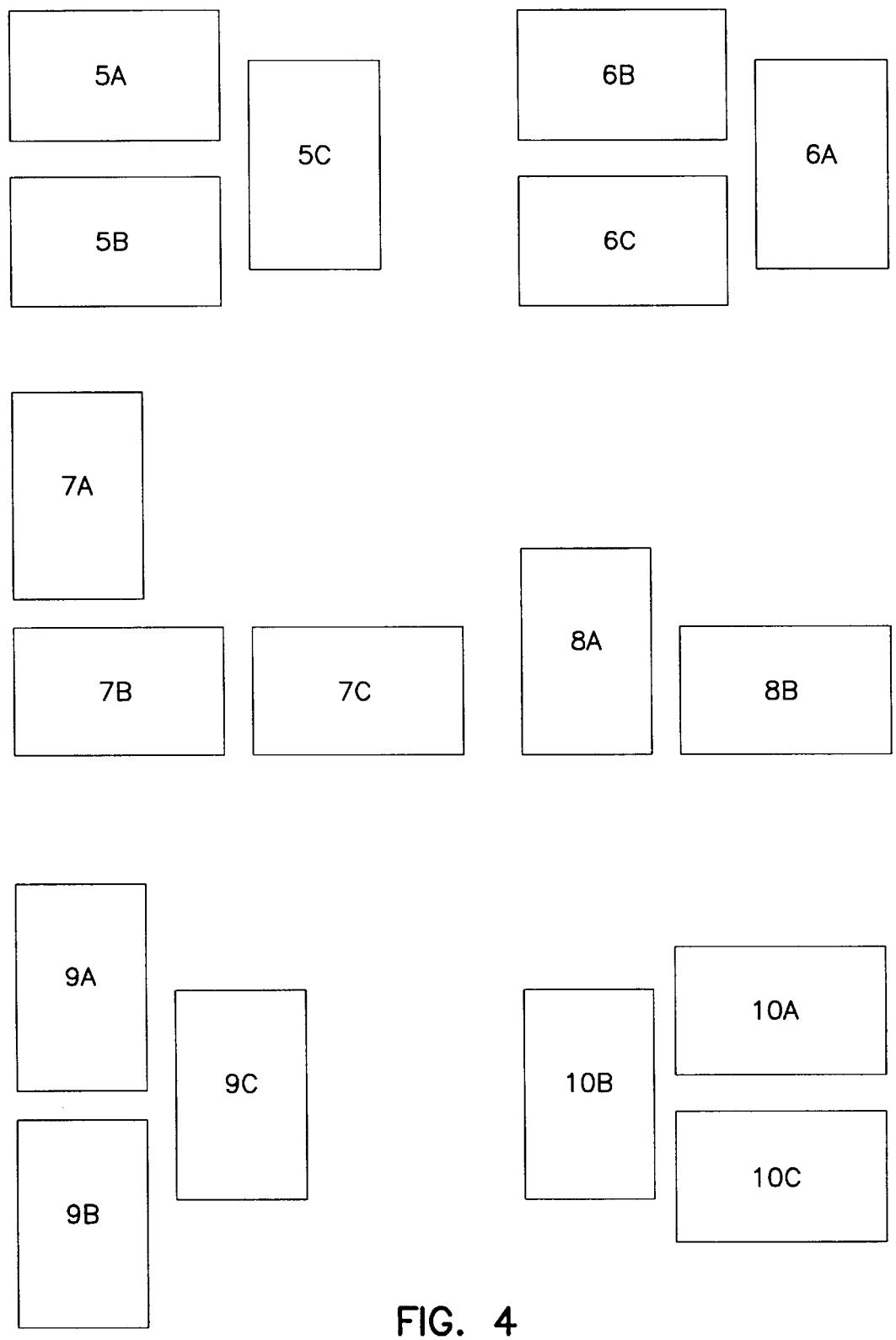
FIG. 4 is a key for viewing the detailed electrical schematic diagrams of FIGS. 5A–10C to facilitate understanding of the interconnect between the drawings.

The detailed electrical schematic diagrams comprise FIGS. 5A–C, 6A–C, 7A–C, 8A–B, 9A–C and 10A–C. FIG. 4 shows a key on how the schematic diagrams may be conveniently arranged to view the passing of signals on the electrical lines between the diagrams. The electrical connections between the electrical schematic diagrams are through the designators listed next to each wire. For example, on the right side of FIG. 5A, address lines A0–A19 are attached to an address bus for which the individual electrical lines may appear on other pages as A0–A19 or may collectively be connected to other schematic diagrams through the designator "A" in the circle connected to the collective bus. In a like fashion, other electrical lines designated with symbols such as RNGL on the lower left-hand side of FIG. 5A may connect to other schematic diagrams using the same signal designator RNGL.

Figure 7A:
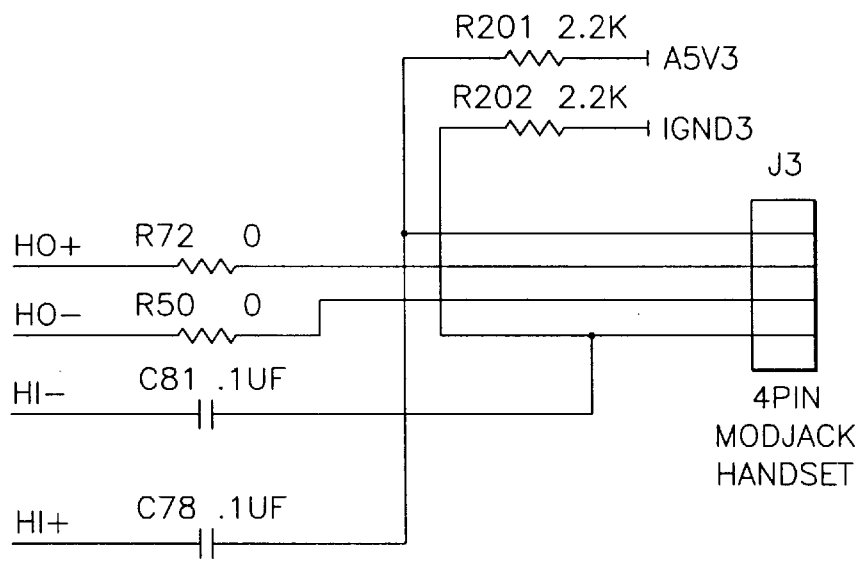
Figure 7A:
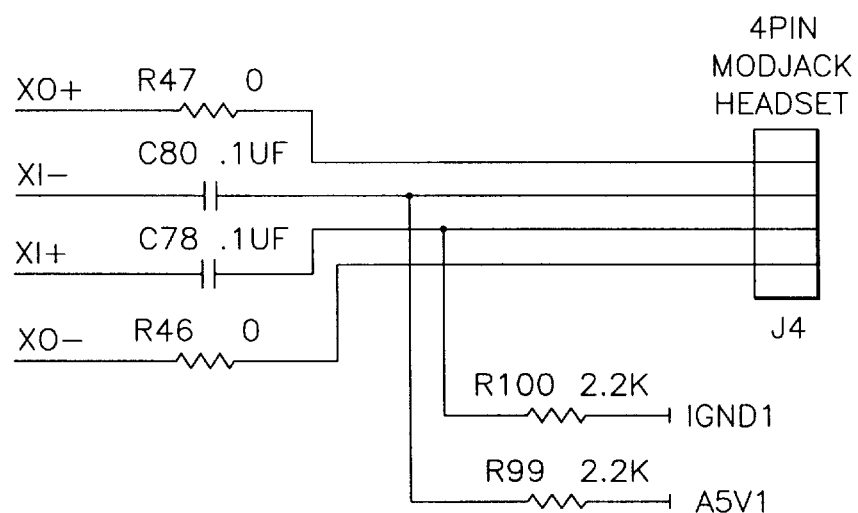
Figure 7A:
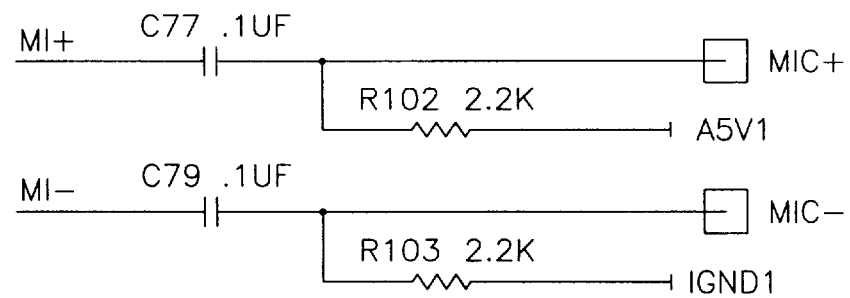
Figure 7B:
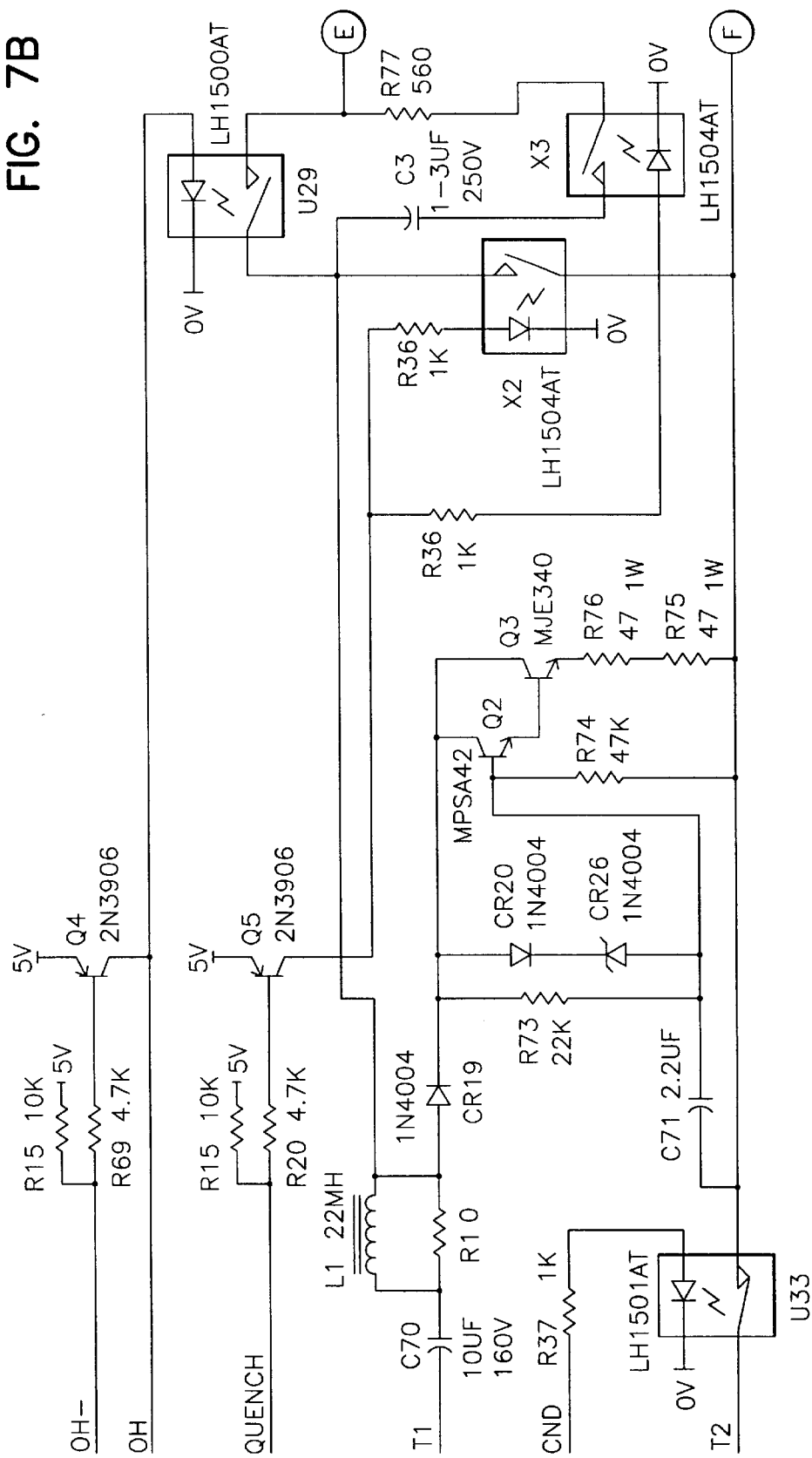
Figure 7C:
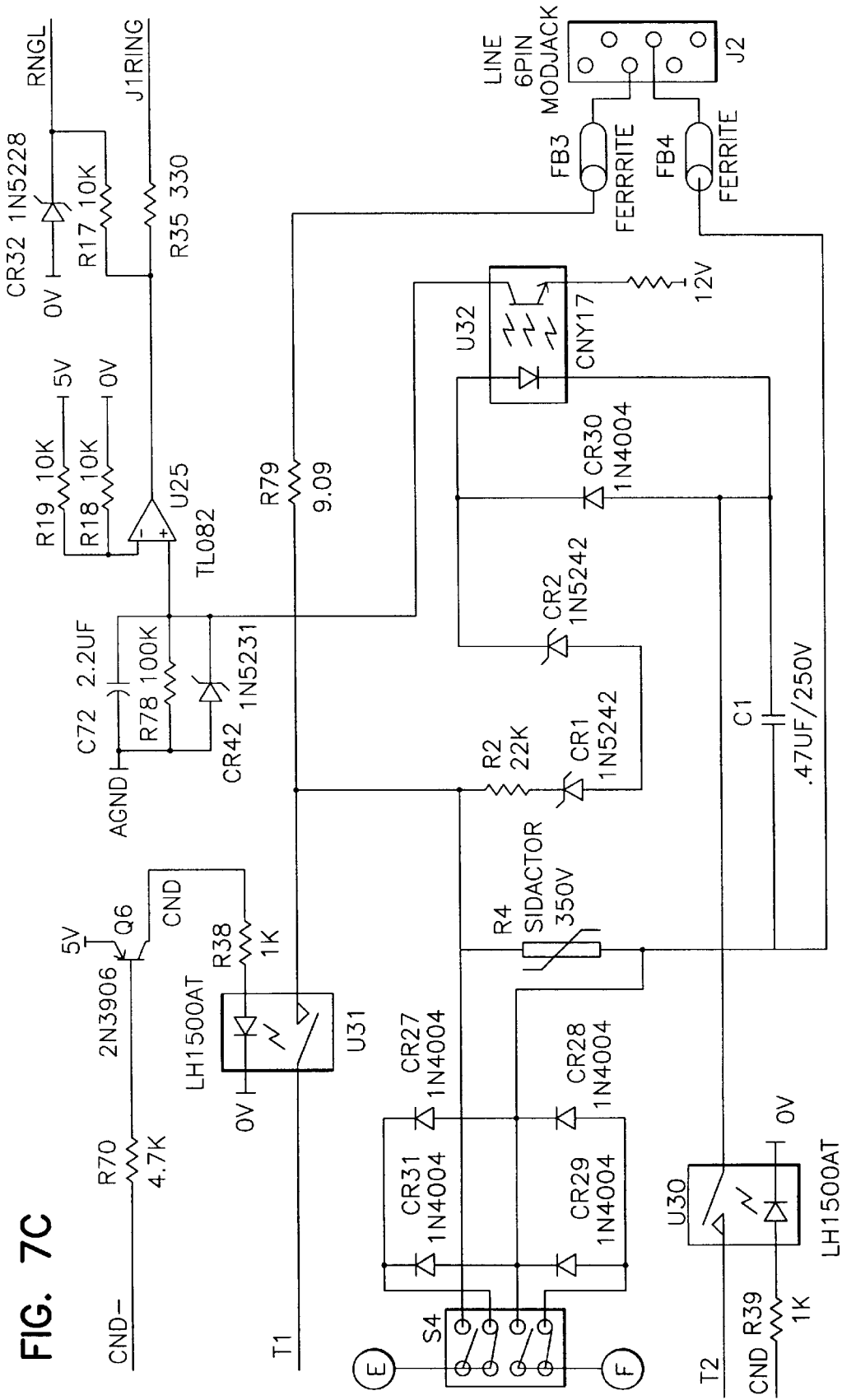

Beginning with the electrical schematic diagram of FIG. 7C, the telephone line connection in the preferred embodiment is through connector J2 which is a standard six-pin modular RJ-11 jack. In the schematic diagram of FIG. 7C, only the tip and ring connections of the first telephone circuit of the RJ-11 modular connector are used. Ferrite beads FB3 and FB4 are placed on the tip and ring wires of the telephone line connections to remove any high frequency or RF noise on the incoming telephone line. The incoming telephone line is also overvoltage protected through SIDACTOR R4. The incoming telephone line may be full wave rectified by the full wave bridge comprised of diodes CR27, CR28, CR29 and CR31. Switch S4 switches between direct connection and full wave rectified connection depending upon whether the line is a non-powered leased line or a standard telephone line. Since a leased line is a "dead" line with no voltage, the full-wave rectification is not needed.

Also connected across the incoming telephone line is a ring detect circuit. Optical isolator U32 (part model number CNY17) senses the ring voltage threshold when it exceeds the breakdown voltages on zener diodes CR1 and CR2. A filtering circuit shown in the upper right corner of FIG. 7C creates a long RC delay to sense the constant presence of an AC ring voltage and buffers that signal to be a binary signal out of operational amplifier U25 (part model number TLO82). Thus, the RNGL and J1RING signals are binary signals for use in the remaining portions of the electrical schematic diagrams to indicate a presence of a ring voltage on the telephone line.

The present system is also capable of sensing the caller ID information which is transmitted on the telephone line between rings. Between the rings, optically isolated relays U30, U31 on FIG. 7C and optically isolated relay U33 on FIG. 7B all operate in the period between the rings so that the FSK modulated caller ID information is connected to the CODEC and data pump DSP in FIGS. 8A and 8B, as described more fully below.

Referring now to FIG. 7B, more of the telephone line filtering circuitry is shown. Some of the telephone line buffering circuitry such as inductor L1 and resistor R1 are optional and are connected for various telephone line standards used around the word to meet local requirements. For example, Switzerland requires a 22 millihenry inductor and 1K resistor in series the line. For all other countries, the 1K resistor is replaced with a 0 ohm resistor.

Relay U29 shown in FIG. 7B is used to accomplish pulse dialing by opening and shorting the tip and ring wires. Optical relay X2 is engaged during pulse dialing so that the tip and ring are shorted directly. Transistors Q2 and Q3 along with the associated discrete resistors comprise a holding circuit to provide a current path or current loop on the telephone line to grab the line.

FIG. 7A shows the telephone interface connections between the hardware components of the present system and the handset, headset and microphone.

Figure 8A:
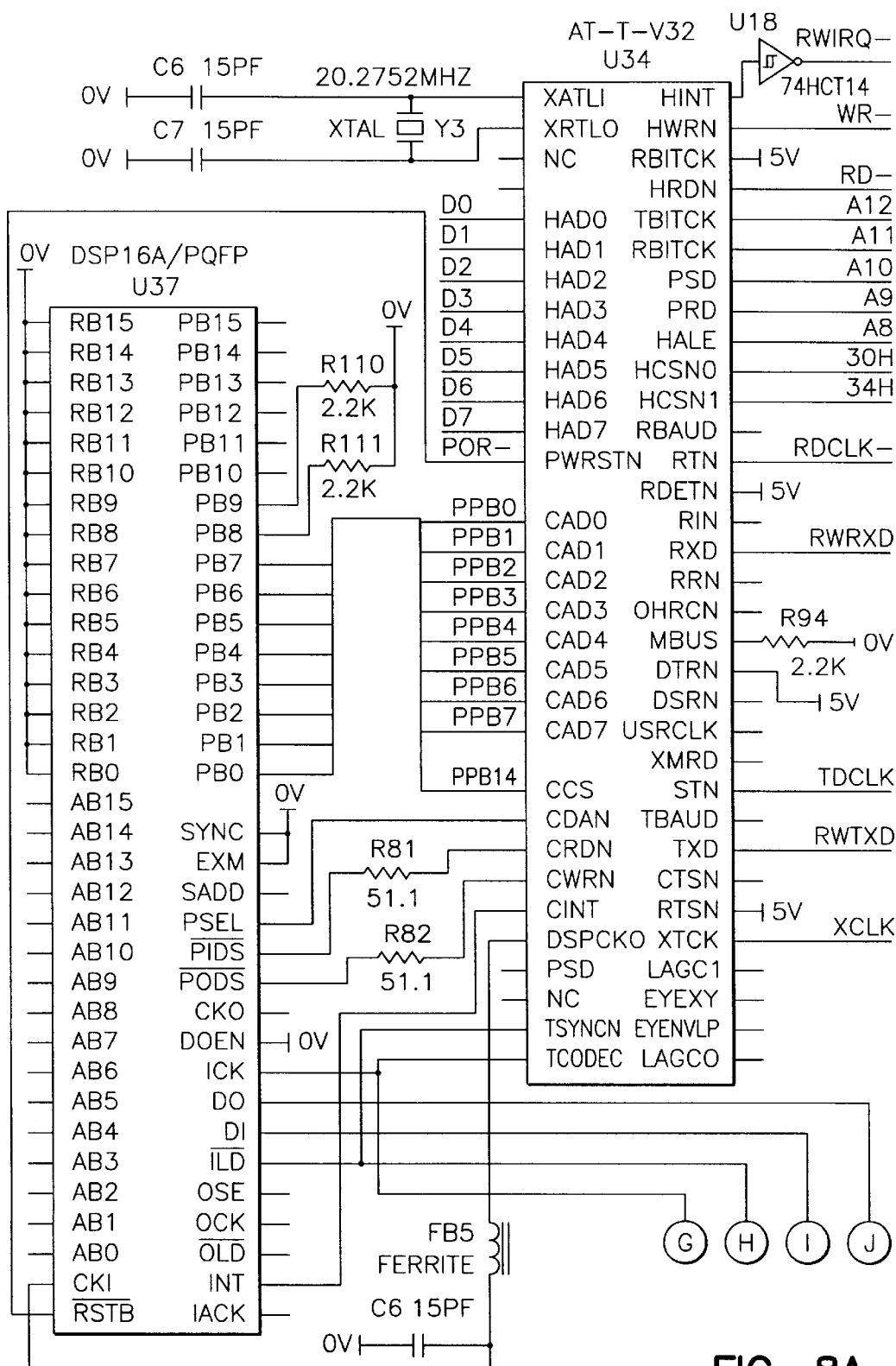
Figure 8B:
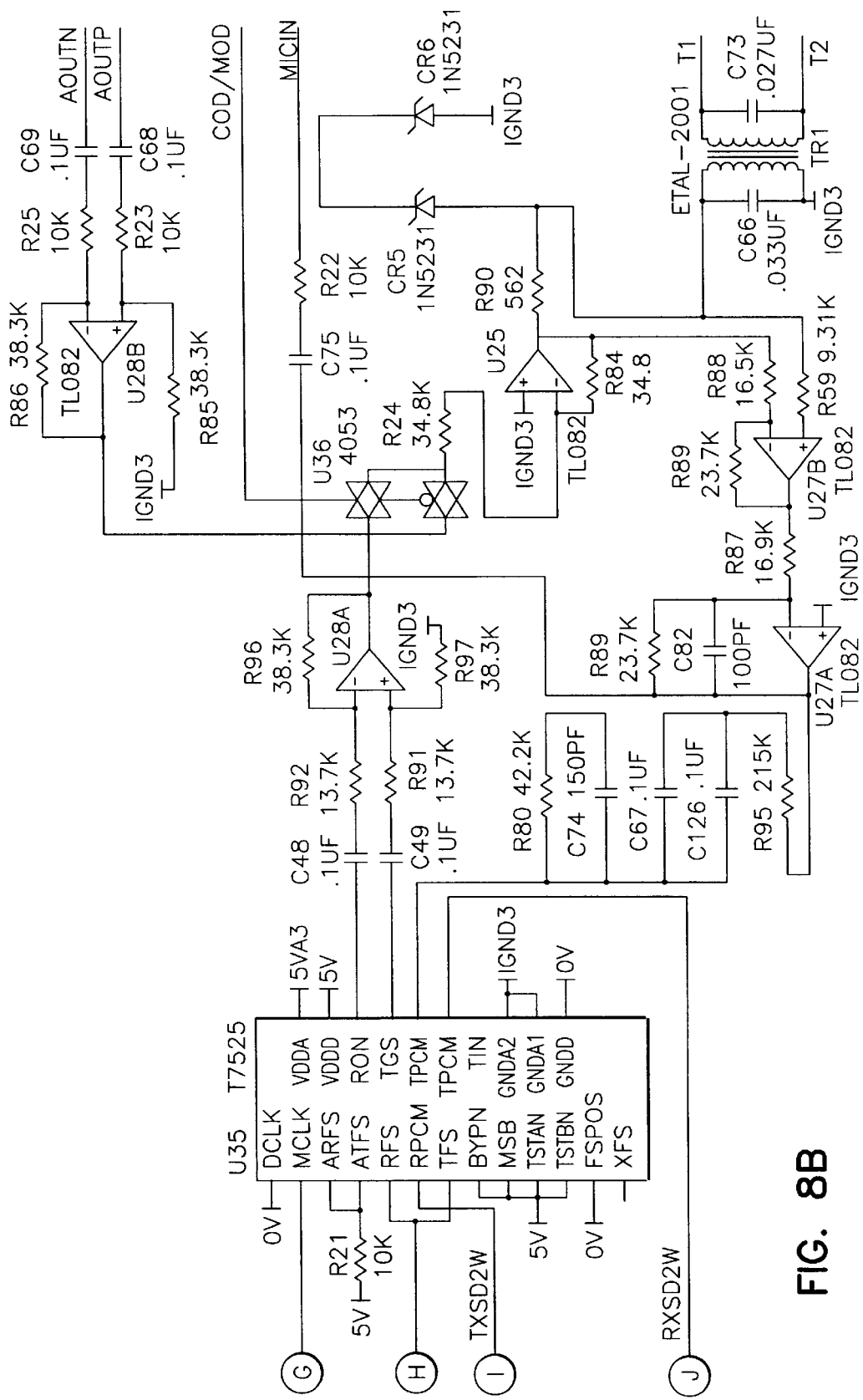

The connections T1 and T2 for the telephone line from FIG. 7B are connected to transformer TR1 shown in the electrical schematic diagram of FIG. 8B. Only the AC components of the signal pass through transformer TR1. The connection of signals attached to the secondary of TR1 is shown for both transmitting and receiving information over the telephone line.

Incoming signals are buffered by operational amplifiers U27A and U27B. The first stage of buffering using operational amplifier U27B is used for echo suppression so that the transmitted information being placed on the telephone line is not fed back into the receive portion of the present system. The second stage of the input buffering through operational amplifier U27A is configured for a moderate amount of gain before driving the signal into CODEC U35.

CODEC chip U35 on FIG. 8B, interface chip U34 on FIG. 8A and digital signal processor (DSP) chip U37 on FIG. 8A comprise a data pump chip set manufactured and sold by AT&T Microelectronics. A detailed description of the operation of these three chips in direct connection and cooperation with one another is described in the publication entitled "AT&T V.32bis/V.32/FAX High-Speed Data Pump Chip Set Data Book" published by AT&T Microelectronics, December 1991, which is hereby incorporated by reference. This AT&T data pump chip set comprises the core of an integrated, two-wire full duplex modem which is capable of operation over standard telephone lines or leased lines. The data pump chip set conforms to the telecommunications specifications in CCITT recommendations V.32bis, V.32, V.22bis, V.22, V.23, V.21 and is compatible with the Bell 212A and 103 modems. Speeds of 14,400, 9600, 4800, 2400, 1200, 600 and 300 bits per second are supported. This data pump chip set consists of a ROM-coded DSP16A digital signal processor U37, and interface chip U34 and an AT&T T7525 linear CODEC U35. The AT&T V.32 data pump chip set is available from AT&T Microelectronics.

The chip set U34, U35 and U37 on FIGS. 8A and 8B perform all A/D, D/A, modulation, demodulation and echo cancellation of all signals placed on or taken from the telephone line. The CODEC U35 performs DTMF tone generation and detection, signal analysis of call progress tones, etc. The transmission of information on the telephone line from CODEC U35 is through buffer U28A, through CMOS switch U36 and through line buffer U25. The CMOS switch U36 is used to switch between the data pump chip set CODEC of circuit 310 (shown in FIG. 3) and the voice control CODEC of circuit 306 (also shown in FIG. 3). The signal lines AOUTN and AOUTP correspond to signals received from the voice control CODEC of circuit 306. CODEC U35 is part of circuit 311 of FIG. 3.

Figure 5A:
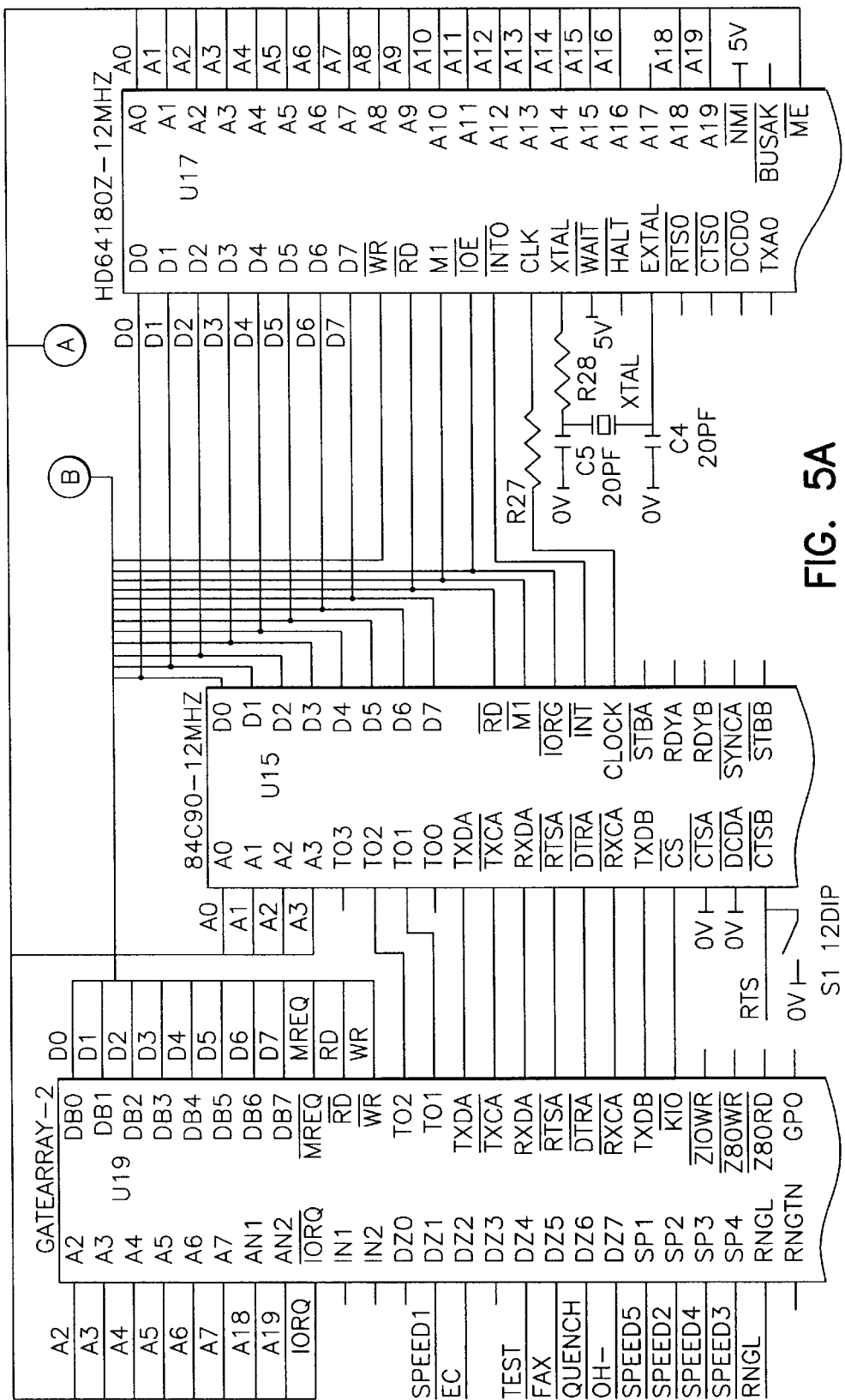
FIGS. 5A–5C, 6A–6C, 7A–7C, 8A–8B, 9A–9C and 10A–10C are detailed electrical schematic diagrams of the circuitry of the hardware components of the present system.
Figure 5B:
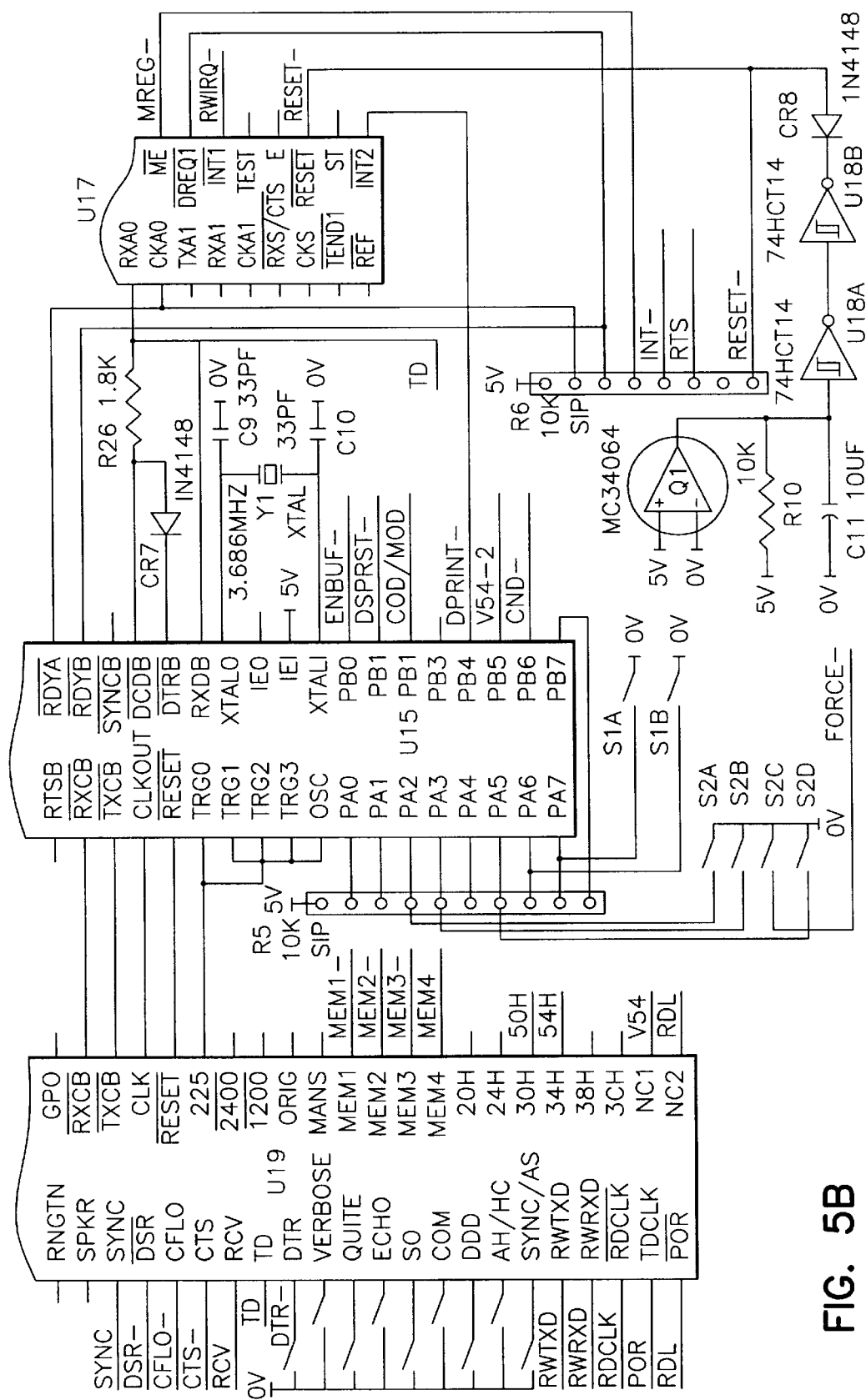
Figure 5C:
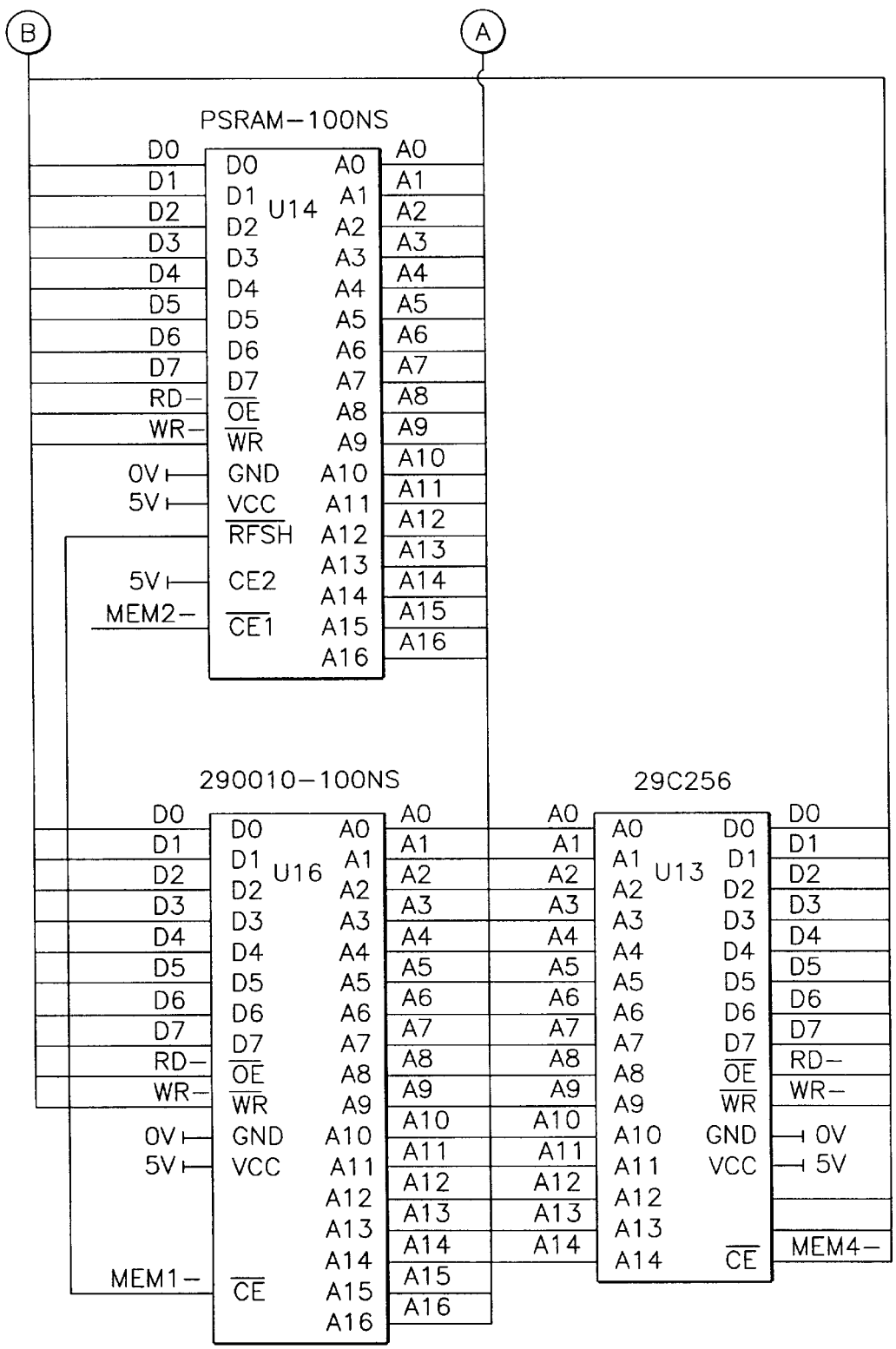

The main controller of controller circuit 313 and the support circuits 312, 314, 316, 317 and 308 are shown in FIGS. 5A–5C. In the preferred embodiment of the present system, the main controller is a Z80180 eight-bit microprocessor chip. In the preferred implementation, microcontroller chip U17 is a Z80180 microprocessor, part number Z84CO1 by Zilog, Inc. of Campbell, Calif. (also available from Hitachi Semiconductor as part number HD64180Z). The Zilog Z80180 eight-bit microprocessor operates at 12 MHz internal clock speed by means of an external crystal XTAL, which in the preferred embodiment, is a 24.576 MHz crystal. The crystal circuit includes capacitors C4 and C5 which are 20 pf capacitors and resistor R28 which is a 33 ohm resistor. The crystal and support circuitry is connected according to manufacturer's specifications found in the Zilog Intelligent Peripheral Controllers Data Book published by Zilog, Inc. The product description for the Z84CO1 Z80180 CPU from the Z84C01 Z80 CPU Product Specification pgs. 43–73 of the Zilog 1991 Intelligent Peripheral Controllers databook is hereby incorporated by reference.

The Z80180 microprocessor in microcontroller chip U17 is intimately connected to a serial/parallel I/O counter timer chip U15 which is, in the preferred embodiment, a Zilog 84C90 CMOS Z80 KIO serial/parallel/counter/timer integrated circuit available from Zilog, Inc. This multi-function I/O chip U15 combines the functions of a parallel input/output port, a serial input/output port, bus control circuitry, and a clock timer circuit in one chip. The Zilog Z84C90 product specification describes the detailed internal operations of this circuit in the Zilog Intelligent Peripheral Controllers 1991 Handbook available from Zilog, Inc. Z84C90 CMOS Z80KIO Product specification pgs. 205–224 of the Zilog 1991 Intelligent Peripheral Controllers databook is hereby incorporated by reference.

Data and address buses A and B shown in FIG. 5A connect the Z80180 microprocessor in microcontroller U17 with the Z80 KIO circuit U15 and a gate array circuit U19, and to other portions of the electrical schematic diagrams. The gate array U19 includes miscellaneous latch and buffer circuits for the present system which normally would be found in discrete SSI or MSI integrated circuits. By combining a wide variety of miscellaneous support circuits into a single gate array, a much reduced design complexity and manufacturing cost is achieved. A detailed description of the internal operations of gate array U19 is described more fully below in conjunction with schematic diagrams of FIGS. 10A–10C.

The memory chips which operate in conjunction with the Z80 microprocessor in microcontroller chip U17 are shown in FIG. 5C. The connections A, B correspond to the connections to the address and data buses, respectively, found on FIG. 5A. Memory chips U16 and U13 are read-only memory (ROM) chips which are electrically alterable in place. These programmable ROMs, typically referred to as flash PROMs or Programmable Erasable Read Only Memories (PEROMs) hold the program code and operating parameters for the present system in a non-volatile memory. Upon power-up, the programs and operating parameters are transferred to the voice control DSP RAM U12, shown in FIG. 9B.

In the preferred embodiment, RAM chip U14 is a pseudostatic RAM which is essentially a dynamic RAM with a built-in refresh. Those skilled in the art will readily recognize that a wide variety memory chips may be used and substituted for pseudo-static RAM U14 and flash PROMs U16 and U13.

Referring once again to FIG. 3, the main controller circuit 313 communicates with the voice control DSP of circuit 306 through dual port RAM circuit 308. The digital telephone CODEC circuit 305, the voice control DSP and CODEC circuit 306, the DSP RAM 307 and the dual port RAM 308 are all shown in detailed electrical schematic diagrams of FIGS. 9A–9C.

Figure 9A:
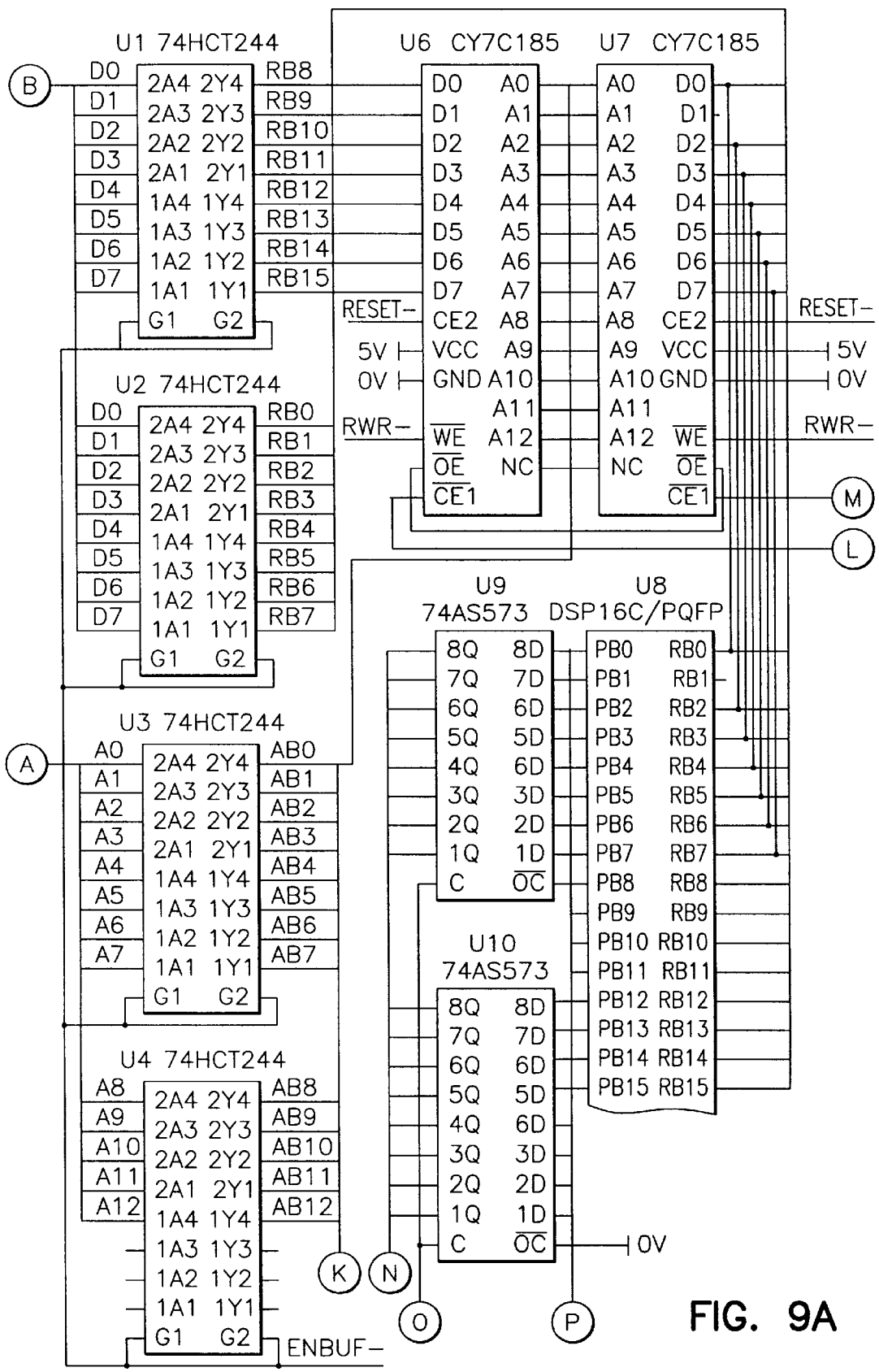

Referring to FIG. 9A, the DSP RAM chips U6 and U7 are shown with associated support chips. Support chips U1 and U2 are in the preferred embodiment part 74HCT244 which are TTL-level latches used to capture data from the data bus and hold it for the DSP RAM chips U6 and U7. Circuits U3 and U4 are also latch circuits for also latching address information to control DSP RAM chips U6 and U7. Once again, the address bus A and data bus B shown in FIG. 9A are multi-wire connections which, for the clarity of the drawing, are shown as a thick bus wire representing a grouping of individual wires.

Figure 9B:
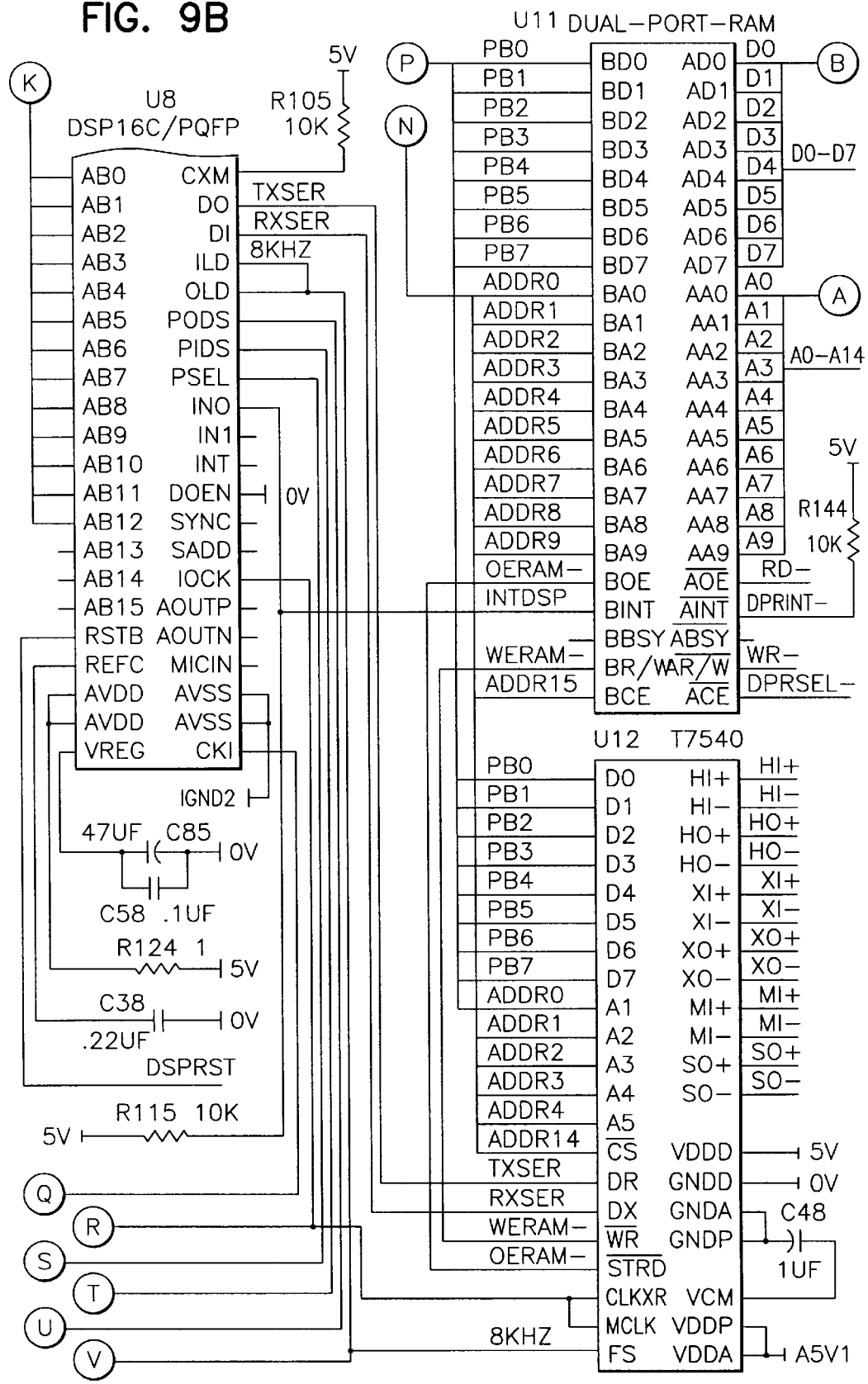

Also in FIG. 9A, the DSP RAMs U6 and U7 are connected to the voice control DSP and CODEC chip U8 as shown split between FIGS. 9A and 9B. DSP/CODEC chip U8 is, in the preferred embodiment, part number WE® DSP16C, digital signal processor and CODEC chip manufactured and sold by AT&T Microelectronics. This is a 16-bit programmable DSP with a voice band sigma-delta CODEC on one chip. Although the CODEC portion of this chip is capable of analog-to-digital and digital-to-analog signal acquisition and conversion system, the actual D/A and A/D functions for the telephone interface occur in digital telephone CODEC chip U12 (corresponding to digital telephone CODEC circuit 305 of FIG. 3). Chip U8 includes circuitry for sampling, data conversion, anti-aliasing filtering and anti-imaging filtering. The programmable control of DSP/CODEC chip U8 allows it to receive digitized voice from the telephone interface (through digital telephone CODEC chip U12) and store it in a digitized form in the dual port RAM chip U11. The digitized voice can then be passed to the main controller circuit 313 where the digitized voice may be transmitted to the personal computer over the RS232 circuit 315. In a similar fashion, digitized voice stored by the main controller circuit 313 in the dual port RAM U11 may be transferred through voice control DSP chip U8, converted to analog signals by telephone CODEC U12 and passed to the user. Digital telephone CODEC chip U12 includes a direct telephone handset interface on the chip.

The connections to DSP/CODEC chip U8 are shown split across FIGS. 9A and 9B. Address/data decode chips U9 and U10 on FIG. 9A serve to decode address and data information from the combined address/data bus for the dual port RAM chip U11 of FIG. 9B. The interconnection of the DSP/CODEC chip U8 shown on FIGS. 9A and 9B is described more fully in the WE® DSP16C Digital Signal Processor/CODEC Data Sheet published May, 1991 by AT&T Microelectronics, which is hereby incorporated by reference.

The Digital Telephone CODEC chip U12 is also shown in FIG. 9B which, in the preferred embodiment, is part number T7540 Digital Telephone CODEC manufactured and sold by AT&T Microelectronics. A more detailed description of this telephone CODEC chip U12 is described in the T7540 Digital Telephone CODEC Data Sheet and Addendum published July, 1991 by AT&T Microelectronics, which is hereby incorporated by reference.

Figure 9C:
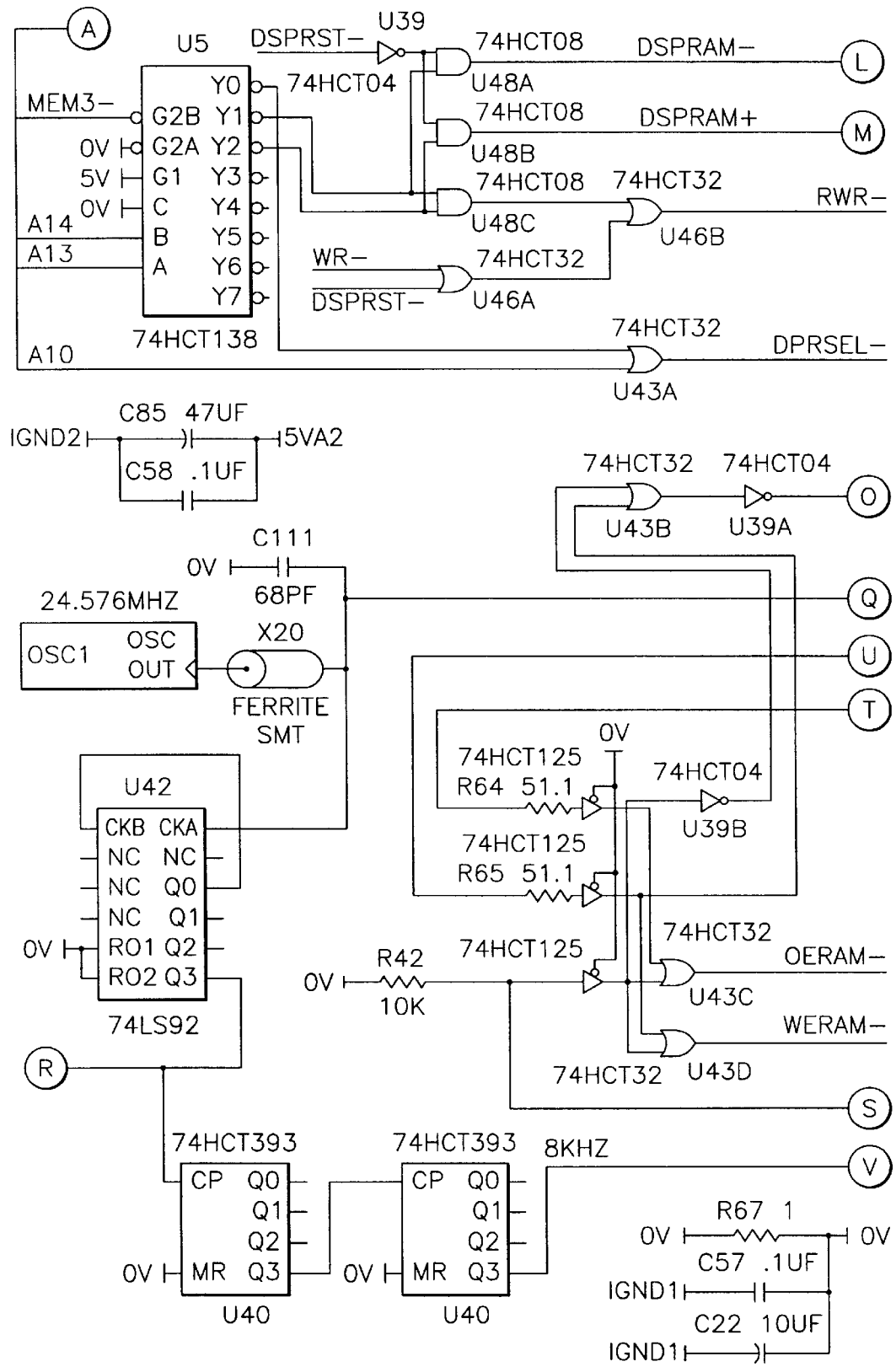

Support circuits shown on FIG. 9C are used to facilitate communication between CODEC chip U12, DSP/CODEC chip U8 and dual port RAM U11. For example, an 8 KHz clock is used to synchronize the operation of CODEC U12 and DSP/CODEC U8.

The operation of the dual port RAM U11 is controlled both by DSP U8 and main controller chip U17. The dual port operation allows writing into one address while reading from another address in the same chip. Both processors can access the exact same memory locations with the use of a contention protocol such that when one is reading the other cannot be writing. In the preferred embodiment, dual port RAM chip U11 is part number CYZC131 available from Cyprus Semiconductor. This chip includes built in contention control so that if two processors try to access the same memory location at the same time, the first one making the request gets control of the address location and the other processor must wait. In the preferred embodiment, a circular buffer is arranged in dual port RAM chip U11 comprising 24 bytes. By using a circular buffer configuration with pointers into the buffer area, both processors will not have a contention problem.

The DSP RAM chips U6 and U7 are connected to the DSP chip U8 and also connected through the data and address buses to the Zilog microcontroller U17. In this configuration, the main controller can download the control programs for DSP U8 into DSP RAMs U6 and U7. In this fashion, DSP control can be changed by the main controller or the operating programs on the personal computer, described more fully below. The control programs stored in DSP chips U6 and U7 originate in the flash PEROM chips U16 and U17. The power-up control routine operating on controller chip U17 downloads the DSP control routines into DSP RAM chips U6 and U7.

Figure 6A:
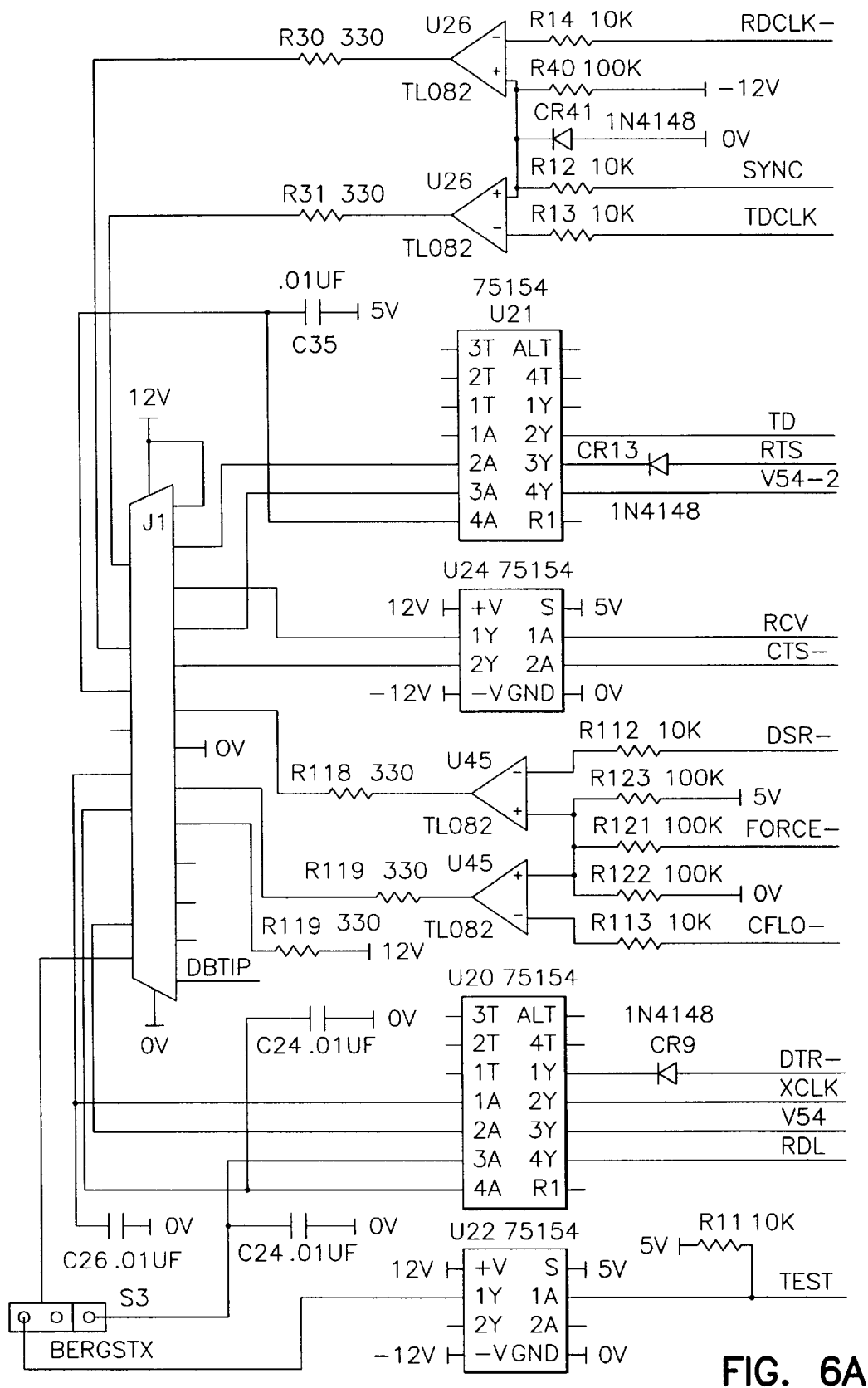
Figure 6B:
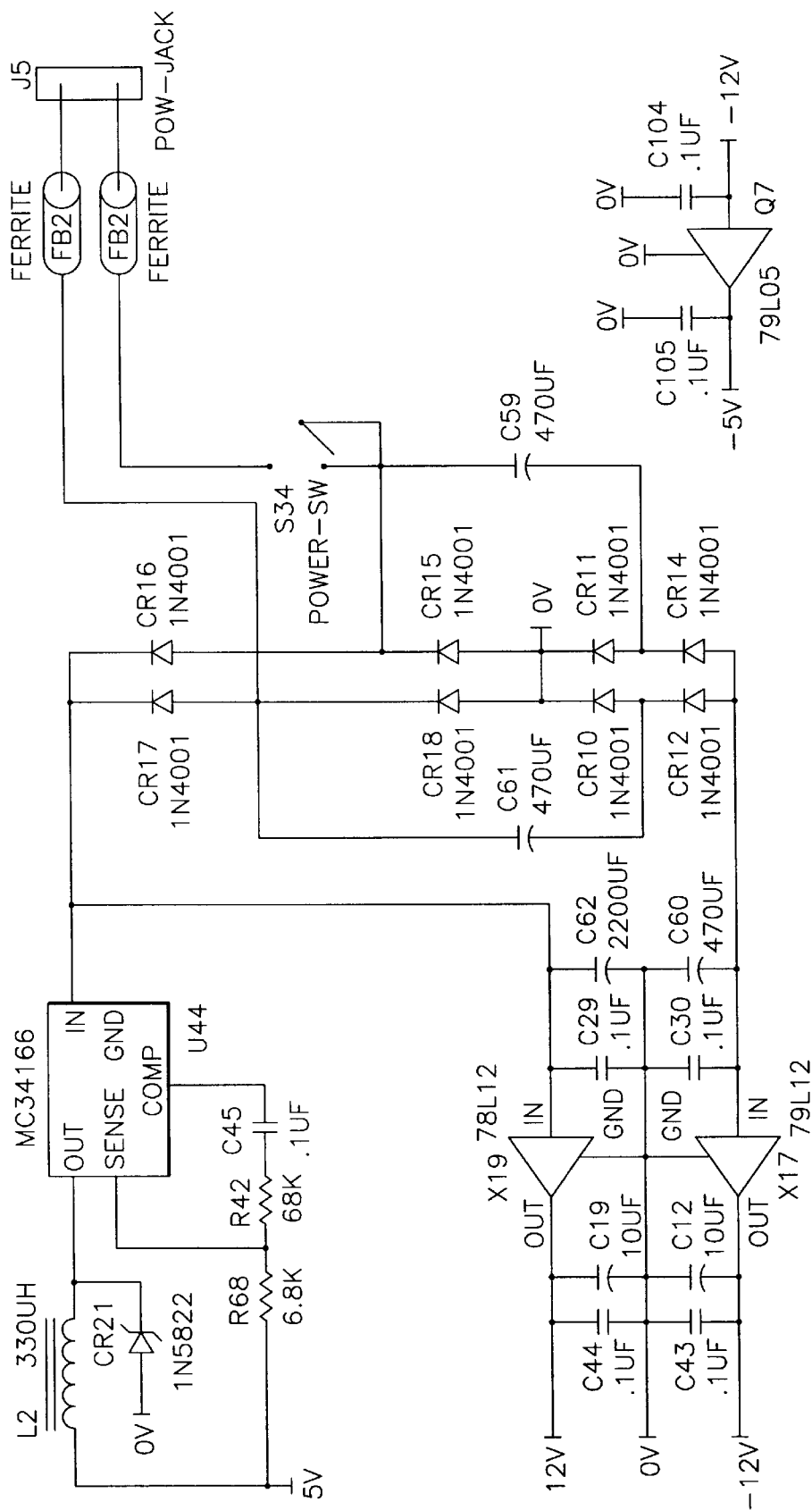
Figure 6C:
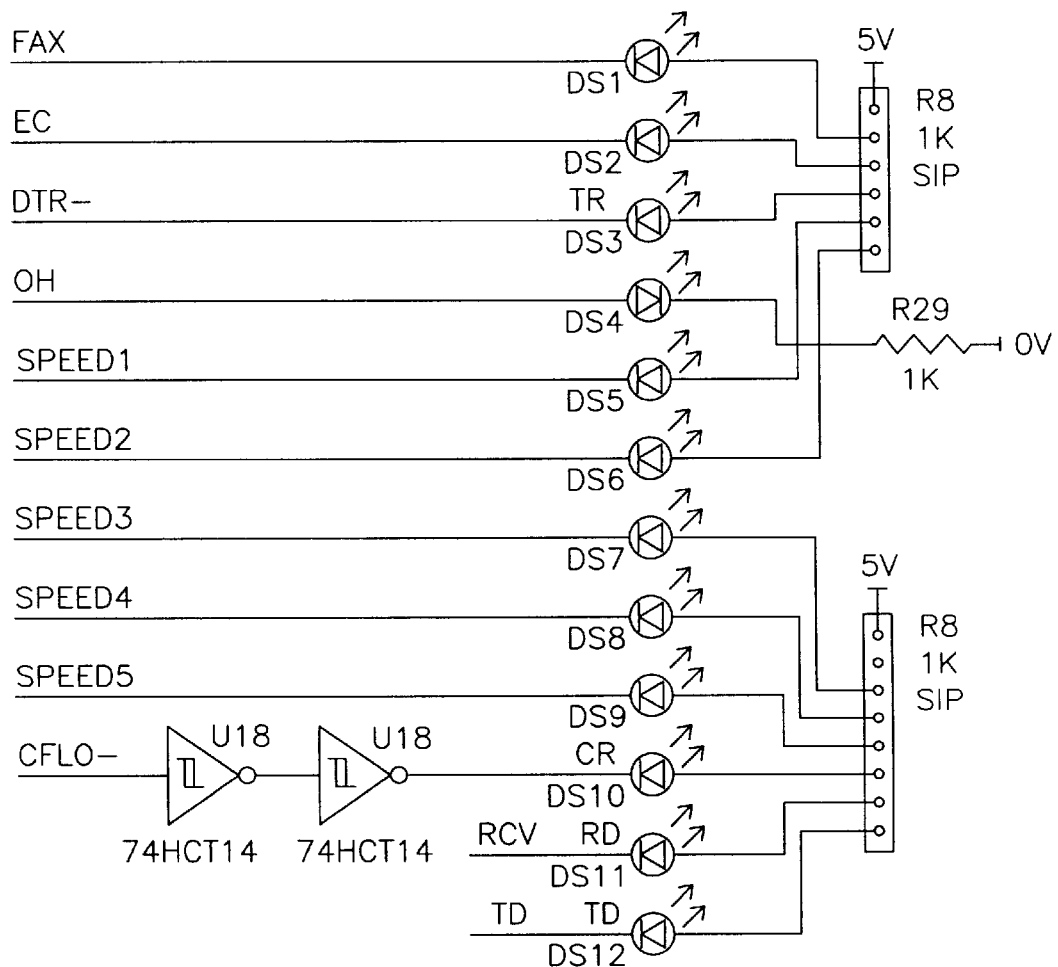

The interface between the main controller circuit 313 and the personal computer is through SIO circuit 314 and RS232 serial interface 315. These interfaces are described more fully in conjunction with the detailed electrical schematic diagrams of FIG. 6A–6C. RS232 connection J1 is shown on FIG. 6A with the associated control circuit and interface circuitry used to generate and receive the appropriate RS232 standard signals for a serial communications interface with a personal computer. FIG. 6B is a detailed electrical schematic diagram showing the generation of various voltages for powering the hardware components of the electrical schematic diagrams of hardware components 20. The power for the present hardware components is received on connector J5 and controlled by power switch S34. From this circuitry of FIG. 6B, plus and minus 12 volts, plus five volts and minus five volts are derived for operating the various RAM chips, controller chips and support circuitry of the present system. FIG. 6C shows the interconnection of the status LED's found on the front display of the box 20.

Figure 10A:
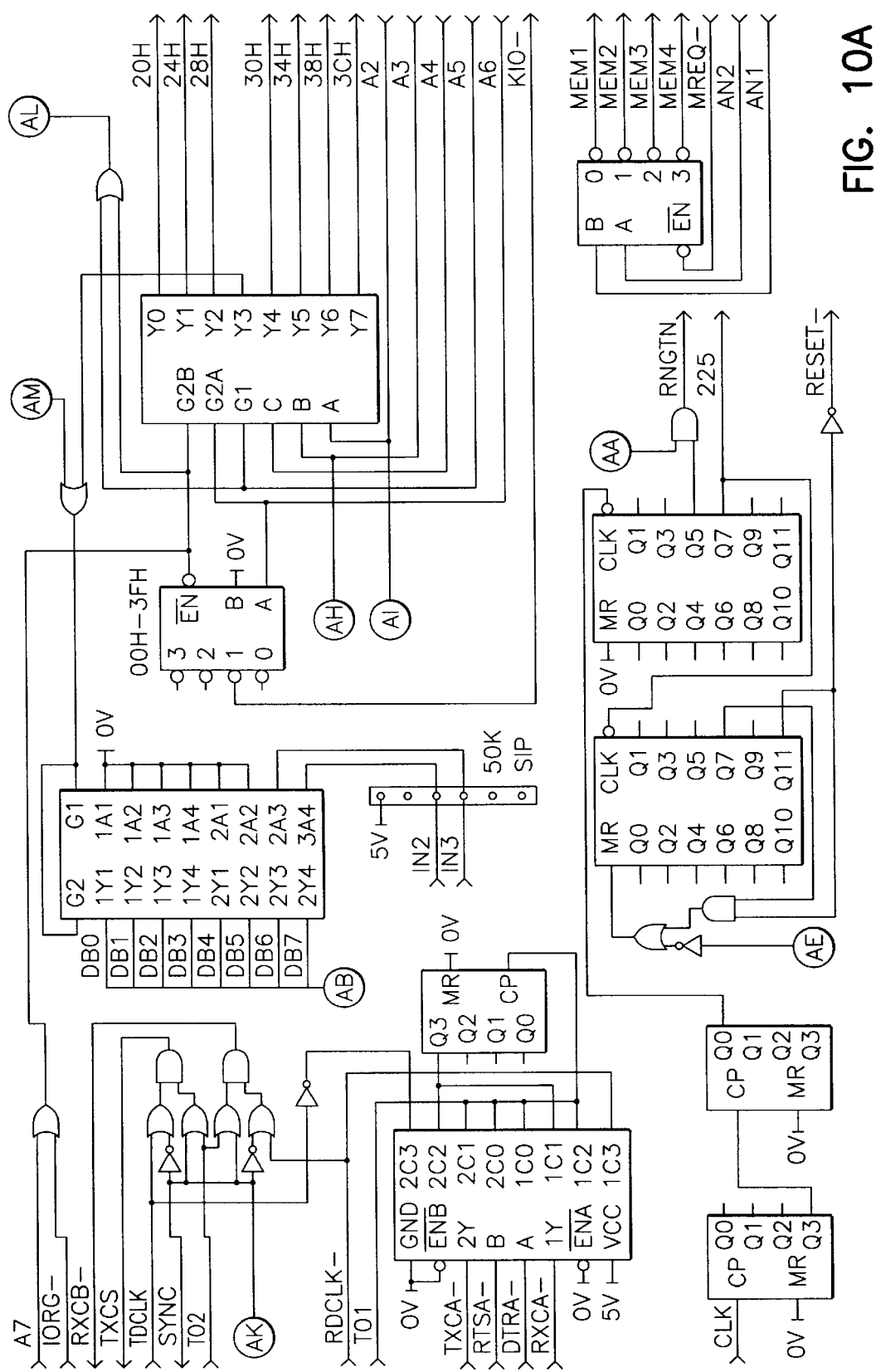
Figure 10B:
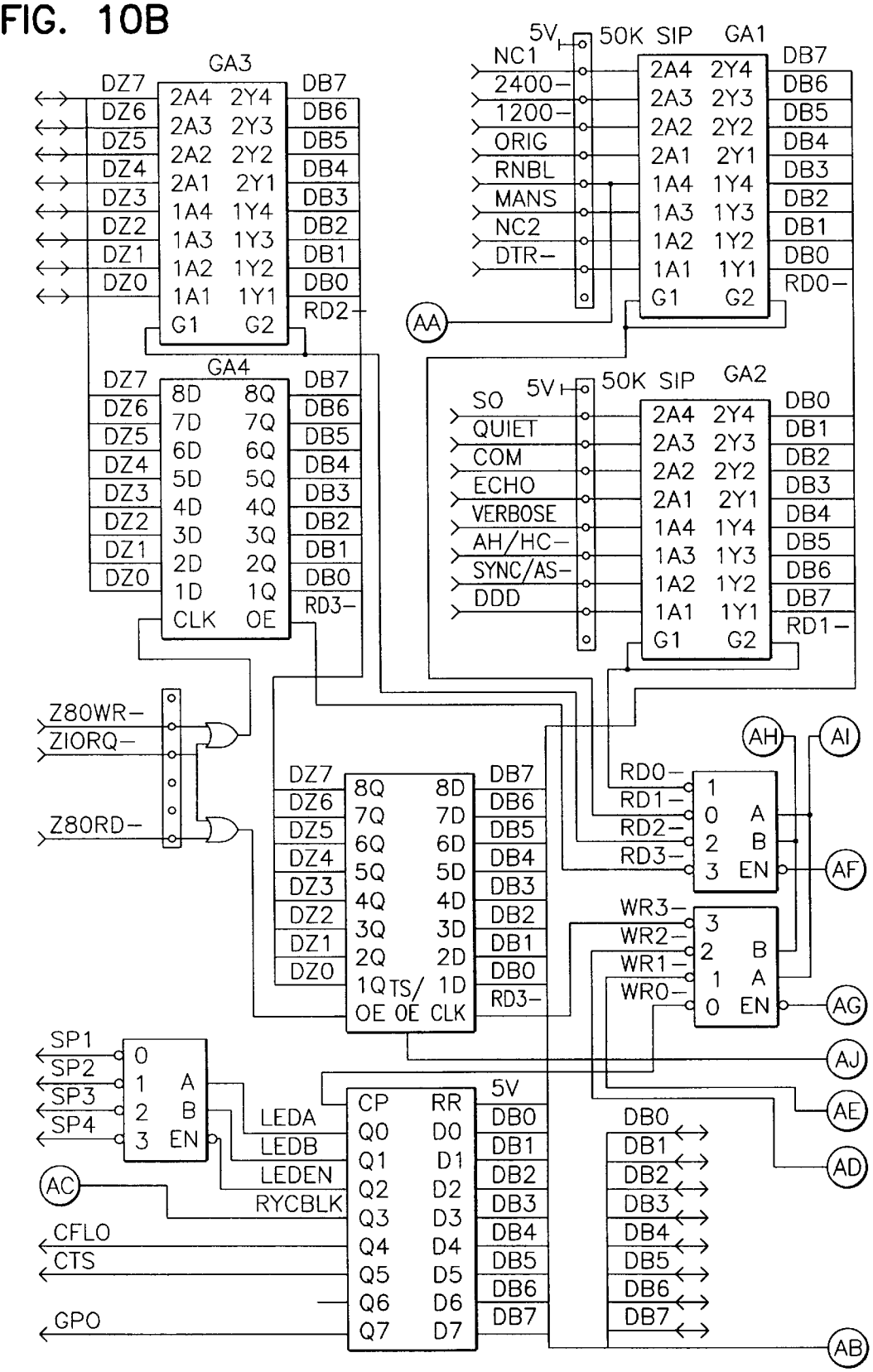
Figure 10C:
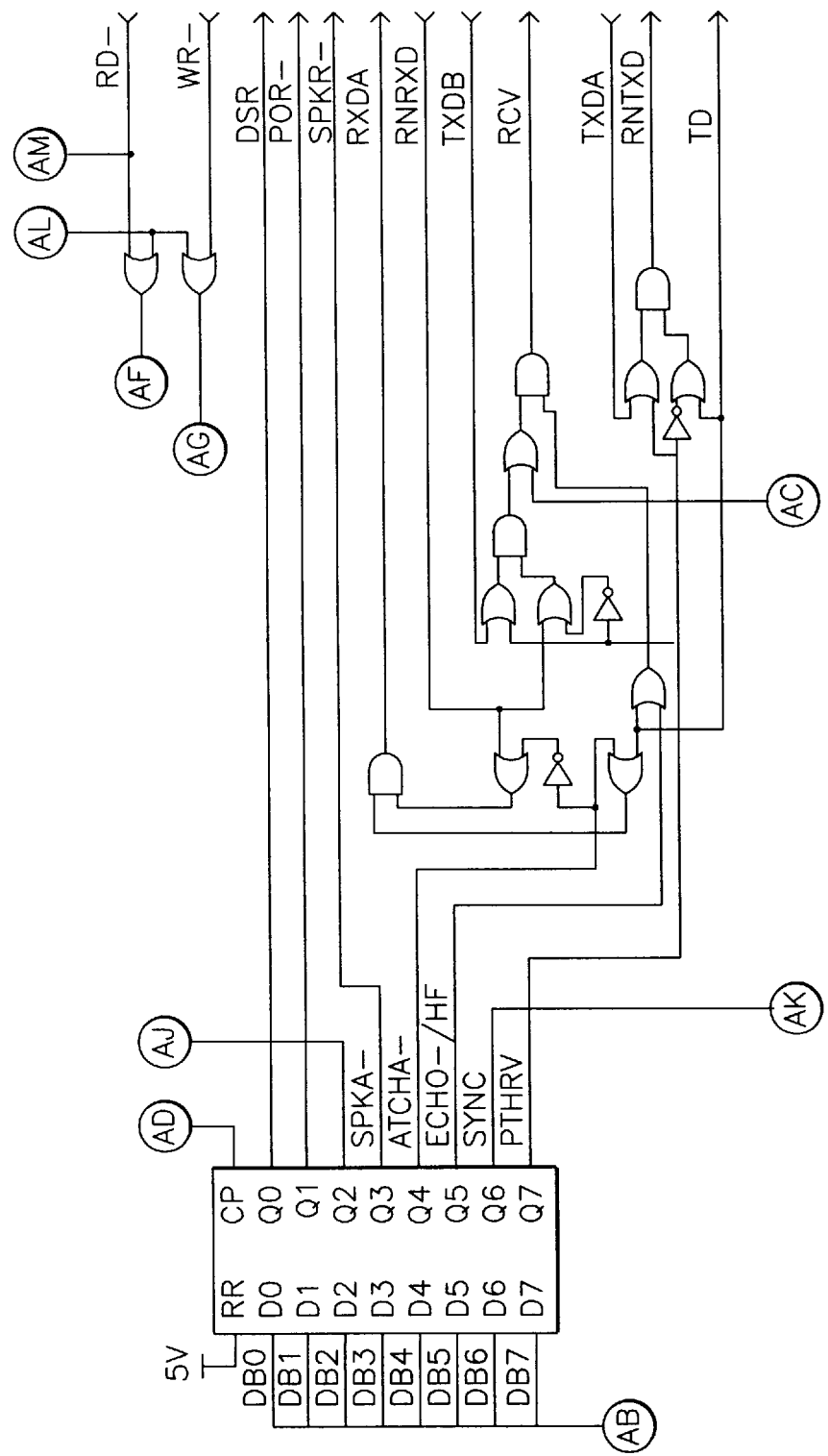

Finally, the "glue logic" used to support various functions in the hardware components 20 are described in conjunction with the detailed electrical schematic diagrams of FIGS. 10A–10C. The connections between FIGS. 10A and 10C and the previous schematic diagrams is made via the labels for each of the lines. For example, the LED status lights are controlled and held active by direct addressing and data control of latches GA1 and GA2. For a more detailed description of the connection of the glue logic of FIGS. 10A–10C, the gate array U19 is shown connected in FIGS. 5A and 5B.

Packet Protocol Between the PC and the Hardware Component

A special packet protocol is used for communication between the hardware components 20 and the personal computer (PC) 10. The protocol is used for transferring different types of information between the two devices such as the transfer of DATA, VOICE, and QUALIFIED information. The protocol also uses the BREAK as defined in CCITT X.28 as a means to maintain protocol synchronization. A description of this BREAK sequence is also described in the Statutory Invention Registration entitled "ESCAPE METHODS FOR MODEM COMMUNICATIONS", to Timothy D. Gunn filed Jan. 8, 1993, which is hereby incorporated by reference.

The protocol has two modes of operation. One mode is packet mode and the other is stream mode. The protocol allows mixing of different types of information into the data stream without having to physically switch modes of operation. The hardware component 20 will identify the packet received from the computer 10 and perform the appropriate action according to the specifications of the protocol. If it is a data packet, then the controller 313 of hardware component 20 would send it to the data pump circuit 311. If the packet is a voice packet, then the controller 313 of hardware component 20 would distribute that information to the Voice DSP 306. This packet transfer mechanism also works in the reverse, where the controller 313 of hardware component 20 would give different information to the computer 10 without having to switch into different modes. The packet protocol also allows commands to be sent to either the main controller 313 directly or to the Voice DSP 306 for controlling different options without having to enter a command state.

Packet mode is made up of 8 bit asynchronous data and is identified by a beginning synchronization character (01 hex) followed by an ID/LI character and then followed by the information to be sent. In addition to the ID/LI character codes defined below, those skilled in the art will readily recognize that other ID/LI character codes could be defined to allow for additional types of packets such as video data, or alternate voice compression algorithm packets such as Codebook Excited Linear Predictive Coding (CELP) algorithm, GSM, RPE, VSELP, etc.

Stream mode is used when large amounts of one type of packet (VOICE, DATA, or QUALIFIED) is being sent. The transmitter tells the receiver to enter stream mode by a unique command. Thereafter, the transmitter tells the receiver to terminate stream mode by using the BREAK command followed by an "AT" type command. The command used to terminate the stream mode can be a command to enter another type of stream mode or it can be a command to enter back into packet mode.

Currently there are 3 types of packets used: DATA, VOICE, and QUALIFIED. Table 1 shows the common packet parameters used for all three packet types. Table 2 shows the three basic types of packets with the sub-types listed.

TABLE 1

Packet Parameters

1. Asynchronous transfer
2. 8 bits, no parity
3. Maximum packet length of 128 bytes
    - IDentifier byte = 1
    - InFormation = 127

TABLE 1-continued

Packet Parameters

4. SPEED
    - variable from 9600 to 57600
    - default to 19200

TABLE 2

Packet Types

1. Data
2. Voice
3. Qualified:
    a. COMMAND
    b. RESPONSE
    c. STATUS
    d. FLOW CONTROL
    e. BREAK
    f. ACK
    g. NAK
    h. STREAM A Data Packet is shown in Table 1 and is used for normal data transfer between the controller 313 of hardware component 20 and the computer 10 for such things as text, file transfers, binary data and any other type of information presently being sent through modems. All packet transfers begin with a synch character 01 hex (synchronization byte). The Data Packet begins with an ID byte which specifies the packet type and packet length. Table 3 describes the Data Packet byte structure and Table 4 describes the bit structure of the ID byte of the Data Packet. Table 5 is an example of a Data Packet with a byte length of 6. The value of the LI field is the actual length of the data field to follow, not counting the ID byte.

TABLE 3

Data Packet Byte Structure byte 1     = 01h (sync byte)
byte 2     = ID/LI (ID byte/length indicator)
bytes 3–127 = data (depending on LI)

| 01 SYNC | ID LI | data | data | data | data | | data |
|---|---|---|---|---|---|---|---|

TABLE 4

ID Byte of Data Packet

Bit 7 identifies the type of packet
Bits 6–0 contain the LI or length indicator portion of the ID byte

| 7 | 6 | 5 | 4 | 3 | 2 | 1 | 0 |
|---|---|---|---|---|---|---|---|
| 0 | LI (Length Indicator) = 1 to 127 | | | | | | |

TABLE 5

Data Packet Example

LI (length indicator) = 6

| 01 SYNC | 06 ID | data | data | data | data | data | data |
|---|---|---|---|---|---|---|---|

The Voice Packet is used to transfer compressed VOICE messages between the controller 313 of hardware component 20 and the computer 10. The Voice Packet is similar to the Data Packet except for its length which is, in the preferred embodiment, currently fixed at 23 bytes of data. Once again, all packets begin with a synchronization character chosen in the preferred embodiment to be 01 hex (01H). The ID byte of the Voice Packet is completely a zero byte: all bits are set to zero. Table 6 shows the ID byte of the Voice Packet and Table 7 shows the Voice Packet byte structure.

TABLE 6

ID Byte of Voice Packet

| 7 | 6 | 5 | 4 | 3 | 2 | 1 | 0 |
|---|---|---|---|---|---|---|---|
| 0 | LI (Length Indicator) = 0 | | | | | | |

TABLE 7

Voice Packet Byte Structure

LI (length indicator) = 0
23 bytes of data

| 01 SYNC | 00 ID | data | data | data | data | data |
|---|---|---|---|---|---|---|

The Qualified Packet is used to transfer commands and other non-data/voice related information between the controller 313 of hardware component 20 and the computer 10. The various species or types of the Qualified Packets are described below and are listed above in Table 2. Once again, all packets start with a synchronization character chosen in the preferred embodiment to be 01 hex (01H). A Qualified Packet starts with two bytes where the first byte is the ID byte and the second byte is the QUALIFIER type identifier. Table 8 shows the ID byte for the Qualified Packet, Table 9 shows the byte structure of the Qualified Packet and Tables 10–12 list the Qualifier Type byte bit maps for the three types of Qualified Packets.

TABLE 8

ID Byte of Qualified Packet

| 7 | 6 | 5 | 4 | 3 | 2 | 1 | 0 |
|---|---|---|---|---|---|---|---|
| 1 | LI (Length Indicator) = 1 to 127 | | | | | | |

The Length Identifier of the ID byte equals the amount of data which follows including the QUALIFIER byte (QUAL byte+DATA). If LI=1, then the Qualifier Packet contains the Q byte only.

TABLE 9

Qualifier Packet Byte Structure

| 01 SYNC | 85 ID | QUAL BYTE | data | data | data | data |
|---|---|---|---|---|---|---|

The bit maps of the Qualifier Byte (QUAL BYTE) of the Qualified Packet are shown in Tables 10–12. The bit map follows the pattern whereby if the QUAL byte=0, then the command is a break. Also, bit 1 of the QUAL byte designates ack/nak, bit 2 designates flow control and bit 6 designates stream mode command. Table 10 describes the Qualifier Byte of Qualified Packet, Group 1 which are immediate commands. Table 11 describes the Qualifier Byte of Qualified Packet, Group 2 which are stream mode commands in that the command is to stay in the designated mode until a BREAK+INIT command string is sent. Table 12 describes the Qualifier Byte of Qualified Packet, Group 3 which are information or status commands.

TABLE 10

Qualifier Byte of Qualified Packet: Group 1

| 7 | 6 | 5 | 4 | 3 | 2 | 1 | 0 | | |
|---|---|---|---|---|---|---|---|---|---|
| x | x | x | x | x | x | x | x | | |
| 0 | 0 | 0 | 0 | 0 | 0 | 0 | 0 | = | break |
| 0 | 0 | 0 | 0 | 0 | 0 | 1 | 0 | = | ACK |
| 0 | 0 | 0 | 0 | 0 | 0 | 1 | 1 | = | NAK |
| 0 | 0 | 0 | 0 | 0 | 1 | 0 | 0 | = | xoff or stop sending data |
| 0 | 0 | 0 | 0 | 0 | 1 | 0 | 1 | = | xon or resume sending data 0 |
| 0 | 0 | 0 | 1 | 0 | 0 | 0 | 0 | = | cancel fax |

TABLE 11

Qualifier Byte of Qualified Packet: Group 2

| 7 | 6 | 5 | 4 | 3 | 2 | 1 | 0 | | |
|---|---|---|---|---|---|---|---|---|---|
| x | x | x | x | x | x | x | x | | |
| 0 | 1 | 0 | 0 | 0 | 0 | 0 | 1 | = | stream command mode |
| 0 | 1 | 0 | 0 | 0 | 0 | 1 | 0 | = | stream data |
| 0 | 1 | 0 | 0 | 0 | 0 | 1 | 1 | = | stream voice |
| 0 | 1 | 0 | 0 | 0 | 1 | 0 | 0 | = | stream video |
| 0 | 1 | 0 | 0 | 0 | 1 | 0 | 1 | = | stream A |
| 0 | 1 | 0 | 0 | 0 | 1 | 1 | 0 | = | stream B |
| 0 | 1 | 0 | 0 | 0 | 1 | 1 | 1 | = | stream C |

The Qualifier Packet indicating stream mode and BREAK attention is used when a large of amount of information is sent (voice, data . . . ) to allow the highest throughput possible. This command is mainly intended for use in DATA mode but can be used in any one of the possible modes. To change from one mode to another, a break-init sequence would be given. A break "AT . . . <cr>" type command would cause a change in state and set the serial rate from the "AT" command.

TABLE 12

Qualifier Byte of Qualified Packet: Group 3

| 7 | 6 | 5 | 4 | 3 | 2 | 1 | 0 | | |
|---|---|---|---|---|---|---|---|---|---|
| x | x | x | x | x | x | x | x | | |
| 1 | 0 | 0 | 0 | 0 | 0 | 0 | 0 | = | commands |
| 1 | 0 | 0 | 0 | 0 | 0 | 0 | 1 | = | responses |
| 1 | 0 | 0 | 0 | 0 | 0 | 1 | 0 | = | status |

Cellular Supervisory Packet

In order to determine the status of the cellular link, a supervisory packet shown in Table 13 is used. Both sides of the cellular link will send the cellular supervisory packet every 3 seconds. Upon receiving the cellular supervisory packet, the receiving side will acknowledge it using the ACK field of the cellular supervisory packet. If the sender does not receive an acknowledgement within one second, it will repeat sending the cellular supervisory packet up to 12 times. After 12 attempts of sending the cellular supervisory packet without an acknowledgement, the sender will disconnect the line. Upon receiving an acknowledgement, the sender will restart its 3 second timer. Those skilled in the art will readily recognize that the timer values and wait times selected here may be varied without departing from the spirit or scope of the present invention.

TABLE 13

Cellular Supervisory Packet Byte Structure

| 8F | ID | LI | ACK | data | data | data |
|----|----|----|-----|------|------|------|

Speech Compression

The Speech Compression algorithm described above for use in transmitting voice over data accomplished via the voice control circuit 306. Referring once again to FIG. 3, the user is talking either through the handset, the headset or the microphone/speaker telephone interface. The analog voice signals are received and digitized by the telephone CODEC circuit 305. The digitized voice information is passed from the digital telephone CODEC circuit 305 to the voice control circuits 306. The digital signal processor (DSP) of the voice control circuit 306 is programmed to do the voice compression algorithm. The source code programmed into the voice control DSP is in the microfiche appendix of U.S. patent application Ser. No. 08/002,467, filed Jan. 8, 1993 entitled "COMPUTER-BASED MULTIFUNCTION PERSONAL COMMUNICATIONS SYSTEM", which was previously incorporated by reference. The DSP of the voice control circuit 306 compresses the speech and places the compressed digital representations of the speech into special packets described more fully below. As a result of the voice compression algorithm, the compressed voice information is passed to the dual port ram circuit 308 for either forwarding and storage on the disk of the personal computer via the RS232 serial interface or for multiplexing with conventional modem data to be transmitted over the telephone line via the telephone line interface circuit 309 in the voice-over-data mode of operation Show and Tell function 123. The compressed speech bits are multiplexed with data bits using a packet format described below. Three compression rates are described herein which will be called 8 Kbit/sec, 9.6 Kbit/sec and 16 Kbit/sec.

Speech Compression Algorithm

To multiplex high-fidelity speech with digital data and transmit both over the telephone line, a high available bandwidth would normally be required. In he present invention, the analog voice information is digitized into 8-bit PCM data at an 8 KHz sampling rate producing a serial bit stream of 64,000 bps serial data rate. This rate cannot be transmitted over the telephone line. With the Speech Compression algorithm described below, the 64 kbs digital voice data is compressed into a 9500 bps encoding bit stream using a fixed-point (non-floating point) DSP such that the compressed speech can be transmitted over the telephone line multiplexed with asynchronous data. This is accomplished in an efficient manner such that enough machine cycles remain during real time speech compression to allow to allow for echo cancellation in the same fixed-point DSP.

A silence detection function is used to detect quiet intervals in the speech signal which allows the data processor to substitute asynchronous data in lieu of voice data packets over the telephone line to efficiently time multiplex the voice and asynchronous data transmission. The allocation of time for asynchronous data transmission is constantly changing depending on how much silence is on the voice channel.

The voice compression algorithm of the present system relies on a model of human speech which shows that human speech contains redundancy inherent in the voice patterns. Only the incremental innovations (changes) need to be transmitted. The algorithm operates on 128 digitized speech samples (20 milliseconds at 6400 Hz), divides the speech samples into time segments of 32 samples (5 milliseconds) each, and uses predicted coding on each segment. Thus, the input to the algorithm could be either PCM data sampled at 6400 Hz or 8000 Hz. If the sampling is at 8000 Hz, or any other selected sampling rate, the input sample data stream must be decimated from 8000 Hz to 6400 Hz before processing the speech data. At the output, the 6400 Hz PCM signal is interpolated back to 8000 Hz and passed to the CODEC.

With this algorithm, the current segment is predicted as best as possible based on the past recreated segments and a difference signal is determined. The difference values are compared to the stored difference values in a lookup table or code book, and the address of the closest value is sent to the remote site along with the predicted gain and pitch values for each segment. In this fashion, the entire 20 milliseconds of speech can be represented by 190 bits, thus achieving an effective data rate of 9500 bps.

To produce this compression, the present system includes a unique Vector Quantization (VQ) speech compression algorithm designed to provide maximum fidelity with minimum compute power and bandwidth. The VQ algorithm has two major components. The first section reduces the dynamic range of the input speech signal by removing short term and long term redundancies. This reduction is done in the waveform domain, with the synthesized part used as the reference for determining the incremental "new" content. The second section maps the residual signal into a code book optimized for preserving the general spectral shape of the speech signal.

Figure 11:
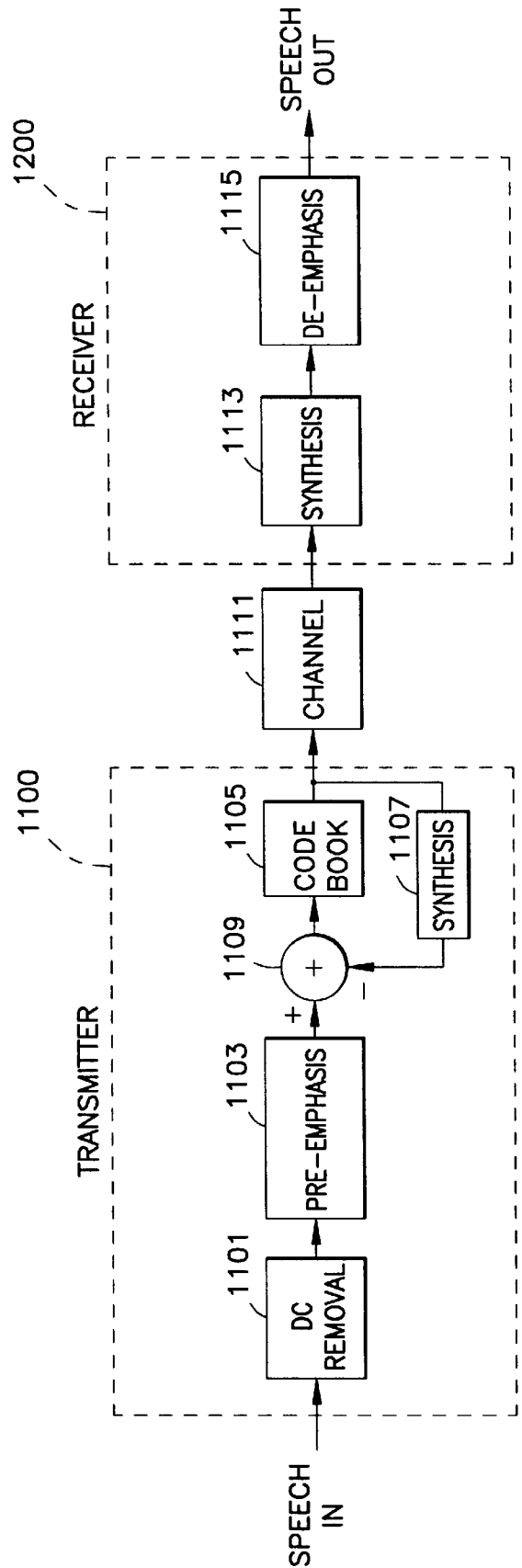
FIG. 11 is a signal flow diagram of the speech compression algorithm.

FIG. 11 is a high level signal flow block diagram of the speech compression algorithm used in the present system to compress the digitized voice for transmission over the telephone line in the voice over data mode of operation or for storage and use on the personal computer. The transmitter and receiver components are implemented using the programmable voice control DSP/CODEC circuit 306 shown in FIG. 3.

The DC removal stage 1101 receives the digitized speech signal and removes the D.C. bias by calculating the long-term average and subtracting it from each sample. This ensures that the digital samples of the speech are centered about a zero mean value. The pre-emphasis stage 1103 whitens the spectral content of the speech signal by balancing the extra energy in the low band with the reduced energy in the high band.

The system finds the innovation in the current speech segment by subtracting 1109 the prediction from reconstructed past samples synthesized from synthesis stage 1107. This process requires the synthesis of the past speech samples locally (analysis by synthesis). The synthesis block 1107 at the transmitter performs the same function as the synthesis block 1113 at the receiver. When the reconstructed previous segment of speech is subtracted from the present segment (before prediction), a difference term is produced in the form of an error signal. This residual error is used to find the best match in the code book 1105. The code book 1105 quantizes the error signal using a code book generated from a representative set of speakers and environments. A minimum mean squared error match is determined in segments. In addition, the code book is designed to provide a quantization error with spectral rolloff (higher quantization error for low frequencies and lower quantization error for higher frequencies). Thus, the quantization noise spectrum in the reconstructed signal will always tend to be smaller than the underlying speech signal.

The following description will specifically explain the algorithm for the 9.6 Kbit/sec compression rate, except where specifically stated otherwise. The discussion is applicable to the other compression rates by substituting the parameter values found in Table 14, below, and by following the special instructions for each calculation provided throughout the discussion.

TABLE 14

Speech Compression Algorithm
Parameters For Three Voice Compression Rates

| Parameter | 16K bit/sec | 9.6K bit/sec | 8K bit/sec |
|---|---|---|---|
| Input Samples (msecs @ 8K sample/sec) (24 msec) | 160 (20 msec) | 160 (20 msec) | 192 |
| Decimated Samples (msec) (24 msec) | 160 (20 msec) @ 8K sample/sec | 128 (20 msec) @ 6.4K sample/sec | 144 @ 6K sample/sec |
| Sub-Block Size | 40 | 32 | 36 |
| Min_Pitch | 40 | 32 | 36 |
| Max_Pitch | 160 | 95 | 99 |
| Codebook Size | 256 | 512 | 512 |
| Vector Size (VSIZE) | 5 | 8 | 9 |
| # of compressed bytes | 40 | 24 | 24 |
| ρ | 0.75 | 0.5 | 0.5 |

9.6 Kbit/sec Compression Rate Algorithm

For the 9.6 Kbit/sec speech compression rate, each frame of 20 ms is divided into 4 sub-blocks or segments of 5 ms each. Each sub-block of data consists of a plurality of bits for the long term predictor, a plurality of bits for the long term predictor gain, a plurality of bits for the sub-block gain, and a plurality of bits for each code book entry for each 5 ms. In the code book block, each 1.25 ms of speech is looked up in a 512 word code book for the best match. The table entry is transmitted rather than the actual samples. The code book entries are pre-computed from representative speech segments, as described more fully below.

On the receiving end 1200, the synthesis block 1113 at the receiver performs the same function as the synthesis block 1107 at the transmitter. The synthesis block 1113 reconstructs the original signal from the voice data packets by using the gain and pitch values and code book address corresponding to the error signal most closely matched in the code book. The code book at the receiver is similar to the code book 1105 in the transmitter. Thus the synthesis block recreates the original pre-emphasized signal. The de-emphasis stage 1115 inverts the pre-emphasis operation by restoring the balance of original speech signal.

The complete speech compression algorithm is summarized as follows:

a) Digitally sample the voice to produce a PCM sample bit stream sampled at 8,000 samples per second.

b) Decimate the 8,000 samples per second sampled data to produce a sampling rate of 6,400 samples per second for the 9.6 Kbit/sec compression rate (6,000 samples per second for the 8 Kbit/sec algorithm and 8,000 samples per second for the 16 Kbit/sec algorithm).

c) Remove any D.C. bias in the speech signal.

d) Pre-emphasize the signal.

e) Find the innovation in the current speech segment by subtracting the prediction from reconstructed past samples. This step requires the synthesis of the past speech samples locally (analysis by synthesis) such that the residual error is fed back into the system.

f) Quantize the error signal using a code book generated from a representative set of speakers and environments. A minimum mean squared error match is determined in 5 ms segments. In addition, the code book is designed to provide a quantization error with spectral rolloff (higher quantization error for low frequencies and lower quantization error for higher frequencies). Thus, the quantization noise spectrum in the reconstructed signal will always tend to be smaller than the underlying speech signal.

g) At the transmitter and the receiver, reconstruct the speech from the quantized error signal fed into the inverse of the function in step (e) above. Use this signal for analysis by synthesis and for the output to the reconstruction stage below.

h) Use a de-emphasis filter to reconstruct the output.

The major advantages of this approach over other low-bit-rate algorithms are that there is no need for any complicated calculation of reflection coefficients (no matrix inverse or lattice filter computations). Also, the quantization noise in the output speech is hidden under the speech signal and there are no pitch tracking artifacts: the speech sounds "natural", with only minor increases of background hiss at lower bit-rates. The computational load is reduced significantly compared to a VSELP algorithm and variations of the present algorithm thus provides bit rates of 8, 9.6 and 16 Kbit/sec, and can also provide bit rates of 9.2 Kbit/sec, 9.5 Kbit/sec and many other rates. The total delay through the analysis section is less than 20 milliseconds in the 9.6 Kbit/sec embodiment. The present algorithm is accomplished completely in the waveform domain and there is no spectral information being computed and there is no filter computations needed.

Detailed Description of the Speech Compression Algorithm

The speech compression algorithm is described in greater detail with reference to FIGS. 12 through 15, and with reference to the block diagram of the hardware components of the present system shown at FIG. 3. The voice compression algorithm operates within the programmed control of the voice control DSP circuit 306. In operation, the speech or analog voice signal is received through the telephone interface 301, 302 or 303 and is digitized by the digital telephone CODEC circuit 305. The CODEC for circuit 305 is a companding μ-law CODEC. The analog voice signal from the telephone interface is band-limited to about 3,000 Hz and sampled at a selected sampling rate by digital telephone CODEC 305. The sample rates in the 9.6 Kbit/sec embodiment of the present invention are 8 Ksample/sec. Each sample is encoded into 8-bit PCM data producing a serial 64 kb/s. The digitized samples are passed to the voice control DSP/CODEC of circuit 306. There, the 8-bit μ-law PCM data is converted to 13-bit linear PCM data. The 13-bit representation is necessary to accurately represent the linear version of the logarithmic 8-bit μ-law PCM data. With linear PCM data, simpler mathematics may be performed on the PCM data.

The voice control DSP/CODEC of circuit 306 correspond to the single integrated circuit U8 shown in FIGS. 9A and 9B as a WE® DSP16C Digital Signal Processor/CODEC from AT&T Microelectronics which is a combined digital signal processor and a linear CODEC in a single chip as described above. The digital telephone CODEC of circuit 305 corresponds to integrated circuit U12 shown in FIG. 9B as a T7540 companding μ-law CODEC.

The sampled and digitized PCM voice signals from the telephone μ-law CODEC 305 shown in FIG. 3 are passed to the voice control DSP/CODEC circuit 308 via direct data lines clocked and synchronized to a clocking frequency. The sample rate in CODEC 305 in this embodiment of the present invention is 8 Ksample/sec. The digital samples are loaded into the voice control DSP/CODEC one at a time through the serial input and stored into an internal queue held in RAM, converted to linear PCM data and decimated to a sample rate of 6.4 Ksample/sec. As the samples are loaded into the end of the queue in the RAM of the voice control DSP, the samples at the head of the queue are operated upon by the voice compression algorithm. The voice compression algorithm then produces a greatly compressed representation of the speech signals in a digital packet form. The compressed speech signal packets are then passed to the dual port RAM circuit 308 shown in FIG. 3 for use by the main controller circuit 313 for either transferring in the voice-over-data mode of operation or for transfer to the personal computer for storage as compressed voice for functions such as telephone answering machine message data, for use in the multi-media documents and the like.

In the voice-over-data mode of operation, voice control DSP/CODEC circuit 306 of FIG. 3 will be receiving digital voice PCM data from the digital telephone CODEC circuit 305, compressing it and transferring it to dual port RAM circuit 308 for multiplexing and transfer over the telephone line. This is the transmit mode of operation of the voice control DSP/CODEC circuit 306 corresponding to transmitter block 1100 of FIG. 11 and corresponding to the compression algorithm of FIG. 12.

Concurrent with this transmit operation, the voice control DSP/CODEC circuit 306 is receiving compressed voice data packets from dual port RAM circuit 308, uncompressing the voice data and transferring the uncompressed and reconstructed digital PCM voice data to the digital telephone CODEC 305 for digital to analog conversion and eventual transfer to the user through the telephone interface 301, 302, 304. This is the receive mode of operation of the voice control DSP/CODEC circuit 306 corresponding to receiver block 1200 of FIG. 11 and corresponding to the decompression algorithm of FIG. 13. Thus, the voice-control DSP/CODEC circuit 306 is processing the voice data in both directions in a full-duplex fashion.

The voice control DSP/CODEC circuit 306 operates at a clock frequency of approximately 24.576 MHz while processing data at sampling rates of approximately 8 KHz in both directions. The voice compression/decompression algorithms and packetization of the voice data is accomplished in a quick and efficient fashion to ensure that all processing is done in real-time without loss of voice information. This is accomplished in an efficient manner such that enough machine cycles remain in the voice control DSP circuit 306 during real time speech compression to allow real time acoustic and line echo cancellation in the same fixed-point DSP.

In programmed operation, the availability of an eight-bit sample of PCM voice data from the μ-law digital telephone CODEC circuit 305 causes an interrupt in the voice control DSP/CODEC circuit 306 where the sample is loaded into internal registers for processing. Once loaded into an internal register it is transferred to a RAM address which holds a queue of samples. The queued PCM digital voice samples are converted from 8-bit μ-law data to a 13-bit linear data format using table lookup for the conversion. Those skilled in the art will readily recognize that the digital telephone CODEC circuit 305 could also be a linear CODEC.

Sample Rate Decimation

The sampled and digitized PCM voice signals from the telephone μ-law CODEC 305 shown in FIG. 3 are passed to the voice control DSP/CODEC circuit 308 via direct data lines clocked and synchronized to a clocking frequency. The sample rate in this embodiment of the present invention is 8 Ksample/sec. The digital samples for the 9.6 Kbit/sec and 8 Kbit/sec algorithms are decimated using a digital decimation process to produce a 6.4 Ksample/sec and 6 Ksample/sec rate, respectively. For the 16 Kbit/sec algorithm, no decimation is needed.

Referring to FIG. 11, the decimated digital samples are shown as speech entering the transmitter block 1100. The transmitter block, of course, is the mode of operation of the voice-control DSP/CODEC circuit 306 operating to receive local digitized voice information, compress it and packetize it for transfer to the main controller circuit 313 for transmission on the telephone line. The telephone line connected to telephone line interface 309 of FIG. 3 corresponds to the channel 1111 of FIG. 11.

A frame rate for the voice compression algorithm is 20 milliseconds of speech for each compression. This correlates to 128 samples to process per frame for the 6.4 K decimated sampling rate. When 128 samples are accumulated in the queue of the internal DSP RAM, the compression of that sample frame is begun.

Data Flow Description

The voice-control DSP/CODEC circuit 306 is programmed to first remove the DC component 1101 of the incoming speech. The DC removal is an adaptive function to establish a center base line on the voice signal by digitally adjusting the values of the PCM data. This corresponds to the DC removal stage 1203 of the software flow chart of FIG. 12. The formula for removal of the DC bias or drift is as follows:

$$x(n) = s(n) - s(n-1) + \alpha * x(n-1) \text{ where } \alpha = \frac{32735}{32768}$$

and where
 n=sample number,
 s(n) is the current sample, and
 x(n) is the sample with the DC bias removed.

The removal of the DC is for the 20 millisecond frame of voice which amounts to 128 samples at the 6.4 Ksample/sec decimated sampling rate which corresponds to the 9.6 Kbit/sec algorithm. The selection of α is based on empirical observation to provide the best result.

Figure 12:
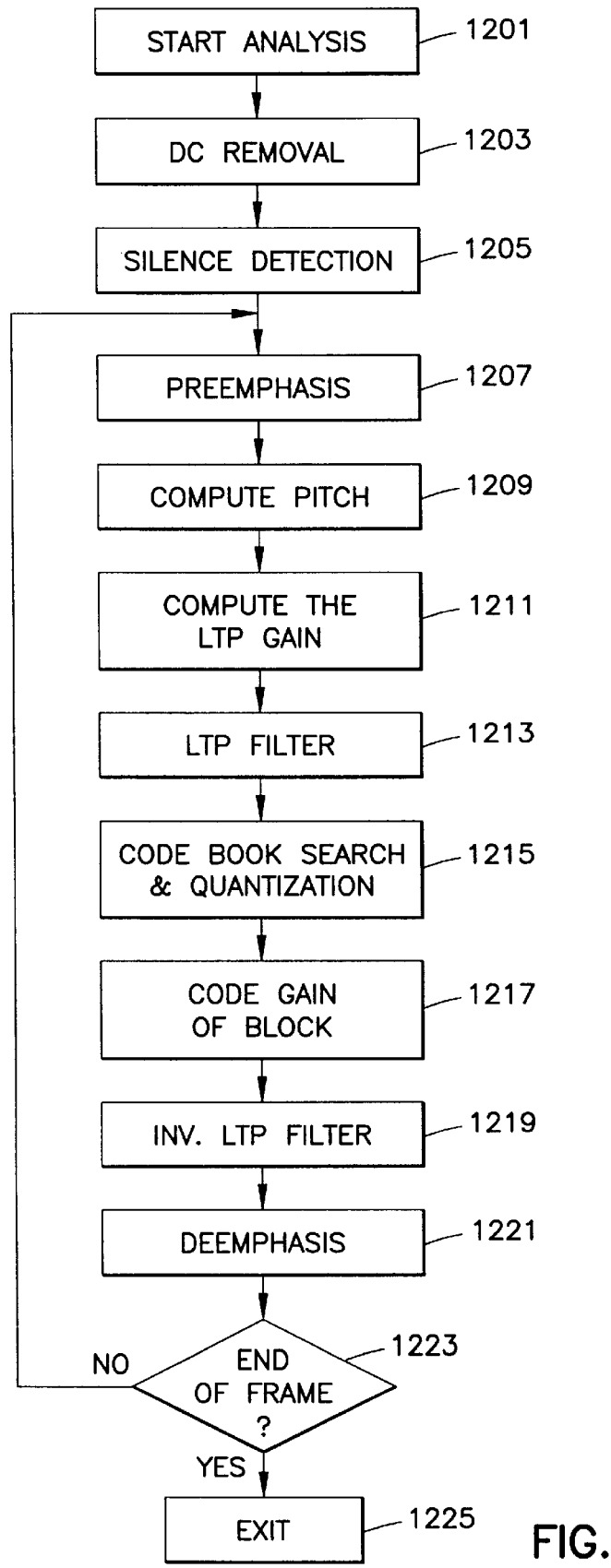
FIG. 12 is a detailed function flow diagram of the speech compression algorithm.
Figure 13:
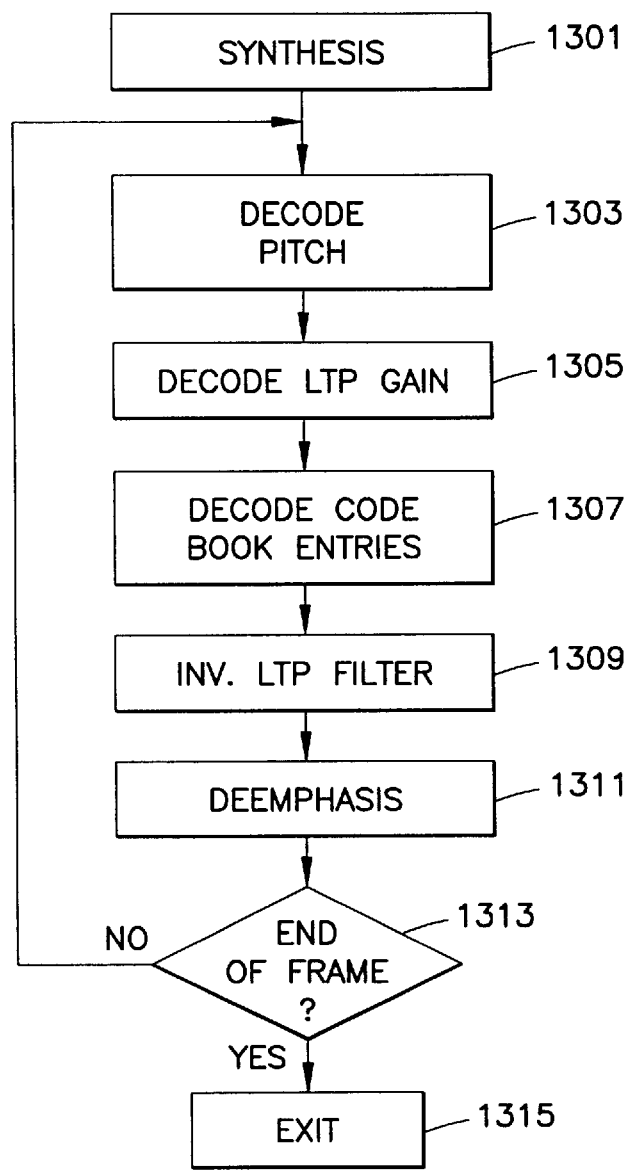
FIG. 13 is a detailed function flow diagram of the speech decompression algorithm.
Figure 14:
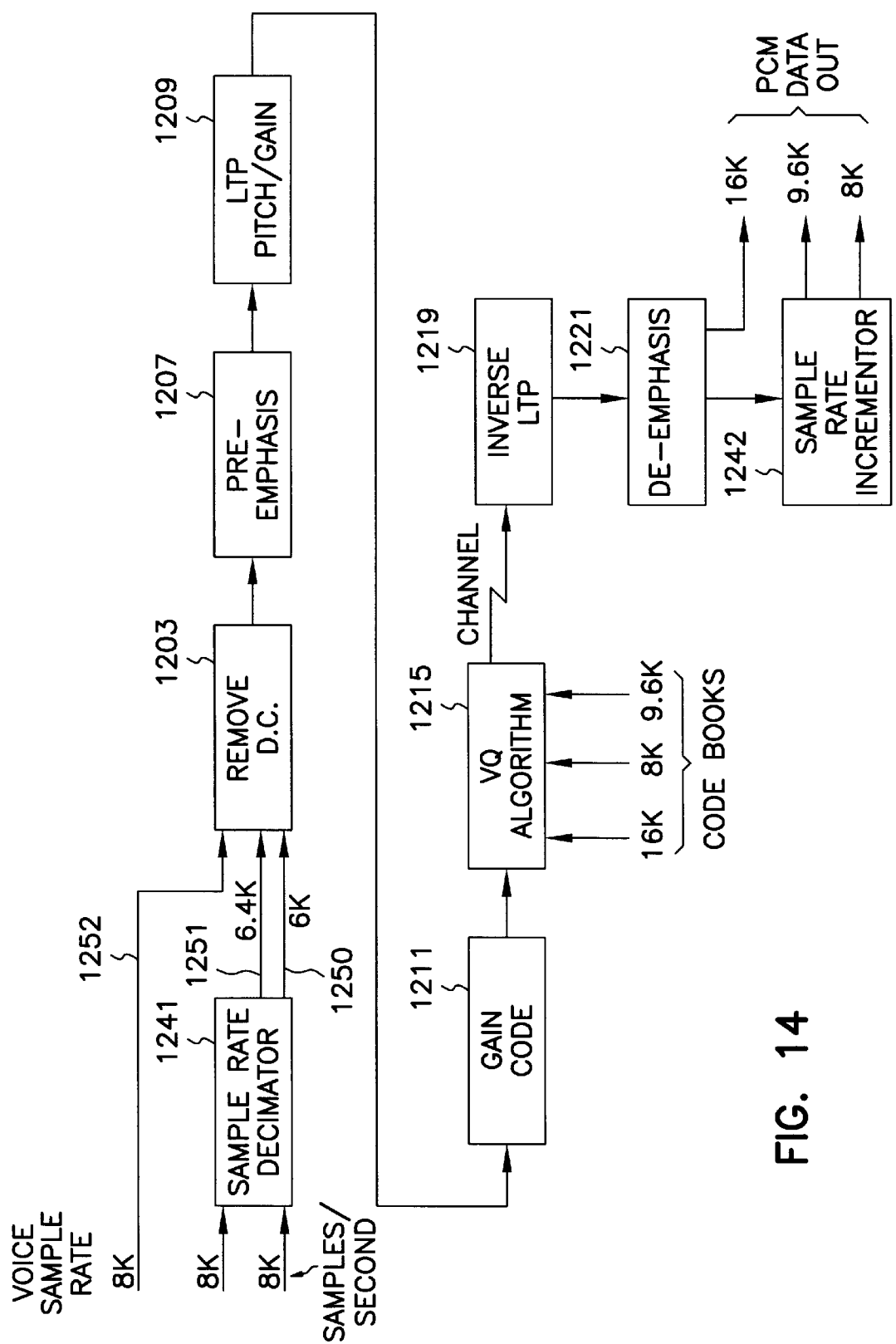
FIG. 14 is a signal flow diagram of the speech compression algorithm showing details of the code book synthesis.

Referring again to FIG. 12, the voice compression algorithm in a control flow diagram is shown which will assist in the understanding of the block diagram of FIG. 11. FIG. 14 is a simplified data flow description of the flow chart of FIG. 12 showing the sample rate decimator 1241 and the sample rate incrementor 1242. Sample rate decimator 1241 produces an output 1251 of 6.4 Ksample/sec for an 8 Ksample/sec input in the 9.6 Kbit/sec system. (Similarly, a 6 Ksample/sec output 1250 is produced for the 8 Kbit/sec algorithm, and no decimation is performed on the 8 Ksample/sec voice sample rate 1252 for the 16 Kbit/sec algorithm.) The analysis and compression begin at block 1201 where the 13-bit linear PCM speech samples are accumulated until 128 samples (for the 6.4 Ksample/sec decimated sampling rate) representing 20 milliseconds of voice of one frame of voice is passed to the DC removal portion of code operating within the programmed voice control DSP/CODEC circuit 306. The DC removal portion of the code described above approximates the base line of the frame of voice by using an adaptive DC removal technique.

A silence detection algorithm 1205 is also included in the programmed code of the DSP/CODEC 306. The silence detection function is a summation of the square of each sample of the voice signal over the frame. If the power of the voice frame falls below a preselected threshold, this would indicate a silent frame. The detection of a silence frame of speech is important for later multiplexing of the V-data (voice data) and C-data (asynchronous computer data) described below. During silent portions of the speech, the main controller circuit 313 will transfer conventional digital data (C-data) over the telephone line in lieu of voice data (V-data). The formula for computing the power is $$PWR = \sum_{n=0}^{\text{Sub-Block Size}-1} x(n) * x(n)$$

where
 n is the sample number, and
 x (n) is the sample value

If the power PWR is lower than a preselected threshold, then the present voice frame is flagged as containing silence. The 128-sample (Decimated Samples) silent frame is still processed by the voice compression algorithm; however, the silent frame packets are discarded by the main controller circuit 313 so that asynchronous digital data may be transferred in lieu of voice data. The rest of the voice compression is operated upon in segments where there are four segments per frame amounting to 32 samples of data per segment (Sub-Block Size). It is only the DC removal and silence detection which is accomplished over an entire 20 millisecond frame.

The pre-emphasis 1207 of the voice compression algorithm shown in FIG. 12 is the next step. The sub-blocks are first passed through a pre-emphasis stage which whitens the spectral content of the speech signal by balancing the extra energy in the low band with the reduced energy in the high band. The pre-emphasis essentially flattens the signal by reducing the dynamic range of the signal. By using pre-emphasis to flatten the dynamic range of the signal, less of a signal range is required for compression making the compression algorithm operate more efficiently. The formula for the pre-emphasis is:

$$x(n)=x(n)-\rho*x(n-1)$$

where ρ=0.5 for 9.6 Kbit/sec
and where n is the sample number,
 x (n) is the sample Each segment thus amounts to five milliseconds of voice which is equal to 32 samples. Pre-emphasis then is done on each segment. The selection of ρ is based on empirical observation to provide the best result.

The next step is the long-term prediction (LTP). The long-term prediction is a method to detect the innovation in the voice signal. Since the voice signal contains many redundant voice segments, we can detect these redundancies and only send information about the changes in the signal from one segment to the next. This is accomplished by comparing the speech samples of the current segment on a sample by sample basis to the reconstructed speech samples from the previous segments to obtain the innovation information and an indicator of the error in the prediction.

The long-term predictor gives the pitch and the LTP-Gain of the sub-block which are encoded in the transmitted bit stream. In order to predict the pitch in the current segment, we need at least 3 past sub-blocks of reconstructed speech. This gives a pitch value in the range of MIN_PITCH to MAX_PITCH (32 and 95, respectively, as given in Table 14). This value is coded with 6-bits. But, in order to accommodate the compressed data rate within a 9600 bps link, the pitch for segments 0 and 3 is encoded with 6 bits, while the pitch for segments 1 and 2 is encoded with 5 bits. When performing the prediction of the Pitch for segments 1 and 2, the correlation lag is adjusted around the predicted pitch value of the previous segment. This gives us a good chance of predicting the correct pitch for the current segment even though the entire range for prediction is not used. The computations for the long-term correlation lag PITCH and associated LTP-gain factor β j (where j=0, 1, 2, 3 corresponding to each of the four segments of the frame) are done as follows:

For j=min_pitch . . . max_pitch, first perform the following computations between the current speech samples x(n) and the past reconstructed speech samples x'(n)

$$S_{xx'}(j) = \sum_{i=0}^{\text{Sub-Block Size}-1} x(i) * x'(i + \text{MAX\_PITCH} - j)$$

$$S_{x'x'}(j) = \sum_{i=0}^{\text{Sub-Block Size}-1} x'(i + \text{MAX\_PITCH} - j) * x'(i + \text{MAX\_PITCH} - j)$$

The Pitch j is chosen as that which maximizes $$\frac{S_{xx'}^2}{S_{x'x'}}.$$

Since β j is positive, only j with positive $S_{xx'}^2$ is considered.

For the 9.6 Kbit/sec and 8 Kbit/sec embodiments, the Pitch is encoded with different number of bits for each sub-segment, the value of min_pitch and max_pitch (range of the synthesized speech for pitch prediction of the current segment) is computed as follows:

```
if (seg_number = 0 or 3)
{
    min_pitch = MIN_PITCH
    max_pitch = MAX_PITCH
}
if (seg_number = 1 or 2)
{
    min_pitch = prev_pitch – 15
    if (prev_pitch < MIN_PITCH + 15)
        min_pitch = MIN_PITCH
    if (prev_pitch > MAX_PITCH + 15)
        min_pitch = MAX_PITCH – 30
    max_pitch = min_pitch + 30
}
```

(This calculation is not necessary for the 16 Kbit/sec algorithm.) The prev_pitch parameter in the above equation, is the of the pitch of the previous sub-segment. The pitch j is the encoded in 6 bits or 5 bits as:

$$\text{encoded bits} = j - \text{min\_pitch}$$

The LTP-Gain is given by $$\beta = \frac{S_{xx'}(j)}{S_{x'x'}(j)} \text{ for } S_{x'x'}(j) \neq 0$$

The value of the $\beta$ is a normalized quantity between zero and unity for this segment where $\beta$ is an indicator of the correlation between the segments. For example, a perfect sine wave would produce a $\beta$ which would be close to unity since the correlation between the current segments and the previous reconstructed segments should be almost a perfect match so $\beta$ is one. The LTP gain factor is quantized from a LTP Gain Encode Table. This table is characterized in Table 15. The resulting index (bcode) is transmitted to the far end. At the receiver, the LTP Gain Factor is retrieved from Table 16, as follows:

$$\beta_q = \text{dlb\_tab}[\text{b code}]$$

TABLE 15

LTP Gain Encode Table

| $\beta =$ | 0.1 | 0.3 | 0.5 | 0.7 | 0.9 |
|---|---|---|---|---|---|
| bcode = 0 | 1 | 2 | 3 | 4 | 5 |

TABLE 16

LTP Gain Decode Table

| $\beta =$ 0.0 | 0.2 | 0.4 | 0.5 | 0.8 | 1.0 |
|---|---|---|---|---|---|
| bcode = 0 | 1 | 2 | 3 | 4 | 5 |

After the Long-Term Prediction, we pass the signal through a pitch filter to whiten the signal so that all the pitch effects are removed. The pitch filter is given by:

$$e(n) = x(n) - \beta_q * x'(n-j)$$

where
   j is the Lag, and
   $\beta_q$ is the associated Quantized LTP Gain.

Next, the error signal is normalized with respect to the maximum amplitude in the sub-segment for vector-quantization of the error signal. The maximum amplitude in the segment is obtained as follows:

$$G = \text{MAX}\{|e(n)|\}$$

The maximum amplitude (G) is encoded using the Gain Encode Table. This table is characterized in Table 17. The encoded amplitude (gcode) is transmitted to the far end. At the receiver, the maximum amplitude is retrieved from Table 18, as follows:

$$G_q = \text{dlg\_tab}[\text{gcode}]$$

The error signal e(n) is then normalized by $$e(n) = \frac{e(n)}{G_q}$$

TABLE 17

Gain Encode Table

| G = 16 | 32 | 64 | 128 | 256 | 512 | 1024 | 2048 | 4096 | 8192 |
|---|---|---|---|---|---|---|---|---|---|
| 0 (gcode) | 1 | 2 | 3 | 4 | 5 | 6 | 7 | 8 | 9 |

TABLE 18

Gain Decode Table

| G = | 16 | 32 | 64 | 128 | 256 | 512 | 1024 | 2048 | 4096 | 8192 |
|---|---|---|---|---|---|---|---|---|---|---|
| |—| | |—| | |—| | |—| | |—| | |—| | |—| | |—| | |—| | |—| | |—| |
| | 0 | 1 | 2 | 3 | 4 | 5 | 6 | 7 | 8 | 9 |
| (gcode) | | | | | | | | | | |

From the Gain and LTP Gain Encode tables, we can see that we would require 4 bits for gcode and 3 bits for bcode. This results in total of 7 bits for both parameters. In order to reduce the bandwidth of the compressed bit stream, the gcode and bcode parameters are encoded together in 6 bits, as follows:

BGCODE=6*gcode+bcode.

The encoded bits for the G and LTP-Gain ($\beta$) at the receiver can be obtained as follows:

gcode=BGCODE/6 bcode=BGCODE−6*gcode

However, these calculations are needed only for the 8 Kbit/sec and 9.6 Kbit/sec algorithms.

Each segment of 32 samples (Sub-Block Size) is divided into 4 vectors of 8 samples (VSIZE) each. Each vector is compared to the vectors stored in the CodeBook and the Index of the Code Vector that is closest to the signal vector is selected. The CodeBook consists of 512 entries (512 addresses). The index chosen has the least difference according to the following minimization formula:

$$\text{Min} \left\{ \sum_{i=0}^{\text{VSIZE}-1} (x_i - y_i)^2 \right\}$$

where $x_i$=the input vector of VSIZE samples (8 for the 9.6 Kbit/sec algorithm), and $y_i$=the code book vector of VSIZE samples (8 for the 9.6 Kbit/sec algorithm).

The minimization computation, to find the best match between the subsegment and the code book entries is computationally intensive. A brute force comparison may exceed the available machine cycles if real time processing is to be accomplished. Thus, some shorthand processing approaches are taken to reduce the computations required to find the best fit. The above formula can be computed in a shorthand fashion as follows.

By expanding out the above formula, some of the unnecessary terms may be removed and some fixed terms may be pre-computed:

$$\begin{aligned}(x_i - y_i)^2 &= (x_i - y_i)*(x_i - y_i) \\ &= (x_i^2 - x_i y_i - x_i y_i + y_i^2) \\ &= (x_i^2 - 2x_i y_i + y_i^2)\end{aligned}$$

where $x_i^2$ is a constant so it may be dropped from the formula, and the value of $-\frac{1}{2}\Sigma y_i^2$ may be precomputed and stored as the VSIZE+1th value (8+1=9th value for the 9.6 Kbit/sec algorithm) in the code book so that the only real-time computation involved is the following formula:

$$\text{Min} \left\{ \sum_{i=0}^{\text{VSIZE}-1} (x_i y_i) \right\}$$

Thus, for a segment of Sub-Block Size samples (32 for the 9.6 Kbit/sec algorithm), we will transmit Sub-Block Size/ VSIZE CodeBook indices (4 CodeBook Indices, 9 bits each, for the 9.6 Kbit/sec algorithm). Therefore, for the 9.6 Kbit/sec algorithm, for each Sub-Block Size segment we will transmit 36 bits representing that segment.

After the appropriate index into the code book is chosen, the input speech samples are replaced by the corresponding vectors in the chosen indexes. These values are then multiplied by the $G_q$ to denormalize the synthesized error signal, e'(n). This signal is then passed through the Inverse Pitch Filter to reintroduce the Pitch effects that was taken out by the Pitch filter. The Inverse Pitch Filter is performed as follows:

$$y(n)=e'(n)+\beta_q*x'(n-j)$$

where $\beta_q$ is the Quantized LTP-Gain from Table 16, and j is the Lag.

The Inverse Pitch Filter output is used to update the synthesized speech buffer which is used for the analysis of the next sub-segment. The update of the state buffer is as follows:

$$x'(k)=x'(k+\text{MIN\_PITCH})$$

where k=0, . . . , (MAX_PITCH−MIN_PITCH)−1

$$x'(l)=y(n)$$

where l=MAX_PITCH−MIN_PITCH, . . . , MAX_ PITCH−1

The signal is then passed through the deemphasis filter since preemphasis was performed at the beginning of the processing. In the analysis, only the preemphasis state is updated so that we properly satisfy the Analysis-by-Synthesis method of performing the compression. In the Synthesis, the output of the deemphasis filter, s'(n), is passed on to the D/A to generate analog speech. The deemphasis filter is implemented as follows:

$$s'(n)=y(n)+\rho*s'(n-1)$$

where $\rho$=0.5 for the 9.6 Kbit/sec algorithm

The voice is reconstructed at the receiving end of the voice-over data link according to the reverse of the compression algorithm as shown as the decompression algorithm in FIG. 5.

If a silence frame is received, the decompression algorithm simply discards the received frame and initialize the output with zeros. If a speech frame is received, the pitch, LTP-Gain and GAIN are decoded as explained above. The error signal is reconstructed from the codebook indexes, which is then denormalized with respect to the GAIN value.

This signal is then passed through the Inverse filter to generate the reconstructed signal. The Pitch and the LTP-Gain are the decoded values, same as those used in the Analysis. The filtered signal is passed through the Deemphasis filter whose output is passed on to the D/A to put out analog speech.

The compressed frame contains 23 8-bit words and one 6-bit word. Thus a total of 24 words. Total number of bits transferred is 190, which corresponds to 9500 bps as shown in Table 19 (for the 9.6 Kbit/sec algorithm).

For the 9.6 Kbit/sec algorithm, the code book comprises a table of nine columns and 512 rows of floating point data. The first 8 rows correspond to the 8 samples of speech and the ninth entry is the precomputed constant described above as $-\frac{1}{2}\Sigma y_i^2$. An example of the code book data is shown in Table 21 with the complete code book for the 9.6 Kbit/sec algorithm described in Appendix B.

TABLE 19

Compressed Frame Packet for 9.6K bit/sec Algorithm

| 7 | 6 | 5 | 4 | 3 | 2 | 1 | 0 | Bit Number |
|---|---|---|---|---|---|---|---|---|
| S | S | $p_0^5$ | $p_0^4$ | $p_0^3$ | $p_0^2$ | $p_0^1$ | $p_0^0$ | Comp_Frame[0] |
| $V_2^8$ | $V_1^8$ | $V_0^8$ | $p_1^4$ | $p_1^3$ | $p_1^2$ | $p_1^1$ | $p_1^0$ | Comp_Frame[1] |
| $V_5^8$ | $V_4^8$ | $V_3^8$ | $p_2^4$ | $p_2^3$ | $p_2^2$ | $p_2^1$ | $p_2^0$ | Comp_Frame[2] |
| $V_7^8$ | $V_6^8$ | $p_3^5$ | $p_3^4$ | $p_3^3$ | $p_3^2$ | $p_3^1$ | $p_3^0$ | Comp_Frame[3] |
| $V_9^8$ | $V_8^8$ | $BG_0^5$ | $BG_0^4$ | $BG_0^3$ | $BG_0^2$ | $BG_0^1$ | $BG_0^0$ | Comp_Frame[4] |
| $V_{11}^8$ | $V_{10}^8$ | $BG_1^5$ | $BG_1^4$ | $BG_1^3$ | $BG_1^2$ | $BG_1^1$ | $BG_1^0$ | Comp_Frame[5] |
| $V_{13}^8$ | $V_{12}^8$ | $BG_2^5$ | $BG_2^4$ | $BG_2^3$ | $BG_2^2$ | $BG_2^1$ | $BG_2^0$ | Comp_Frame[6] |
| $V_{15}^8$ | $V_{14}^8$ | $BG_3^5$ | $BG_3^4$ | $BG_3^3$ | $BG_3^2$ | $BG_3^1$ | $BG_3^0$ | Comp_Frame[7] |
| $VQ_0^7$ | $VQ_0^6$ | $VQ_0^5$ | $VQ_0^4$ | $VQ_0^3$ | $VQ_0^2$ | $VQ_0^1$ | $VQ_0^0$ | Comp_Frame[8] = LS 8 bits VQ[0] |
| $VQ_1^7$ | $VQ_1^6$ | $VQ_1^5$ | $VQ_1^4$ | $VQ_1^3$ | $VQ_1^2$ | $VQ_1^1$ | $VQ_1^0$ | Comp_Frame[9] = LS 8 bits VQ[1] |
| $VQ_{14}^7$ | $VQ_{14}^6$ | $VQ_{14}^5$ | $VQ_{14}^4$ | $VQ_{14}^3$ | $VQ_{14}^2$ | $VQ_{14}^1$ | $VQ_{14}^0$ | Comp_Frame[22] LS 8 bits VQ[14] |
| $VQ_{15}^7$ | $VQ_{15}^6$ | $VQ_{15}^5$ | $VQ_{15}^4$ | $VQ_{15}^3$ | $VQ_{15}^2$ | $VQ_{15}^1$ | $VQ_{15}^0$ | Comp_Frame[23] LS 8 bits VQ[15] | where BG = Beta/Gain, P = Pitch, VQ = CodeBook Index and S = Spare Bits

Code Book Descriptions

The code books used for the VQ algorithm described above are attached as Appendices A, B and C. Appendix A includes the code book data for the 8 Kbit/sec algorithm, Appendix B includes the code book data for the 9.6 Kbit/sec algorithm and Appendix C includes the code book data for the 16 Kbit/sec algorithm. Table 20 describes the format of the code book for the 9.6 Kbit/sec algorithm. The code book values in the Appendices are stored in a signed floating point format which is converted to a fixed point representation of floating point number when stored in the lookup tables of the present invention. There are 512 entries in each code book corresponding to 512 different speech segments which can be used to encode and reconstruct the speech.

TABLE 20

Code Book Format for the 9.6K bit/sec Algorithm

| ------------- Code Book Entries ------------ | ---- ½ Sum² Constant---- |
|---|---|
| 8 entries | 1 entry |

TABLE 21

Code Book Example for the 9.6K bit/sec Algorithm

| 0.786438 | 1.132875 | 1.208375 | 1.206750 | 1.114250 | 0.937688 | 0.772062 | 0.583250 | 3.93769 |
|---|---|---|---|---|---|---|---|---|
| 0.609667 | 1.019167 | 0.909167 | 0.957750 | 0.999833 | 0.854333 | 1.005667 | 0.911250 | 3.36278 |
| 0.614750 | 1.150750 | 1.477750 | 1.548750 | 1.434750 | 1.304250 | 1.349750 | 1.428250 | 6.95291 |
| 0.657000 | 1.132909 | 1.279909 | 1.204727 | 1.335636 | 1.280818 | 1.162000 | 0.958818 | 5.24933 |
| 0.592429 | 0.897571 | 1.101714 | 1.337286 | 1.323571 | 1.349000 | 1.304857 | 1.347143 | 5.6239 |
| 0.325909 | 0.774182 | 1.035727 | 1.263636 | 1.456455 | 1.356273 | 1.076273 | 0.872818 | 4.628 |

The code books are stored in PROM memory accessible by the Voice DSP as a lookup table. The table data is loaded into local DSP memory upon the selection of the appropriate algorithm to increase access speed. The code books comprise a table of data in which each entry is a sequential address from 000 to 511. For the 9.6 Kbit/sec algorithm, a 9×512 code book is used. For the 16 Kbit/sec algorithm, a 6×256 code book is used and for the 8 Kbit/sec algorithm, a 9×512 code book is used. Depending upon which voice compression quality and compression rate is selected, the corresponding code book is used to encode/decode the speech samples.

Generation of the Code Books

The code books are generated statistically by encoding a wide variety of speech patterns. The code books are generated in a learning mode for the above-described algorithm in which each speech segment which the compression algorithm is first exposed to is placed in the code book until 512 entries are recorded. Then the algorithm is continually fed a variety of speech patterns upon which the code book is adjusted. As new speech segments are encountered, the code book is searched to find the best match. If the error between the observed speech segment and the code book values exceed a predetermined threshold, then the closest speech segment in the code book and the new speech segment is averaged and the new average is placed in the code book in place of the closest match. In this learning mode, the code book is continually adjusted to have the lowest difference ratio between observed speech segment values and code book values. The learning mode of operation may take hours or days of exposure to different speech patterns to adjust the code books to the best fit.

The code books may be exposed to a single person's speech which will result in a code book being tailored to that particular persons method of speaking. For a mass market sale of this product, the speech patterns of a wide variety of speakers of both genders are exposed to the code book learning algorithm for the average fit for a given language. For other languages, it is best to expose the algorithm to speech patterns of only one language such as English or Japanese.

Voice Over Data Packet Protocol

As described above, the present system can transmit voice data and conventional data concurrently by using time multiplex technology. The digitized voice data, called V-data carries the speech information. The conventional data is referred to as C-data. The V-data and C-data multiplex transmission is achieved in two modes at two levels: the transmit and receive modes and data service level and multiplex control level. This operation is shown diagrammatically in FIG. 15.

In transmit mode, the main controller circuit 313 of FIG. 3 operates in the data service level 1505 to collect and buffer data from both the personal computer 10 (through the RS232 port interface 315) and the voice control DSP 306. In multiplex control level 1515, the main controller circuit 313 multiplexes the data and transmits that data out over the phone line 1523. In the receive mode, the main controller circuit 313 operates in the multiplex control level 1515 to de-multiplex the V-data packets and the C-data packets and then operates in the data service level 1505 to deliver the appropriate data packets to the correct destination: the personal computer 10 for the C-data packets or the voice control DSP circuit 306 for V-data.

Transmit Mode

In transmit mode, there are two data buffers, the V-data buffer 1511 and the C-data buffer 1513, implemented in the main controller RAM 316 and maintained by main controller 313. When the voice control DSP circuit 306 engages voice operation, it will send a block of V-data every 20 ms to the main controller circuit 313 through dual port RAM circuit 308. Each V-data block has one sign byte as a header and 24 bytes of V-data.

The sign byte header of the voice packet is transferred every frame from the voice control DSP to the controller 313. The sign byte header contains the sign byte which identifies the contents of the voice packet. The sign byte is defined as follows:

00 hex=the following V-data contains silent sound
01 hex=the following V-data contains speech information If the main controller 313 is in transmit mode for V-data/C-data multiplexing, the main controller circuit 313 operates at the data service level to perform the following tests. When the voice control DSP circuit 306 starts to send the 24-byte V-data packet through the dual port RAM to the main controller circuit 313, the main controller will check the V-data buffer to see if the buffer has room for 24 bytes. If there is sufficient room in the V-data buffer, the main controller will check the sign byte in the header preceding the V-data packet. If the sign byte is equal to one (indicating voice information in the packet), the main controller circuit 313 will put the following 24 bytes of V-data into the V-data buffer and clear the silence counter to zero. Then the main controller 313 sets a flag to request that the V-data be sent by the main controller at the multiplex control level.

If the sign byte is equal to zero (indicating silence in the V-data packet), the main controller circuit 313 will increase the silence counter by 1 and check if the silence counter has reached 5. When the silence counter reaches 5, the main controller circuit 313 will not put the following 24 bytes of V-data into the V-data buffer and will stop increasing the silence counter. By this method, the main controller circuit 313 operating at the service level will only provide non-silence V-data to the multiplex control level, while discarding silence V-data packets and preventing the V-data buffer from being overwritten.

The operation of the main controller circuit 313 in the multiplex control level is to multiplex the V-data and C-data packets and transmit them through the same channel. At this control level, both types of data packets are transmitted by the HDLC protocol in which data is transmitted in synchronous mode and checked by CRC error checking. If a V-data packet is received at the remote end with a bad CRC, it is discarded since 100% accuracy of the voice channel is not ensured. If the V-data packets were re-sent in the event of corruption, the real-time quality of the voice transmission would be lost. In addition, the C-data is transmitted following a modem data communication protocol such as CCITT V.42.

In order to identify the V-data block to assist the main controller circuit 313 to multiplex the packets for transmission at his level, and to assist the remote site in recognizing and de-multiplexing the data packets, a V-data block is defined which includes a maximum of five V-data packets. The V-data block size and the maximum number of blocks are defined as follows:

The V-data block header=80h;
The V-data block size=24;
The maximum V-data block size=5;

The V-data block has higher priority to be transmitted than C-data to ensure the integrity of the real-time voice transmission. Therefore, the main controller circuit 313 will check the V-data buffer first to determine whether it will transmit V-data or C-data blocks. If V-data buffer has V-data of more than 69 bytes, a transmit block counter is set to 5 and the main controller circuit 313 starts to transmit V-data from the V-data buffer through the data pump circuit 311 onto the telephone line. Since the transmit block counter indicates 5 blocks of V-data will be transmitted in a continuous stream, the transmission will stop either at finish the 115 bytes of V-data or if the V-data buffer is empty. If V-data buffer has V-data with number more than 24 bytes, the transmit block counter is set 1 and starts transmit V-data. data. This means that the main controller circuit will only transmit one block of V-data. If the V-data buffer has V-data with less than 24 bytes, the main controller circuit services the transmission of C-data.

During the transmission of a C-data block, the V-data buffer condition is checked before transmitting the first C-data byte. If the V-data buffer contains more than one V-data packet, the current transmission of the C-data block will be terminated in order to handle the V-data.

Receive Mode

On the receiving end of the telephone line, the main controller circuit 313 operates at the multiplex control level to de-multiplex received data to V-data and C-data. The type of block can be identified by checking the first byte of the incoming data blocks. Before receiving a block of V-data, the main controller circuit 313 will initialize a receive V-data byte counter, a backup pointer and a temporary V-data buffer pointer. The value of the receiver V-data byte counter is 24, the value of the receive block counter is 0 and the backup pointer is set to the same value as the V-data receive buffer pointer. If the received byte is not equal to 80 hex (80h indicating a V-data packet), the receive operation will follow the current modem protocol since the data block must contain C-data. If the received byte is equal to 80h, the main controller circuit 313 operating in receive mode will process the V-data. For a V-data block received, when a byte of V-data is received, the byte of V-data is put into the V-data receive buffer, the temporary buffer pointer is increased by 1 and the receive V-data counter is decreased by 1. If the V-data counter is down to zero, the value of the temporary V-data buffer pointer is copied into the backup pointer buffer. The value of the total V-data counter is added with 24 and the receive V-data counter is reset to 24. The value of the receive block counter is increased by 1. A flag to request service of V-data is then set. If the receive block counter has reached 5, the main controller circuit 313 will not put the incoming V-data into the V-data receive buffer but throw it away. If the total V-data counter has reached its maximum value, the receiver will not put the incoming V-data into the V-data receive buffer but throw it away.

At the end of the block which is indicated by receipt of the CRC check bytes, the main controller circuit 313 operating in the multiplex control level will not check the result of the CRC but instead will check the value of the receive V-data counter. If the value is zero, the check is finished, otherwise the value of the backup pointer is copied back into the current V-data buffer pointer. By this method, the receiver is insured to de-multiplex the V-data from the receiving channel 24 bytes at a time. The main controller circuit 313 operating at the service level in the receive mode will monitor the flag of request service of V-data. If the flag is set, the main controller circuit 313 will get the V-data from the V-data buffer and transmit it to the voice control DSP circuit 306 at a rate of 24 bytes at a time. After sending a block of V-data, it decreases 24 from the value in the total V-data counter.

Negotiation of Voice Compression Rate

The modem hardware component 20 incorporates a modified packet protocol for negotiation of the speech compression rate. A modified supervisory packet is formatted using the same open flag, address, CRC, and closing flag formatting bytes which are found in the CCITT V.42 standard data supervisory packet, as is well known in the industry and as is described in the CCITT Blue Book, volume VIII entitled *Data Communication over the Telephone Network,* 1989 referenced above. In the modified packet protocol embodiment, the set of CCITT standard header bytes (control words) has been extended to include nonstandard control words used to signal transmission of a nonstandard communication command. The use of a nonstandard control word does not conflict with other data communication terminals, for example, when communicating with a non-PCS (Personal Communications System) modem system, since the nonstandard packet will be ignored by a non-PCS system.

Table 22 offers one embodiment of the present invention showing a modified supervisory packet structure. Table 22 omits the CCITT standard formatting bytes: open flag, address, CRC, and closing flag; however, these bytes are described in the CCITT standard. The modified supervisory packet is distinguished from a V.42 standard packet by using a nonstandard control word, such as 80 hex, as the header. The nonstandard control word does not conflict with V.42 standard communications.

TABLE 22

Modified Supervisory Packet Structure

| 80h | ID | LI | ACK | data | data | ----- | data |
|---|---|---|---|---|---|---|---|

The modified supervisory packet is transmitted by the HDLC protocol in which data is transmitted in synchronous mode and checked by CRC error checking. The use of a modified supervisory packet eliminates the need for an escape command sent over the telephone line to interrupt data communications, providing an independent channel for negotiation of the compression rate. The channel may also be used as an alternative means for programming standard communications parameters.

The modified supervisory packet is encoded with different function codes to provide an independent communications channel between hardware components. This provides a means for real time negotiation and programming of the voice compression rate during uninterrupted transmission of voice data and conventional data without the need for conventional escape routines. The modified supervisory packet is encoded with a function code using several embodiments. For example, in one embodiment, the function code is embedded in the packet as one of the data words and is located in a predetermined position. In an alternate embodiment, the supervisory packet header signals a nonstandard supervisory packet and contains the compression rate to be used between the sites. In such an embodiment, for example, a different nonreserved header is assigned to each function code. These embodiments are not limiting and other methods known to those skilled in the art may be employed to encode the function code into the modified supervisory packet.

Referring once again to FIG. 1, a system consisting of PCS modem 20 and data terminal 10 are connected via phone line 30 to a second PCS system comprised of PCS modem 20A and data terminal 10A. Therefore, calling modem 20 initializes communication with receiving modem 20A. In one embodiment of the present invention, a speech compression command is sent via a modified supervisory data packet as the request for speech compression algorithm and ratio negotiation. Encoded in the speech compression command is the particular speech compression algorithm and the speech compression ratio desired by the calling PCM modem 20. Several methods for encoding the speech compression algorithm and compression ratio exist. For example, in embodiments where the function code is embedded in the header byte, the first data byte of the modified supervisory packet could be used to identify the speech compression algorithm using a binary coding scheme (e.g., 00h for Vector Quantization, 01h for CELP+, 02h for VCELP, and 03h for TrueSpeech, etc.). A second data byte could be used to encode the speech compression ratio (e.g., 00h for 9.6 Kbit/sec, 01h for 16 Kbit/sec, 02h for 8 Kbit/sec, etc.). This embodiment of the speech compression command supervisory packet is shown in Table 23.

TABLE 23

Speech Compression Command Supervisory Packet

| 80h | ID | LI | ACK | Algthm | CRatio | data |
|-----|----|----|-----|--------|--------|------|

Alternatively, as stated above, the function code could be stored in a predetermined position of one of the packet data bytes. Other function code encoding embodiments are possible without deviating from the scope and spirit of the present invention and the embodiments offered are not intended to be exclusive or limiting embodiments.

In either case, the receiving PCS modem 20A will recognize the speech compression command and will respond with an acknowledge packet using, for instance, a header byte such as hex 81. The acknowledge packet will alert the calling modem 20 that the speech compression algorithm and speech compression ratio selected are available by use of the ACK field of the supervisory packet shown in Table 23. Receipt of the acknowledge supervisory packet causes the calling modem 20 to transmit subsequent voice over data information according to the selected speech compression algorithm and compression ratio.

The frequency of which the speech compression command supervisory packet is transmitted will vary with the application. For moderate quality voice over data applications, the speech compression algorithm need only be negotiated at the initialization of the phone call. For applications requiring more fidelity, the speech compression command supervisory packet is renegotiated throughout the call to accommodate new parties to the communication which have different speech compression algorithm limitations or to actively tune the speech compression ratio as the quality of the communications link fluctuates.

Other embodiments provide a speech compression command supervisory packet encode varying transmission rates of the speech compression command supervisory packet and different methods of speech compression algorithm and compression ratio negotiation. Additionally, other encoding embodiments to encode the supervisory packet speech compression algorithm and the speech compression ratio may be incorporated without deviating from the scope and spirit of the present invention, and the described embodiments are not exclusive or limiting.

A new supervisory packet may be allocated for use as a means for negotiating multiplexing scheme for the various types of information sent over the communications link. For example, if voice over data mode is employed, there exist several methods for multiplexing the voice and digital data. The multiplexing scheme may be selected by using a modified supervisory packet, called a multiplex supervisory packet, to negotiate the selection of multiplexing scheme.

Similarly, another supervisory packet could be designated for remote control of another hardware device. For example, to control the baud rate or data format of a remote modem, a remote control supervisory packet could be encoded with the necessary selection parameters needed to program the remote device.

Those skilled in the art will readily appreciate that there exist numerous other unidirectional and bidirectional communication and control applications in which the supervisory packet may be used. The examples given are not limiting, but are specific embodiments of the present invention offered for illustrative purposes.

User Interface Description

The hardware components of the present system are designed to be controlled by an external computing device such as a personal computer. As described above, the hardware components of the present system may be controlled through the use of special packets transferred over the serial line interface between the hardware components and the personal computer. Those skilled in the art will readily recognize that the hardware components of the present systems may be practiced independent of the software components of the present systems and that the preferred software description described below is not to be taken in a limiting sense.

The combination of the software components and hardware components described in the present patent application may conveniently be referred to as a Personal Communication System (PCS). The present system provides for the following functions:

1. The control and hands-off operation of a telephone with a built-in speaker and microphone.
2. Allowing the user to create outgoing voice mail messages with a voice editor, and logging incoming voice mail messages with a time and date stamp.
3. Creating queues for outgoing faxes including providing the ability for a user to send faxes from unaware applications through a print command; also allowing the user the user to receive faxes and logging incoming faxes with a time and date stamp.
4. Allowing a user to create multi-media messages with the message composer. The message can contain text, graphics, picture, and sound segments. A queue is created for the outgoing multi-media messages, and any incoming multi-media messages are logged with a time and date stamp.
5. Providing a way for a user to have a simultaneous data and voice connection over a single communication line.
6. Providing terminal emulation by invoking an external terminal emulation program.
7. Providing address book data bases for all outbound calls and queues for the telephone, voice mail, fax manager, multi-media mail and show-and-tell functions. A user may also search through the data base using a dynamic pruning algorithm keyed on order insensitive matches.

Figure 16:
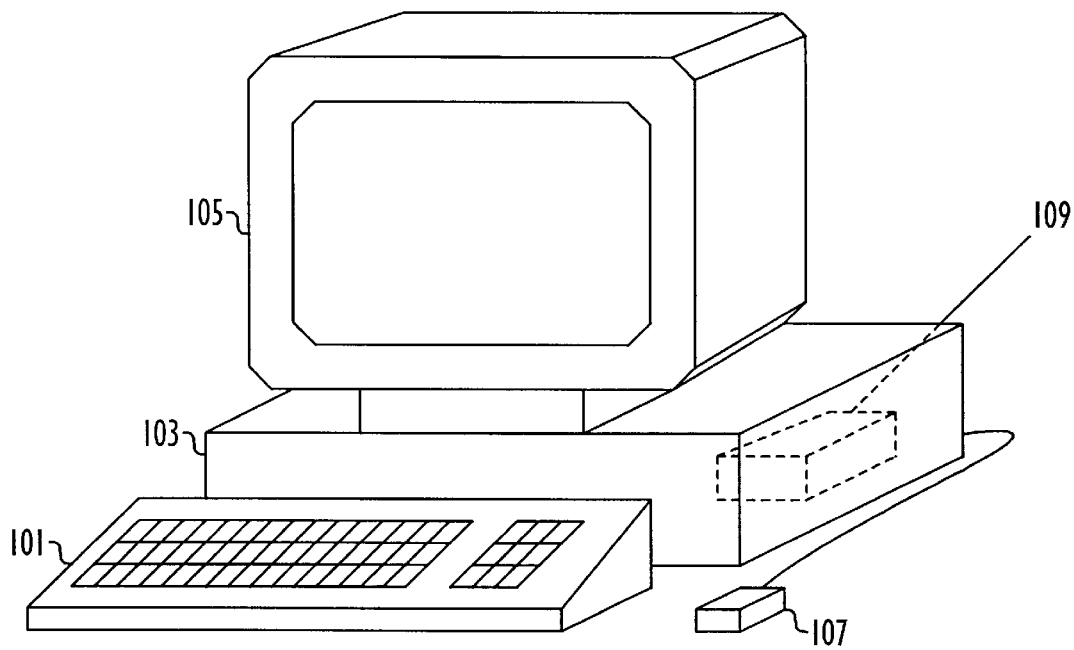
FIG. 16 is a perspective view of the components of a digital computer compatible with the present invention.

FIG. 16 shows the components of a computer system that may be used with the PCS. The computer includes a keyboard 101 by which a user may input data into a system, a computer chassis 103 which holds electrical components and peripherals, a screen display 105 by which information is displayed to the user, and a pointing device 107, typically a mouse, with the system components logically connected to each other via internal system bus within the computer. The PCS software runs on a central processing unit 109 within the computer.

Figure 17:
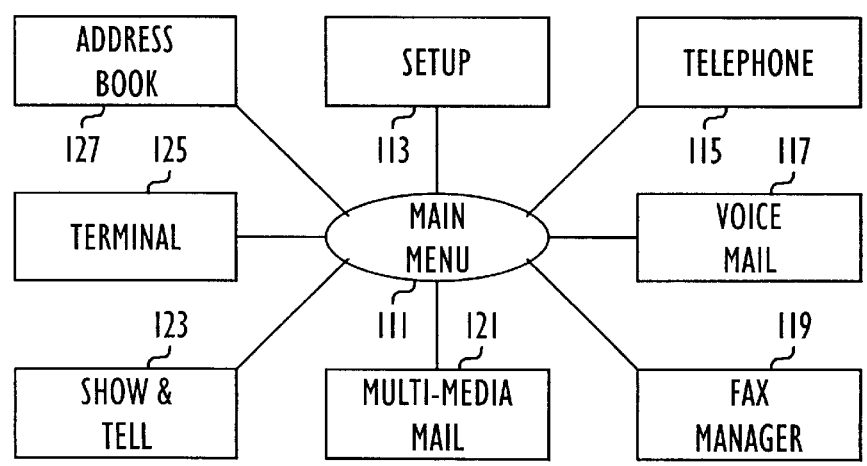
FIG. 17 is a block diagram of the software structure compatible with the present invention.

FIG. 17 reveals the high-level structure of the PCS software. A main menu function 111 is used to select the following subfunctions: setup 113, telephone 115, voice mail 117, fax manager 119, multi-media mail 121, show & tell 123, terminal 125, and address book 127.

The preferred embodiment of the present system currently runs under Microsoft Windows® software running on an IBM® personal computer or compatible. However, it will be recognized that other implementations of the present inventions are possible on other computer systems and windowing software without loss of scope or generality.

Ring-Back for Voice-Over Data Calling

Referring once again to FIG. 1, a system consisting of PCS modem 20 and data terminal 10 are connected via phone line 30 to a second PCS system comprised of PCS modem 20A and data terminal 10A. As described above, while operating in data mode between modems 20 and 20A, the PCS system is transferring data and the telephone or voice-over data mode is inoperable at this time. In order to go into voice-over data mode, the operator of the local PCS system would need to stop the data transfer, invoke the software mode of voice-over data and restart the data transfer.

An additional feature of the present invention is to automatically enable interruption of the data transfer to invoke voice-over data mode so that a telephone connection can be made. In order to do this, the invoking party, at modem 20 for example, needs to alert the called party, at modem 20A for example, so that a voice-over data mode of operation can be invoked. In order to implement such a system, a special data packet called a supervisory packet shown in Table 24 is used. This packet uses a CCITT standard data supervisory packet which has a plurality of reserved or undefined control bits. The use of these reserved packet types should not run afoul of other data communication terminals, for example, when communicating with a non-PCS modem system. The supervisory packet is transmitted by the HDLC protocol in which data is transmitted in synchronous mode and checked by CRC error checking. The use of a supervisory packet eliminates the need for an escape command sent over the telephone line to interrupt data communications.

TABLE 24

Ringdown/Ringback Supervisory Packet Structure

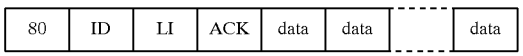

The transmission of the supervisory packet follows the CCITT V.42 standard, as is well known in the industry and as described in the CCITT Blue Book, volume VIII entitled Data Communication over the Telephone Network, 1989. The CCITT V.42 standard is hereby incorporated by The ringdown voice data packet information follows the CCITT V.42 standard, but uses a different header format so the receiving site recognizes the difference between a data packet and a supervisory packet. The supervisory packet is distinguished from a data packet by using undefined bits in the header (80 hex) of the V.42 standard.

The attempted call to the remote PCS modem is initiated at the local site by the user lifting the handset or otherwise taking some action to tell the hardware that a voice over data connection is desired. The alert function may be by a switch on the switch-off of the telephone cradle, an opto-electric sensor near the handset cradle or by a manual switch of button on the PCS modem cabinet. The local alert of the desire to invoke voice-over-data mode causes the generation of a supervisory packet called a ringdown packet to be sent to the remote site.

The supervisory data packet has assigned 80 hex as the ring-down alert. The receiving PCS modem will recognize the ring-down alert and alert the user on the called end of the modem connection by either mimicking a telephone ring, an audible alert or a visual alert. Upon receipt of the ring-down supervisory packet, the called PCS modem will respond with an acknowledge or ringback packet using header hex 81. The acknowledge packet will alert the calling modem that the ring-down was received by use of the ACK field of the supervisory packet shown in Table 24. Receipt of the acknowledge ringback supervisory packet will cause the calling modem to mimic a ring-back tone so that the calling user is aware that the called party's telephone connected to the modem is ringing.

A further supervisory packet assigned 82 hex in the header shown in Table 24 can be used for other status such as an alert that the other party has hung up.

Functional Operation of Ringdown and Ringback Control

In operation, the user at one end lifts the handset to signal the local unit that a voice over data connection is desired. The communication link at this point was previously established and a data transfer mode of operation in is progress. The user hears a ringback tone in the earpiece of the handset, similar to the ringback tone a telephone user would hear when attempting to place a call. In the preferred embodiment of the present invention, the ringback tone is prerecorded, compressed, and stored for later playback to simulate the ringback tone using the recording features of the present invention, described more fully above.

At the called party or remote end, the speaker of the PCS Modem cabinet will simulate a ring or other tone to indicate that a connection is desired. In the preferred embodiment of the present invention, the ring tone is prerecorded, compressed, and stored for later playback to simulate the ring tone using the recording features of the present invention, described more fully above. The connection is completed by the user lifting the handset to complete the transfer from data mode to voice over data mode of operation.

If the called party does not answer on the remote end, a signal is simulated on caller end to indicate no connection was established. Using the voice mail function of the present invention, a prerecorded response could be used to indicate that the called party is unavailable.

Dual Telephone Line Interface

Figure 18:
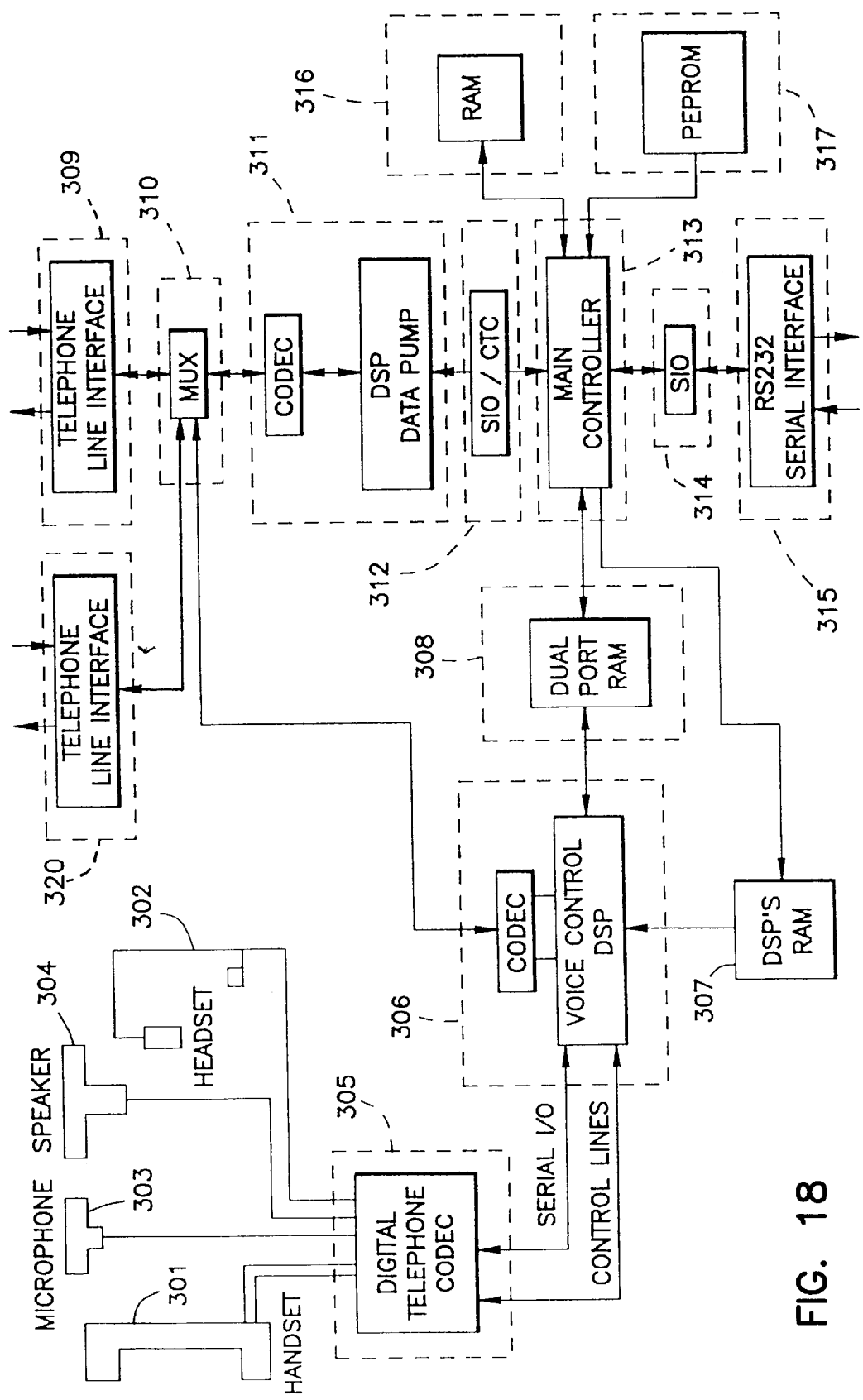
FIG. 18 is a block diagram of the hardware components of the system including a dual telephone line interface.

In a preferred embodiment of the present invention, a second telephone line interface may be added to allow the system to communicate over two telephone lines simultaneously. Referring to FIGS. 3 and 18, telephone line interface 309 of FIG. 3 is duplicated as shown in FIG. 18 to allow a connection to two telephone or communications networks. The second telephone line interface 320 is controlled in a fashion similar to the first telephone line interface 309, as described in greater detail above and in conjunction with the electrical schematic diagrams of FIGS. 5A–10C.

Referring to FIG. 18, data pump circuit 311 includes a digital signal processor (DSP) and a CODEC for communicating over the telephone line interfaces 309 and 320 through MUX circuit 310. The data pump DSP and CODEC of circuit 311 performs functions such as modulation, demodulation and echo cancellation to communicate over the telephone line interfaces 309 and 320 using a plurality of telecommunications standards including FAX and modem protocols.

The main controller circuit 313 controls the DSP data pump circuit 311 through serial input/output and clock timer control (SIO/CTC) circuit 312. The main controller circuit 313 also communicates with the voice control DSP 306 through dual port RAM circuit 308, as described above.

Operational Environment

Figure 19:
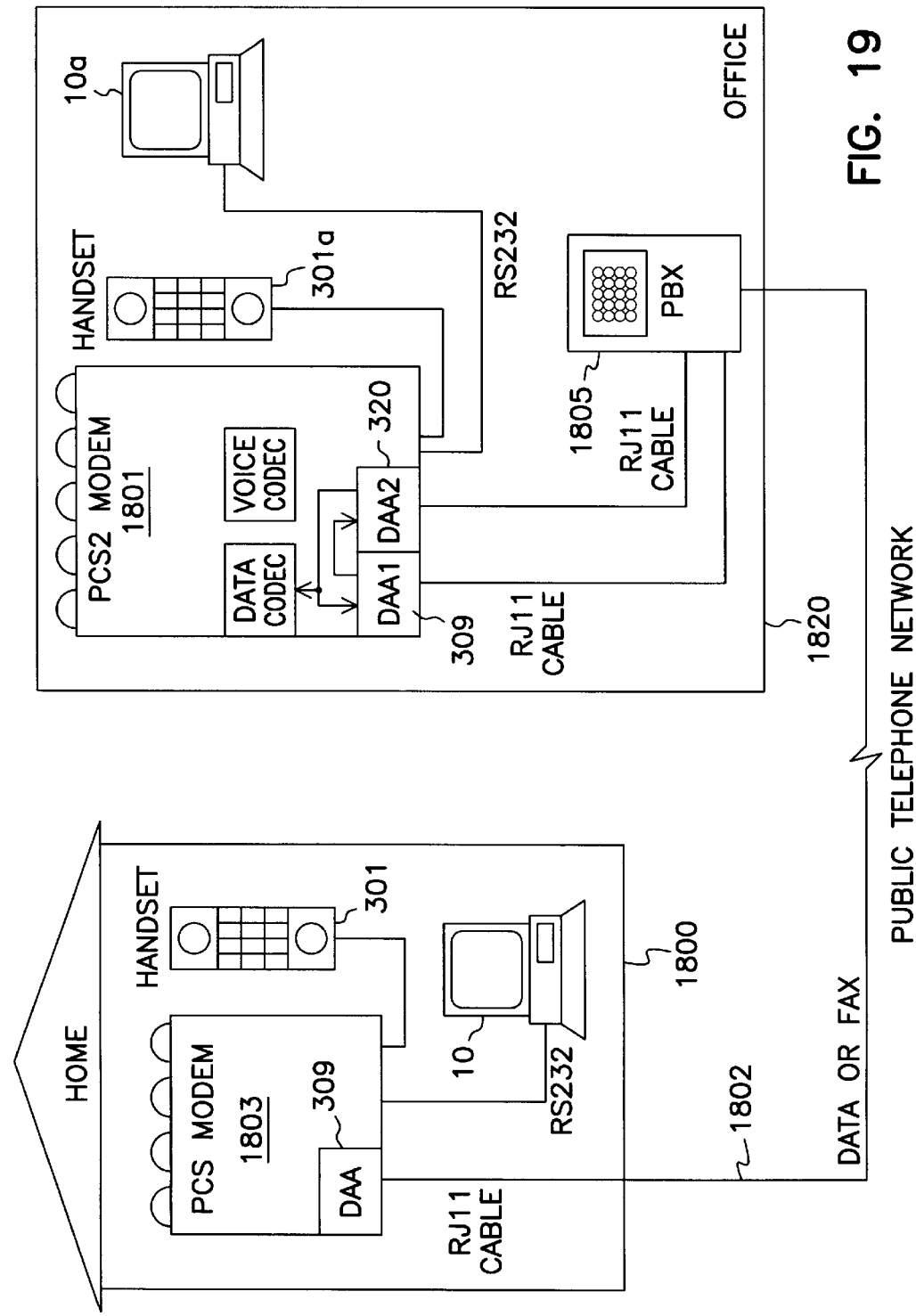
FIG. 19 is a diagram of the telecommunications environment within which the dual telephone interface communication device may serve as an interface between other parties.

FIG. 19 shows a typical communications environment in which the present invention may be used. A computer user may be working at a first location which, for illustrative purposes only, is depicted as his/her home 1800. The personal computer component 10 of the first location 1800 is connected through an RS-232 interface to a PCS modem 20 (as described in conjunction with FIG. 1), which for this embodiment shall be referenced as PCS modem 1803. (The combination of the software components and hardware components described in the present patent application may conveniently be referred to as a Personal Communication System or PCS.) The PCS Modem 1803 is equipped with handset 301 and a single telephone line interface DAA (Data Access Arrangement) 309. The personal computer component 10 functions by executing the software control programs described above and described in U.S. patent application Ser. No. 08/002,467 filed Jan. 8, 1993 entitled "COMPUTER-BASED MULTIFUNCTION PERSONAL COMMUNICATIONS SYSTEM", the complete application of which, including the microfiche appendix, is hereby incorporated by reference.

The PCS modem 1803 communicates with a second location via a telephone line interface through a telco central office. Those skilled in the art will readily recognize that this telephone connection may be a wide variety of connections such as standard POTS connections, trunk line connection (DID, DOD, etc), PBX interface or any number of international telephone line connections. The telephone line connection may also be by direct leased line operating either as an active network or a dead-wire interface.

In the illustration shown in FIG. 19, the preferred embodiment of the present invention communicates between the first location 1800 and the second location 1820 through a PBX 1805 with the second location 1820. The second location 1820 is depicted for illustrative purposes only as a user's office 1820. The computer 10a at the second location 1820 is attached through an RS-232 interface to another PCS Modem 1801 which is equipped with dual telephone line interfaces or dual DAA. Further information on this configuration is given in U.S. patent application Ser. No. 08/161,915, entitled "DUAL PORT INTERFACE FOR A COMPUTER-BASED MULTIFUNCTION PERSONAL COMMUNICATIONS SYSTEM", filed Jan. 8, 1993, which is hereby incorporated by reference. The dual DAA PCS modem 1801 is alternatively referred to as a PCS2 modem 1801. Both the first telephone line interface DAA1 309 and the second telephone line interface DAA2 320 are connected with suitable telephone connections to the office PBX 1805. Those skilled in the art will readily recognize that a wide variety of telephone connection arrangements may be substituted for the PBX connection illustrated in FIG. 19.

The computer equipment 10a of the office location 1820 also functions by executing the software control programs described above. The PCS2 modem 1801 is also equipped with a handset 301a for voice communication. The PCS2 modem 1801 is identical to the PCS modem described above except for the addition of a second DAA circuitry as substantially shown in, and as described in conjunction with, FIG. 17. The use of a dual DAA circuitry allows the PCS2 modem 1801 to dial and connect with a third location.

Functional Operation

The application of the dual DAA technology is typically for conference calling feature and to allow, for example, an employee located at a remote site using a PCS modem 1803 to connect through a dual DAA PCS2 modem 1801 through the employer's PBX system. By use of the employer's PBX, the employee may use the employer's telephone network for connecting anywhere in the world either for voice or data communications.

In a preferred embodiment of the present invention, and in conjunction with the ring-back command packets described above, the employee may switch PCS modem 1803 into a voice-over data mode to effect communication with PSC2 modem 1801 through DAA1 309. PCS2 modem 1801 also controls DAA2 320 to connect the voice portion of the voice over data communication from PCS modem 1803 through the PBX and out to a telephone network connection. In this fashion, the employee at the first location 1800 can maintain the data connection over a single telephone line 1802 to the second location 1820 and still make a telephone call using the handset 301. The connection between the PCS modem 1803 at the first location 1800 and the PCS2 modem 1801 at the second location 1820 through DAA1 309 is a voice over data connection. The connection between DAA2 320 of the PCS2 modem 1801 at the second location 1820 and the public telephone network, connected through PBX 1805, is analog voice only. This voice out DAA2 320 is the voice portion of the voice over data connection between PCS modem 1803 and PCS2 modem 1801.

To invoke the voice-over data connection from PCS modem 1803 through PCS2 modem 1801, a special telephone dialing command such as #*# is entered through the dialing pad of handset 301. The user/employee then enters the telephone number that he/she wishes to dial, which is sent to PCS2 modem 1801 in a supervisory packet. This action causes PCS2 modem 1801 to connect the employee at the first location 1800 to the PBX 1805 for outside line dialing. The employee can connect to remote sites either for data communication or voice communication. Voice-over data communication is also possible when using dual data pumps as described below.

Data Conference Calling

In an alternate embodiment of the present invention, data conferencing is accomplished between the first location 1800 and another site through the PCS2 modem 1801. This mode of operation of the PCS modem system using a dual DAA PCS2 modem 1801 can also be used for voice or data conference calling. A voice-over data connection could be established through the employer's PBX 1805 via PCS2 modem 1801 to share data and voice over data with a plurality of other remote users. PCS2 modem 1801 may also be connected to a local area network for direct data communication or voice-over data communication to other modems and nodes on the network running under a Novell Netware. In this fashion, data conferencing such as broadcast of information, voice-over data conferencing or voice-only conferencing could be established through the PCS2 modem 1801 without breaking the data connection between PCS modem 1803 and PCS2 modem 1801.

Figure 20:
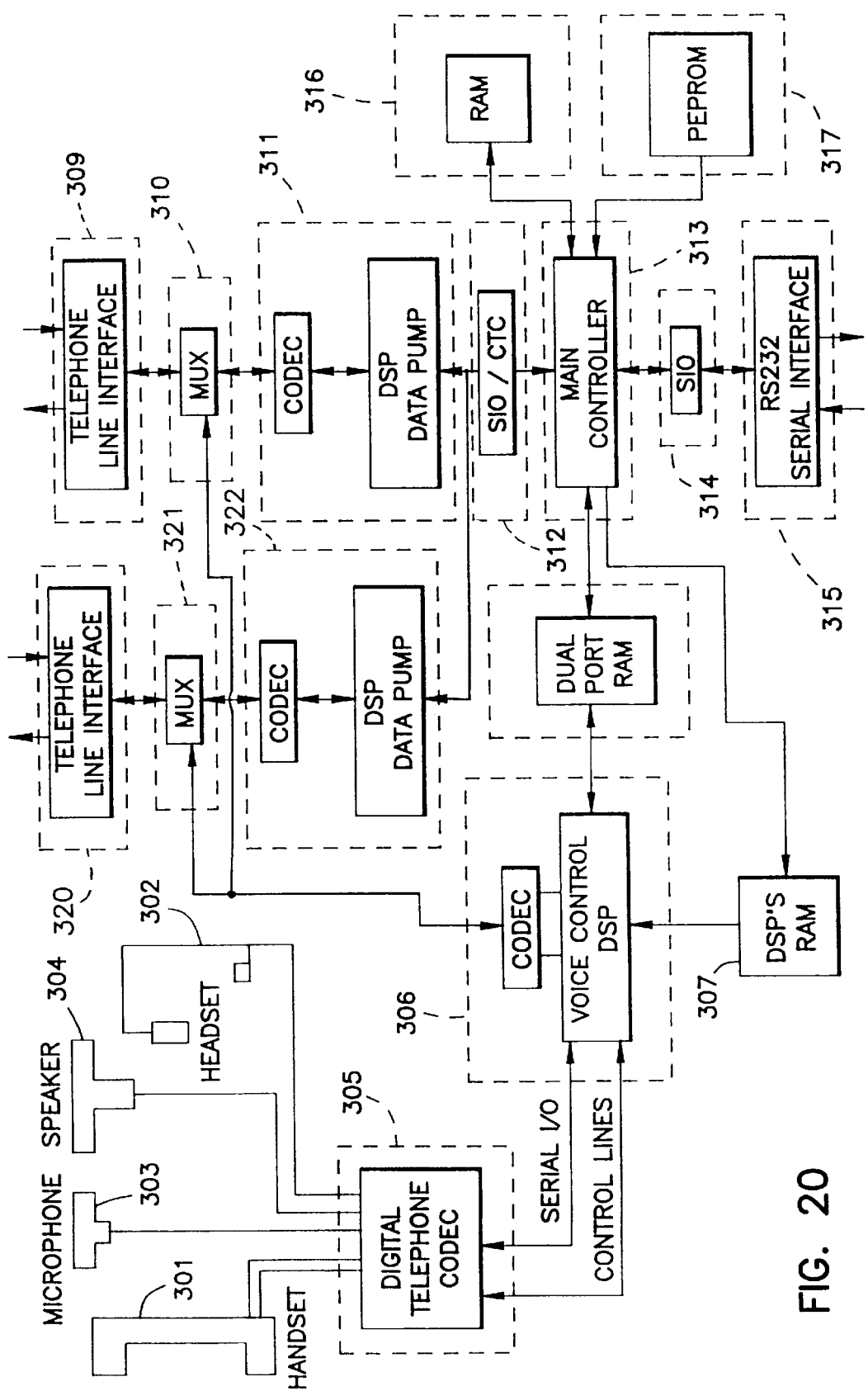
FIG. 20 is a block diagram of the hardware components of the system including dual data pumps and dual telephone line interfaces.
Figure 21:
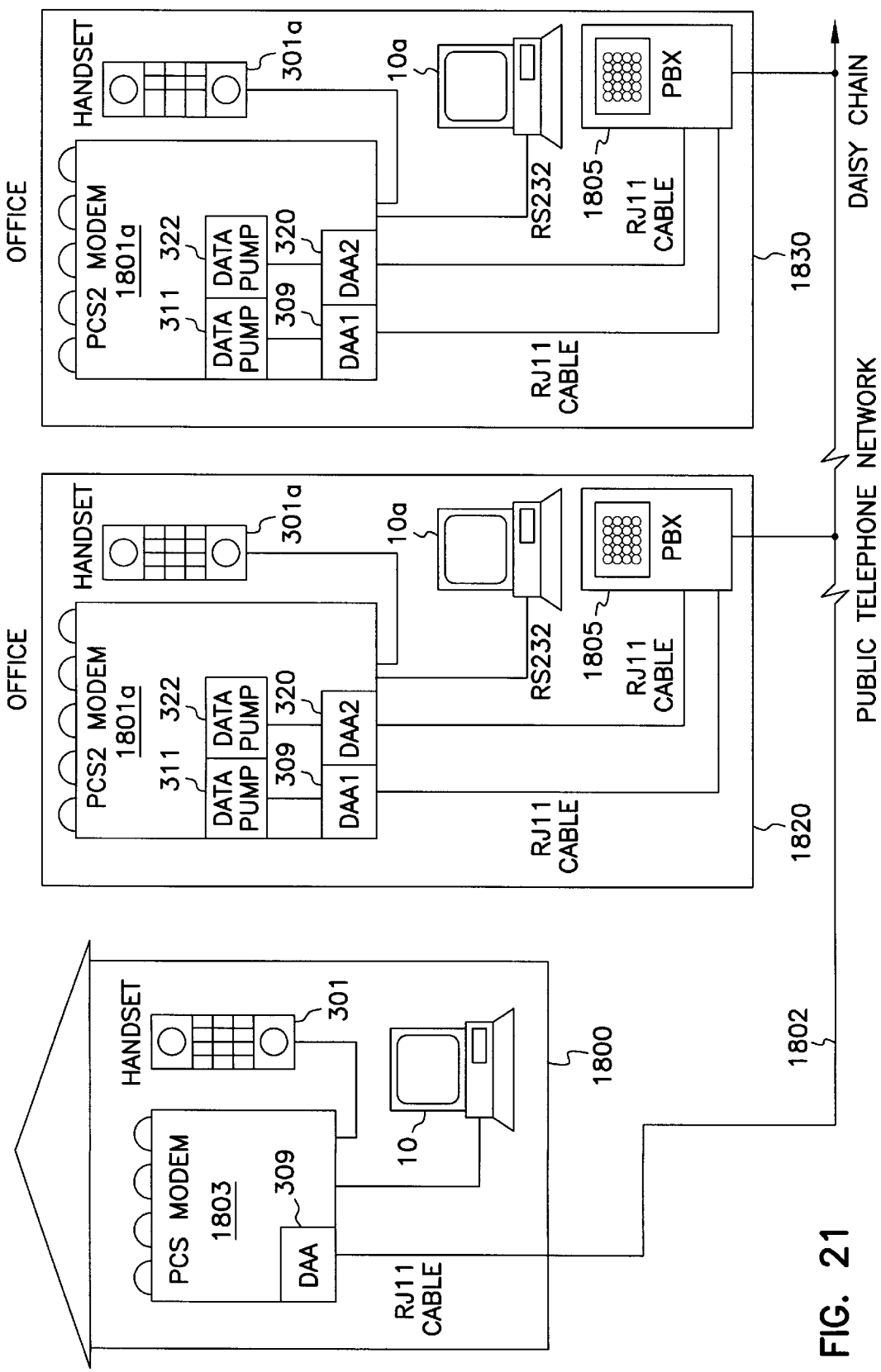
FIG. 21 is a diagram of the telecommunications environment within which the dual telephone interface and dual data pump communication devices are daisy-chained to provide data or voice conferencing.

To enable simultaneous voice and data connections between two sites, PCS2 modem 1801 is equipped as shown in either FIG. 18 or FIG. 20. In FIG. 18, telephone line interface 309 can communicate directly with telephone line interface 320 through MUX 310 under control of the single DSP Data Pump circuit 311 to pass packets containing just data or voice and data. In FIG. 20, telephone line interface 309 operates in conjunction with DSP Data Pump 311 to facilitate a voice over data connection with a PCS modem 1803. Telephone line interface 320 operates in conjunction with a second DSP Data Pump 322 to facilitate a voice over data connection or just a data connection with either another PCS modem 1803 or another PCS2 modem 1801. If the third modem is another PSC2 modem 1801, then a daisy chain system can be configured to allow a plurality of users to conference as shown in FIG. 21. The need for two data pumps 311 and 322 for two telephone line interfaces 309, 320 is driven by the speed capabilities of the data pumps 311, 322 (see FIG. 20). A single data pump as shown in FIG. 18 can service two telephone line interfaces 309, 320 if the modulation is slow enough (2400 or 4800 baud). If the speed of the components of the data pumps is fast enough, one data pump 311 is all that would be needed to service two telephone line interfaces 309, 320 (DAA1 and DAA2). The current demands of higher data speeds such as 14.4 Kbaud require the use of two data pumps 311, 322.

FIG. 21 is an example of a daisy chain connection to allow data conferencing or voice-over-data conferencing using dual DAA, dual data pump PCS2 modems 1801a. PCS2 modems 1801a correspond to the hardware configuration of FIG. 20 and are similar is design and operation to PCS2 modem 1801, which corresponds to the hardware configuration of FIG. 18. Location 1820 is configured in a similar fashion to location 1830. Other similarly configured locations may be connected to the daisy chain in FIG. 21. The result is the ability to share data or voice over data or data between PCS2 modems through telephone connections.

Voice Conference Calling

Referring once again to FIG. 19, voice only conference calling is accomplished with the assistance of PBX 1805. A voice over data connection is established between PCS modem 1803 and telephone line interface DAA1 309 of PCS2 modem 1801. A voice connection is thus established between handset 301 and handset 301a. A voice only connection is then established between telephone line interface DAA2 320 of PCS2 modem 1801 and PBX 1805. The user at site 1800 can then use handset 301 to use the conference calling features of PBX 1805 to join other parties to a conference call. Alternatively, a user at site 1820 can initiate the conference call by connecting handset 301a to handset 301 in a voice over data connection and the add other parties through PBX 1805.

Advanced Priority Statistical Multiplexing

In one embodiment of the present invention, an advanced priority statistical multiplexing scheme is incorporated to maximize data throughput on any particular communication channel while preserving quality and reliability of high priority data and maintaining the efficiency of statistical multiplexing. This advanced priority statistical multiplexing scheme is further described in U.S. patent application Ser. No. 08/333,365, entitled "ADVANCED PRIORITY STATISTICAL MULTIPLEXER", filed Nov. 2, 1994, which is hereby incorporated by reference.

A proprietary advanced priority statistical multiplexing (APSM) paradigm is implemented to allow high-priority (time sensitive) data such as voice, fax, LAN (local area network), synchronous, and video to be multiplexed with low priority data (such as asynchronous data) over a communications link. The fundamental difference between the two groups of data is the absence of the modified HDLC protocol overhead with high priority data. This absence of the modified HDLC protocol overhead is due to the time-sensitive nature of the high priority data which requires that the high priority data be transmitted and received with a minimal amount of delay. The time sensitive condition removes any type of error correction or detection scheme, any type of retransmissions or any type of acknowledgements that are associated with the modified HDLC protocol employed with high priority data.

Advanced priority statistical multiplexing uses variable-length packets and statistical multiplexing of high priority data and low priority data for transmission efficiency and quality. Advanced priority statistical multiplexing also assures predictable and minimal delay of higher priority packets by interrupting low priority data transmission when higher priority data is ready for transmission.

Overview of High Priority and Low Priority Data

In general, packetized data may be categorized as high priority or low priority. Data which is designated as high priority data is time-critical data. Time-critical data is any data which must be transferred in a given time period due to the nature of the information transferred. Some examples of time-critical (high priority) data are voice and video data. An example of low priority data is asynchronous digital data, such as a binary file. Transmission and reception of voice data must occur regularly to ensure that the voice information is not delayed or garbled, however, binary files can be transferred in bursts and accumulated at the receiver over an extended period of time. Therefore the transmission of high priority data takes precedence over low priority data in order to meet the time criticality of the high priority data. If the communication channel has bandwidth in excess of that needed to transmit the maximum number of high priority data bytes, then there is bandwidth available for the transmission of low priority data. By multiplexing the low priority data within the transmissions of high priority data, the total bandwidth of the communications link can be exploited, resulting in greater throughput and efficiency of data transferred over the communications link.

An Advanced Priority Statistical Multiplexing System

Figure 22:
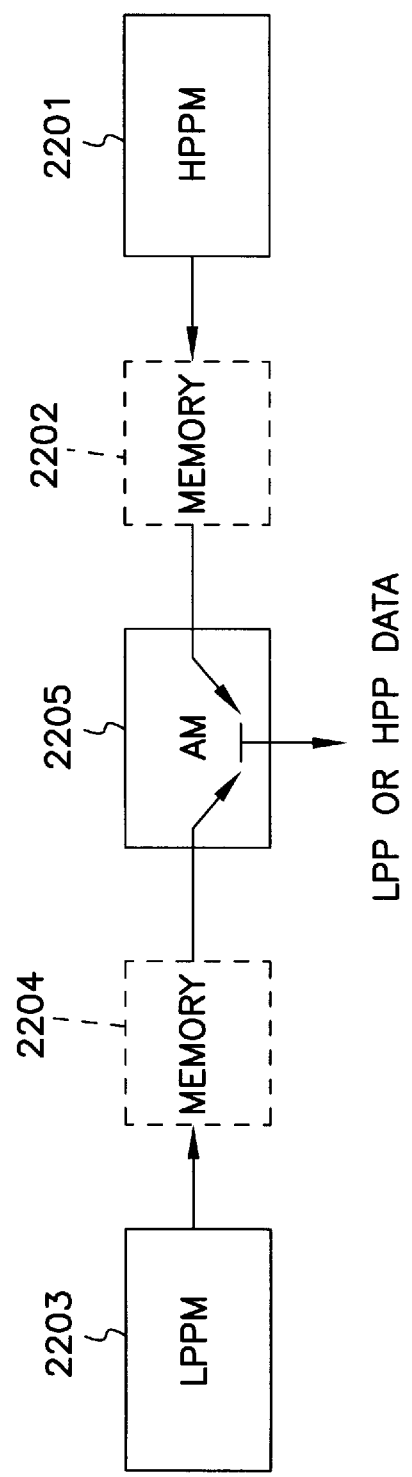
FIG. 22 is a detailed signal flow diagram of one embodiment of a two priority level multiplexer.

FIG. 22 is a block diagram of one embodiment of the present invention. High priority data is transmitted, received, packetized and unpacketized by high priority packet module (HPPM) 2201. High priority packet module 2201 can be any generator or receiver of high priority data, such as voice DSP 306, shown in FIG. 15. Low priority data is transmitted, received, packetized and unpacketized by low priority packet module (LPPM) 2203. Low priority packet module 2203 is any generator or receiver of low priority data, such as DTE interface 315, shown in FIG. 15. Those skilled in the art will readily recognize that several other generators and receivers of high priority and low priority data are possible without departing from the scope and spirit of this embodiment of the present invention, and these examples are not offered in a limiting or exhaustive sense.

Figure 15:
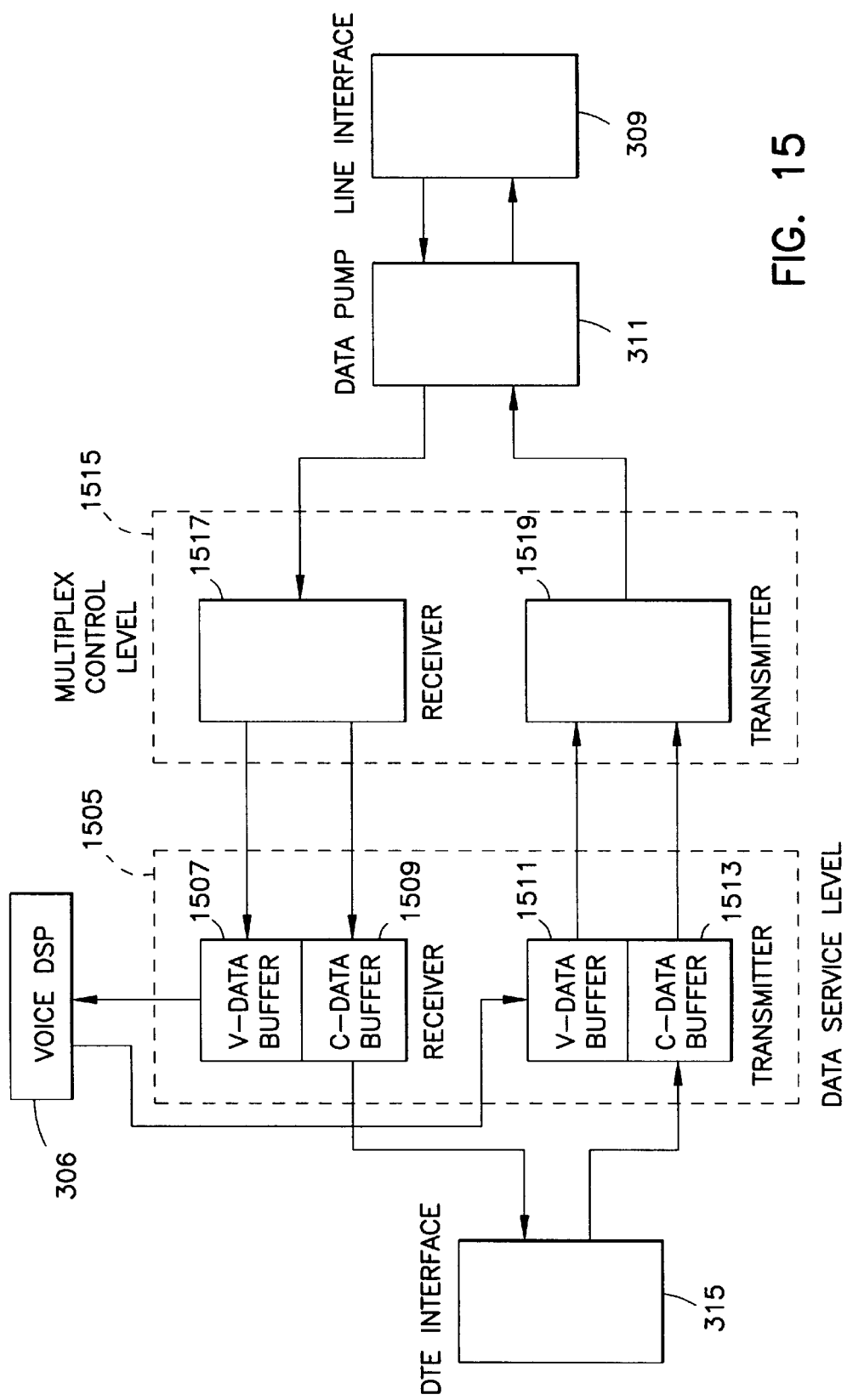
FIG. 15 is a detailed function flow diagram of the voice/data multiplexing function.

High priority packet module 2201 communicates with aggregate module (AM) 2205 via common memory 2202, and low priority packet module 2203 communicates with aggregate module 2205 via common memory 2204. Aggregate module 2205 transceives high priority packets (HPPs) and low priority packets (LPPs) from high priority packet module 2201 and low priority packet module 2204, respectively. Aggregate module 2205 contains hardware and firmware to prioritize, multiplex, and demultiplex the high priority packets and low priority packets transceived between high priority packet module 2201 and low priority packet module 2204, respectively. One example of an aggregate module 2205 is multiplex control level 1515 which includes transmitter 1519 and receiver 1517, shown in FIG. 15. One example of common memory 2202 is V-data buffer 1511, (or V-data buffer 1507, or their combination), and one example of common memory 2204 is C-data buffer 1513 (or C-data buffer 1509, or their combination), as shown in FIG. 15. V-data buffer 1511 stores voice data (V-data) and C-Data buffer 1513 stores conventional digital data (C-data).

In one embodiment of the present invention, when voice over data communications are performed, the voice packets are transmitted with the highest priority to minimize or eliminate system voice delay. Advanced priority statistical multiplexing ensures transmission quality and efficiency by multiplexing voice packets as high priority packets and digital data packets as low priority packets.

Another embodiment of the present invention includes multiple high priority packet modules 2201 which have independent high priority packet times. To ensure high priority data quality such systems must transfer data within the shortest high priority packet time to prevent data overflow. Other embodiments feature modem interconnections which result in high priority packet traffic passing through a modem (node). The advanced priority statistical multiplexing scheme must account for the worst case number of high priority generators at or passing through each node (the total volume of high priority data passing through the node) to determine the amount of bandwidth the system must allocate for the worst case high priority data throughput condition. This ensures that the high priority data is given sufficient bandwidth in the multiplex and that the intermediate modem (node) has sufficient bandwidth to handle the worst case high priority data traffic.

Those skilled in the art will readily recognize that other combinations of modules are possible without departing from the scope and spirit of this embodiment of the present invention. For example, alternate embodiments include common memories 2202 and 2204 residing in the same storage device. Another embodiment features common memories 2202 and 2204 in separate storage devices. Another example is an embodiment which saves the data stored in common memories 2202 and 2204 in a packetized format. Alternate embodiments store the data in a raw binary format. Other variations are possible as well without departing from the scope and spirit of the present invention.

High priority packets typically do not require error detection or retransmission, however low priority packet data typically must be transceived error free, so error detection and retransmission is incorporated into low priority packet transmissions. Aggregate module 2205 contains software and hardware to perform the necessary error detection and retransmission functions. It also constructs a new voice and data frame (a hybrid frame) according to a new protocol which is discussed below.

Advanced Priority Statistical Multiplexing Bandwidth Allocation Overview

In the present system, if the bandwidth of the sampled high priority data is much lower than the bandwidth of the communications link over which it is communicated, then the high priority data appears as packetized bursts over the communications link. As the bandwidth of the high priority data approaches the bandwidth of the communications link, the high priority data appears as a continuous transmission of data, with few spaces interspersed. As long as the bandwidth of the communications link exceeds the bandwidth of the high priority data there is room for multiplexed transmission of low priority data.

However, the multiplexing problem is complicated by the fact that high priority data packets may be generated in different combinations, resulting in varying burst lengths. Two approaches to multiplexing such data are: (1) reserving an interval in the time multiplex for the maximum number of high priority data bytes which potentially could be sent by the system and transmitting low priority bytes around this 'reserved space' in the time multiplex; and (2) by transmitting high priority data bytes whenever they are generated and instantaneously packing low priority data bytes around the high priority data bytes.

Method (1) is adequate if the statistical variation in high priority packet length is relatively small when compared to the average packet length, however, if large fluctuations in high priority packet length are observed, then method (1) results in a substantial loss of unused bandwidth which could be exploited for transmission of low priority data. Method (2) can utilize the entire bandwidth of the communications link, but is much more processor intensive than method (1) due to constant monitoring for gaps in high priority data.

One embodiment of the present invention multiplexes low priority packetized data by periodically interrupting the low priority packet datastream to transmit high priority packet data. The interrupt period is based on the highest possible bandwidth of high priority packet data, and low priority packet data is sent in increments based on the interrupt period when high priority packet data is not being sent. The multiplex ensures that the maximum possible high priority packet data will always be sent with only periodic interruptions of the low priority packet data. Gaps in high priority packet transmissions are filled to efficiently use the entire bandwidth of the channel to transmit low priority packet data on a lower priority basis. This embodiment of the present invention offers increased throughput over method (1) and reduced processor time over method (2).

Calculation of the Interrupt Period

The resulting data transmissions can be characterized by various indices such as high priority packet time (HPPT) which is a measure of the time high priority packet module 2201 needs to construct a high priority packet. The high priority packet time is commensurate with the sampling rate of the high priority input and is dictated by the nature of the high priority signal, level of compression of that signal, and requisite bandwidth. Each high priority packet is loaded into shared memory 2202 by high priority packet module 2201 for later transmission by aggregate module 2205. Aggregate module 2205 transceives the packets so each packet will be transferred within one high priority packet time, ensuring that the high priority data is timely transferred. If the high priority packet module 2201 is voice DSP 306, then the high priority packet time is dependent on the speech compression algorithm selected. For example, the earlier section entitled "Speech Compression Algorithm" described a 20 ms speech sample time. In this case the high priority packet time would be 20 ms, since voice packets are generated and must be processed every 20 ms. The high priority packet time multiplied by the overall baud transmission rate of the link sets the maximum bandwidth (in bytes) which may be allocated to data transmission (the maximum sum of high priority data and low priority data bytes per high priority packet time), known as $HPPT_n$. The $HPPT_n$ additionally represents the upper limit of the number of high priority data bytes which may be transmitted over the communications channel per high priority packet time. Another index is the interrupt boundary byte count (IBBC), which is the excess overhead of the communications channel assuming the maximum number of high priority packet bytes were continually transmitted. The calculation of the IBBC is described below by the following pseudocode procedures:

1. Determine the high priority packet time (HPPT), which is the time it takes an active high priority packet module 2201 to construct a high priority packet and load it in shared memory 2202 for transmission by the aggregate module 2205.
2. Determine the total number of bytes transmitted by the system in one high priority packet time, $HPPT_n$, where:

$HPPT_n$=link baud rate x HPPT.

3. Determine the number of high priority channels in the node and channels passing through.
4. Determine the maximum number of high priority bytes transmitted per channel. In the case of voice over data communications, for instance, it is conceivable that the number of high priority bytes would be multiplied by a factor of j for j voice generators being transmitted by the link (either originating at the link or passing through).
5. Calculate the sum of the maximum number of high priority bytes transmitted over all the channels, $HPPT_{sum}$.
6. Calculate the interrupt boundary byte count, which is equal to $HPPT_n - HPPT_{sum}$.

A transmission period is defined as the amount of time it takes to transfer one byte of information. For instance, if the bytes in the system are eight (8) bits long and the baud rate is 9,600 baud, then a transmission period is equal to 8/9,600 of a second or approximately 833 microseconds. The multiplexing algorithm creates and updates an interrupt counter (IC) which polls shared memory 2202 every IBBC transmission periods after the last high priority packet byte is transmitted. The IC must increment on each transmission period whether data is being transmitted or not, since the interrupt boundary byte count interrupt must occur regularly in time, even if there is no low priority packet data to transmit. This ensures that at least every IBBC transmission periods the shared memory 2202 associated with pending high priority packet data is polled, and therefore, the high priority packet data is regularly detected and transmitted.

Hybrid Frame Protocol and Multiplexing Algorithm

Figure 23:
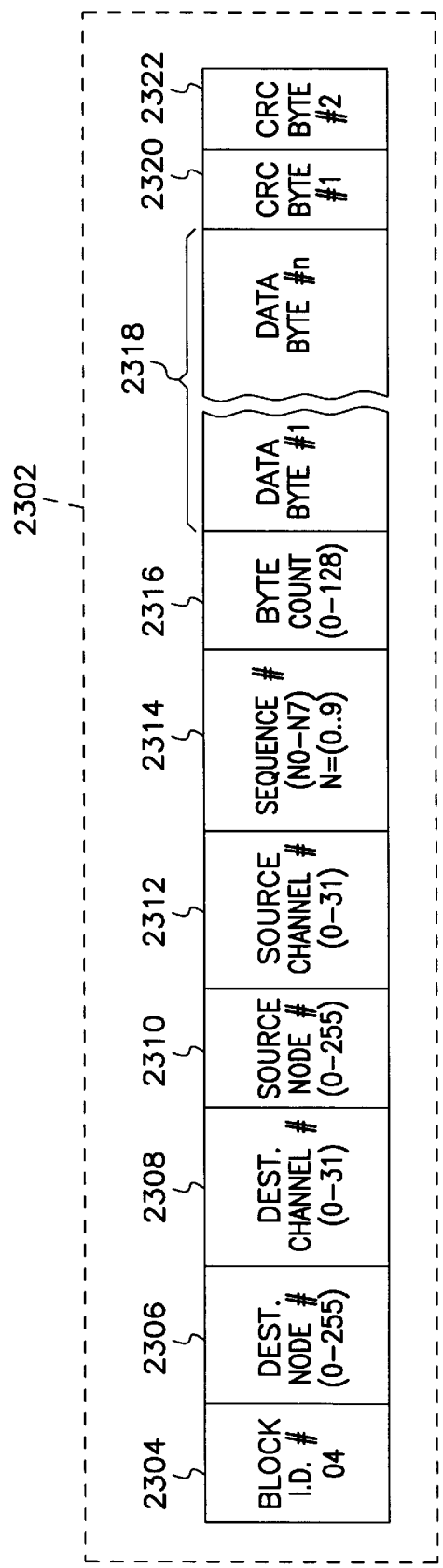
FIG. 23 shows an Asynchronous Channel Data Frame used to transmit asynchronous data.

In this embodiment of the present invention aggregate module 2205 monitors for and detects pending high priority packet and low priority packet data in order to properly multiplex the pending data. Pending high priority data is high priority data stored in common memory 2202 which awaits transmission via aggregate module 2205. Similarly, pending low priority data is low priority data stored in common memory 2204 which awaits transmission via aggregate module 2205. If aggregate module 2205 polls the shared memories 2202 and 2204 and determines that the only pending data is high priority packet data, voice or fax data, for example, then aggregate module 2205 transmits a voice frame according to the protocol given in FIG. 24. If aggregate module 2205 has only digital asynchronous data to transfer, then the packet is sent according to the asynchronous channel data frame of FIG. 23. If high priority packet data is pending during the transmission of low priority packet data, this embodiment of the present invention will interrupt the low priority packet data transmission on the IBBCth byte of low priority packet data transfer to insert the high priority packet data with an identifying header byte to denote which type of data follows. This means the interpreter at the receiving end need only scan the first byte of header information on every IBBC+1th word to determine whether the following data is high priority packet or low priority packet data. Therefore, in this embodiment of the present invention, the voice/fax frame of FIG. 24 contains only voice/fax data, however, the asynchronous channel data frame of FIG. 23 is modified to include both low priority packet and high priority packet data, yielding the "hybrid" frame of FIG. 31. The hybrid frame length, $F_n$, is limited by considerations such as buffer memory sizes and link speed.

The multiplexing algorithm must check for one potential ambiguity in construction of the hybrid frame. Since identification numbers are used in the hybrid frame to signal a switch in the datastream from high priority packet to low priority packet data, the multiplexing algorithm must check for the case of when a data byte in the IBBCth+1 position in the frame is identical to a voice/fax identification number. The receiver would misinterpret such a byte as an indicator that the datastream switched over to voice data, when in fact, the byte is merely a data byte which matched the identification number only by chance. To correct this condition, when a potential identification problem arises, the current hybrid frame is terminated and a new hybrid frame is transmitted. The misidentification is impossible in the new packet, since the header information clearly defines the following bytes as data. However, every time an identification word is present in the IBBCth byte, this procedure must be performed to prevent the receiver from misinterpreting the resulting frame. The chances of this happening are statistically low, and therefore the correction will occur infrequently. For example, in one embodiment where there are 256 possible identification codes there is a $1/256$ chance of a misinterpretation, assuming a random generation of data bytes.

The following algorithm can be used to multiplex the data:

1. Select a hybrid packet length (predetermined based on available buffer memory size and transmission considerations), $F_n$, and
2. Transmit high priority packet and low priority packet data:
   2a. if only high priority packet data is pending, transmit the high priority packet data and complete the transmission of high priority packet data before sending low priority packet data or hybridized low priority packet and high priority packet data (transmission of the high priority data is according to the frame protocol of FIG. 24; hybrid transmissions according to the frame protocol of FIG. 31);
   2b. if low priority packet data is pending,
      transmit header information for the frame,
      transmit X bytes of low priority packet data, wherein X is less than or equal to IBBC (depending on whether the packet length is greater than or equal to IBBC), and
      check for pending high priority packet data;
   2c. if there is high priority packet data, insert it into the datastream with the appropriate identification number for the high priority packet data at the X+1th byte;

2d. if there is no pending high priority packet data, then check the IBBCth+1 byte to ensure it is not equivalent to an identification byte;

2e. if this byte is equivalent, then terminate the present frame and send the remaining data via a new frame;

2f. if the byte is not equivalent, then add IBBC bytes of the low priority packet to the present frame or until the end of frame is reached ($F_n$ bytes in the frame);

2g. continue multiplexing low priority packet and high priority packet data in the frame until end of frame is reached ($F_n$ bytes in the frame); and 2h. add error correction bytes to the end of the frame (CRC1 and CRC2).

Using this algorithm, aggregate module 2205 polls for high priority data at the beginning of each transmission of a frame and in IBBC byte intervals measured from the transmission of the last high priority data byte. In one embodiment of the present invention low priority packet module 2203 transfers packetized data to common memory 2204 upon three conditions: (1) reaching a predetermined maximum low priority packet packet byte count; (2) when a flash timer signals the transfer prior to filling the packet up to the packet byte count; or (3) if a high priority header occurs on the IBBC+1th byte in the hybrid stream. Therefore, X may be less than IBBC, since the low priority packet byte count is less than IBBC bytes in cases (1) and (2).

This algorithm automatically adjusts the dynamic bandwidth of the high priority packets based on the instantaneous volume of high priority packet information transmitted. Similarly, the bandwidth associated with the low priority packets is also automatically adjusted to fill the remaining bandwidth left unused by the high priority packets. Assuming an ample amount of low priority packet information to be transferred, the bandwidth relationship is described by the equation:

No. of high priority packets transceived+No. of low priority packets transceived=$HPPT_n$ (per HPPT interval).

This method ensures that the high priority packet information is always current within every high priority packet time interval as long as the interrupt boundary byte count is greater than zero. The extent to which the interrupt boundary byte count exceeds zero is indicative of the available bandwidth for low priority packet data. Therefore, the bandwidths of both the high priority packet and low priority packet data are constantly changing to provide continuous transfer of high priority packet data, and maximum bandwidth for transfer of low priority packet data.

An alternate embodiment of the present invention combines the features of the above embodiment with an additional prioritization scheme for systems with multiple high priority packet modules. For example, if multiple high priority packet modules are transceiving information on the system, then latency for packets passing through the system is minimized by transmitting the high priority and low priority packets in the following descending order:

1. pass through high priority packets,
2. local high priority packets,
3. pass through low priority packets, and
4. local low priority packets.

Using this prioritization the latency for packets passing through is decreased.

Receiver Demultiplexing Algorithm

In one embodiment of the present invention the interrupt boundary byte count is coded into the header of the frames transmitted from one node to the next (a node may be a modem or personal communications system). Another embodiment employs interrupt boundary byte count negotiation, enabling the interrupt boundary byte count to be known by all active nodes in the system prior to the exchange of low priority and high priority packet information.

Assuming the receiving personal communications system (or node) has the interrupt boundary byte count information, the receiver can demultiplex received packets by the following algorithm:

1. frame length counter is set to $F_n$.
2. if the frame is an asynchronous channel data frame, then the process is as follows:

2a. reading X bytes of data, wherein X is the lesser of the number of bytes read before the end of packet is reached or IBBC bytes are read (the first time this operation is performed, the data must be low priority packet data to start with);

2b. checking the IBBCth+1 byte for an identification byte identifying the following data as continuing low priority packet data or high priority packet data;

2c. subtracting X from the frame length counter;

2d. if the identification byte indicates a switch between low priority packet and high priority packet data, then storing the following data in the appropriate memory buffer; and 2e. if the frame length counter is greater than zero, repeating this process.

Figure 24:
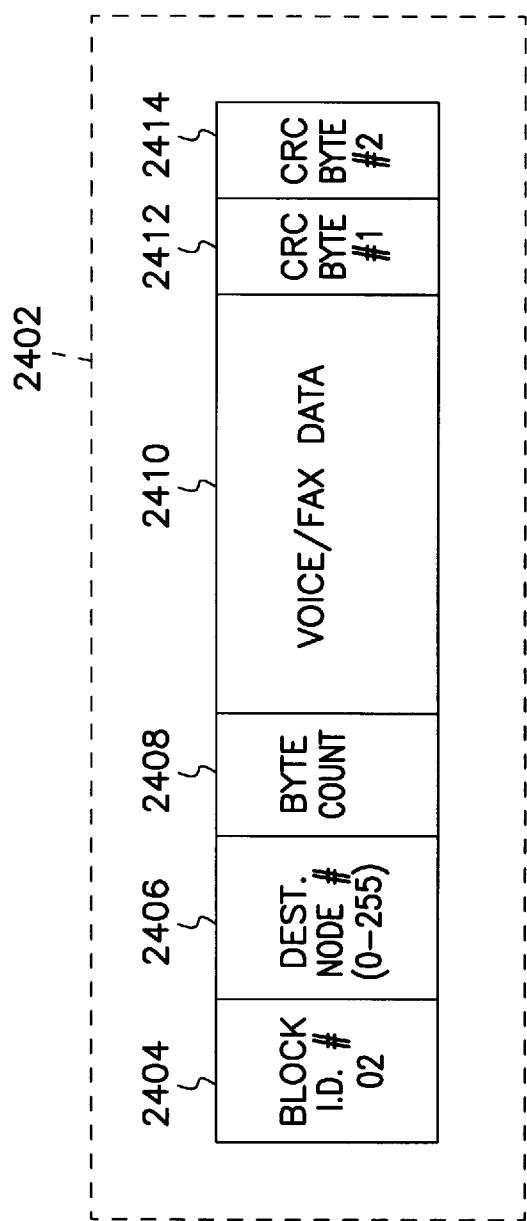
FIG. 24 shows a Voice/Fax Data Frame used to transmit voice and facsimile data, or other high priority data.

3. if the frame is a voice/fax frame, then demultiplex the voice information according to the frame shown in FIG. 24.

Demultiplexed high priority packet information may be instantly used by the receiver, since error correction and retransmission is not typically performed on high priority packet data. This allows the high priority (for instance, voice/fax information) received to be used immediately, and potentially prior to complete transmission of the hybrid frame by the transmitter.

Error Correction

In this embodiment of the present invention, transmission of purely high priority data (for example, voice/fax data) employs no error checking mechanisms. Defective high priority frames are discarded or used by the system without significant impact to transmission fidelity. Hybridized frames have error checking incorporated into both the voice and data portions of the frame, however, the receiver requests retransmission of only the corrupt data portions (low priority) of each transmission.

One skilled in the art would readily recognize that other frame protocols could be incorporated without departing from the scope and spirit of the present invention, and that other forms of information, such as video, could be characterized as low priority packet and high priority packet data for the purposes of this invention. Therefore this embodiment of the present invention is not limiting or exclusive. Other error checking and retransmission schemes are also possible without modifying the spirit and scope of the present invention.

Advanced priority statistical multiplexing not only ensures high quality and efficient transmissions, but actually reduces processor overhead in the communications link as the aggregate baud rate of the link increases. As baud rates increase, typically interrupt boundary byte counts also increase, since a larger average number of low priority bytes may be transmitted with the high priority bytes. This results in less interrupts to the multiplexing hardware in aggregate module 2205 as link speed increases, since such interrupts are based on the interrupt boundary byte count. The result is an efficient, high quality throughput of the low priority and high priority data with a statistically minimal amount of processor overhead at both the transmitting and receiving ends, with improved efficiency with increasing baud rate.

Examples of Hybrid Frame Multiplexing Using Advanced Priority Statistical Multiplexing The following examples are provided for demonstrating different embodiments of the present invention and are not exclusive or limiting. Those skilled in the art would readily recognize that the parameters and procedures demonstrated may be modified without departing from the spirit and scope of the present invention.

Figure 29:
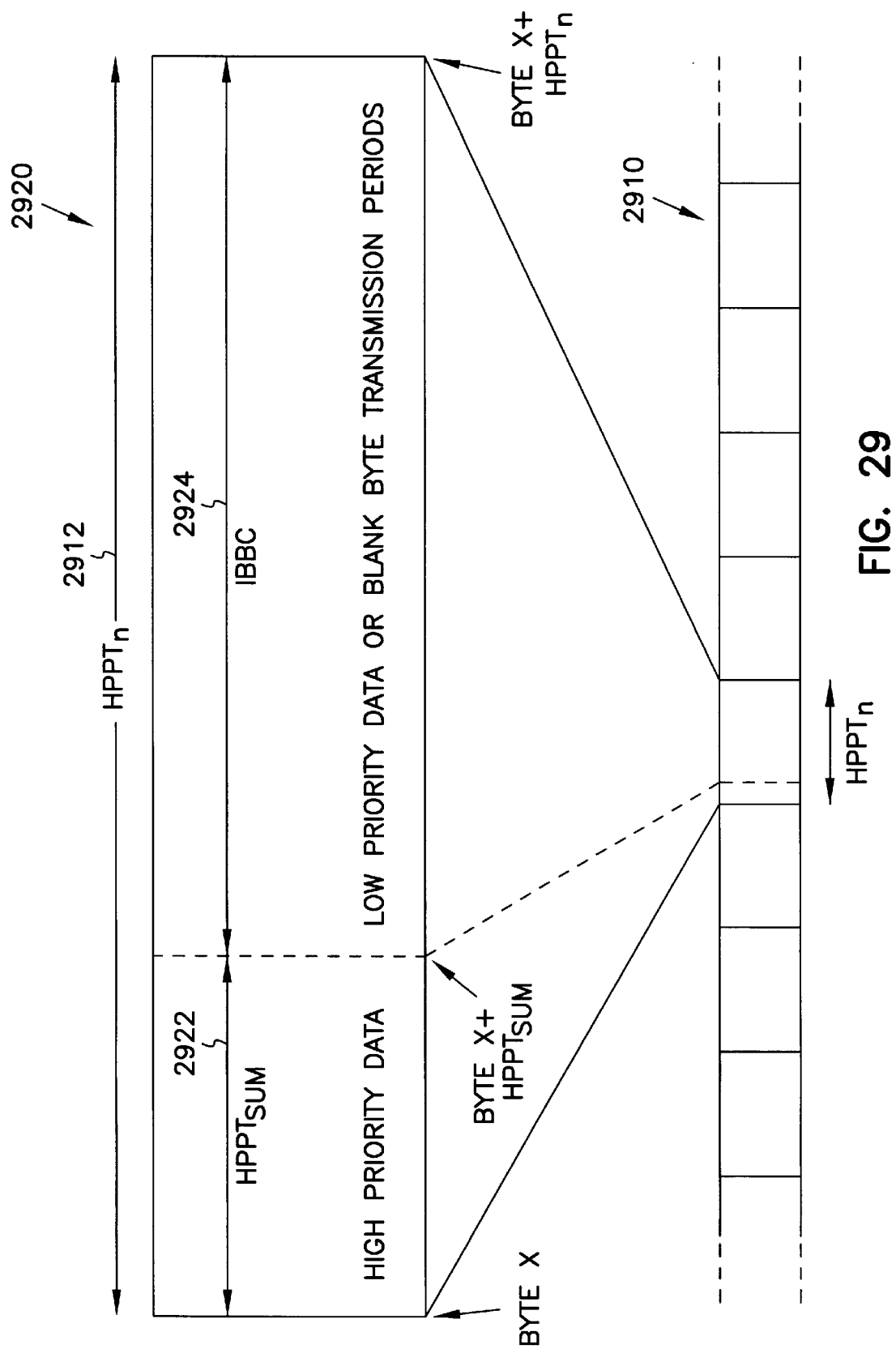
FIG. 29 is a diagram of one calculation of the interrupt boundary byte count.

FIG. 29 shows the output from one embodiment of a two priority level advanced priority statistical multiplexer. Data segment 2920 is an enlargement of one segment of duration equal to one high priority packet time taken from an output data stream 2910. The number of bytes which can be transmitted in one high priority packet time is $HPPT_n$ 2912. In order to graphically illustrate the interrupt boundary byte count, the high priority portion of the segment 2920 demonstrates the maximum number of high priority data bytes which can be transmitted in one high priority packet time, $HPPT_{sum}$ 2922. The difference between $HPPT_n$ 2912 and $HPPT_{sum}$ 2922 is the interrupt boundary byte count 2924. However, in ordinary transmissions the high priority portion of a segment may have anywhere from zero to $HPPT_{sum}$ bytes of high priority data.

Figure 25:
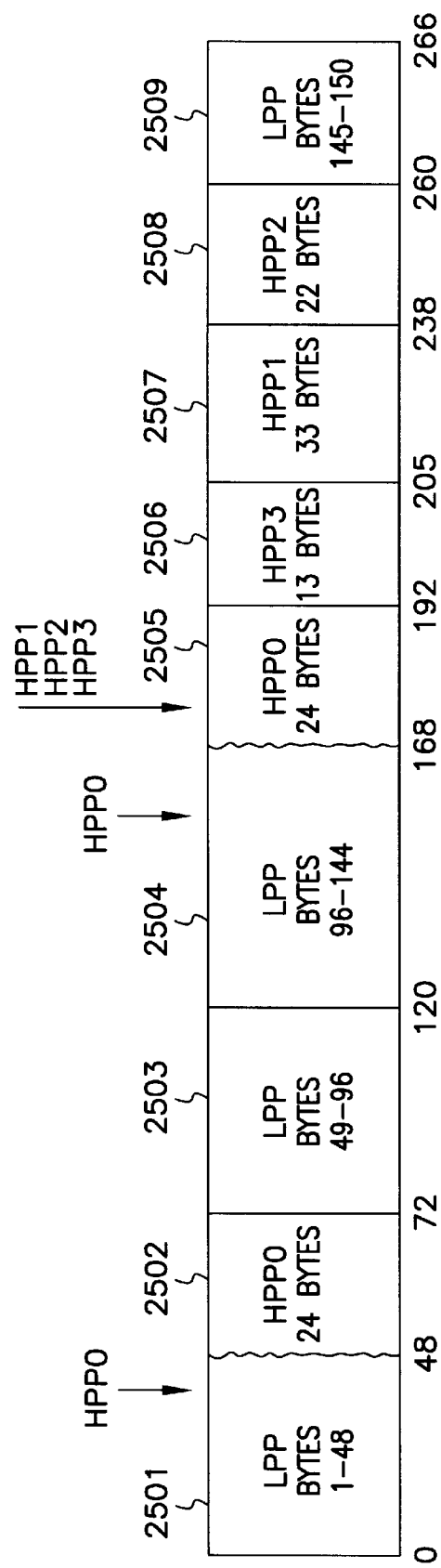
FIG. 25 is an example of multiplexing two priority levels of data in a hybrid frame.

FIG. 25 demonstrates an example of how 150 bytes of low priority data ($LPP_x$) is multiplexed with high priority packet data. The details of this example are given in Table 25, below. In this example, the high priority packet time is given as 20 msec and the baud rate is 7 bytes/msec, therefore $HPPT_n$ is 140 bytes. $HPPT_{sum}$ is given as 92 bytes, so the IBBC is 140 minus 92 or 48 bytes. As the first byte of $LPP_x$ is being transmitted 48 bytes (IBBC) of $LPP_x$ are sent in frame segment 2501. During that segment transmission HPP0 becomes available for transmission. Since the shared memory 2202 is polled every IBBC transmission periods after the last high priority packet byte is sent, HPP0 is detected and sent in the next segment, 2502, which is only 24 bytes long. Since there is still low priority packet data to send (recall $LPP_x$ is 150 bytes long) segment 2503 consists of 48 bytes (IBBC) of $LPP_x$ data, however, there is no pending high priority packet data, so another low priority packet frame segment is sent 2504 of 48 (IBBC) bytes. Since HPP0 has become available in segment 2504, it is detected and transmitted at byte 168 as 24 bytes of HPP0 in segment 2505. During the transmission of segment 2505 HPP1, 2, and 3 have become available, so a total of 68 bytes of HPP1, 2, and 3 are sent in segments 2506, 7, and 8, respectively. These packets are followed by the remaining 6 bytes of $LPP_x$ in segment 2509.

TABLE 25

Figure 26:
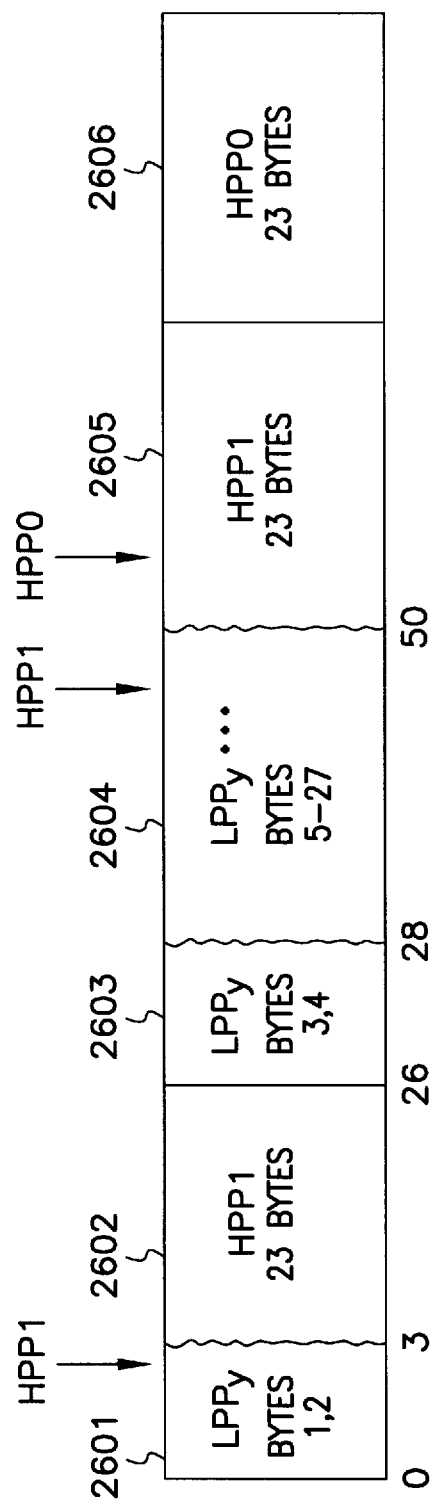
FIG. 26 is another example of multiplexing two priority levels of data in a hybrid frame.

Link Speed = 56,000 bps = 7 Kbytes/sec = 7 bytes/msec
HPPT = 20 msec
No. high priority channels in mode = 2 (HPP0, HPP1)
No. high priority channels passing through = 2 (HPP2, HPP3)
Max. no. of high priority bytes in HPPT = 92 bytes TABLE 25-continued HPP0 = 24 bytes     HPP1 = 33 bytes
HPP2 = 22 bytes     HPP3 = 13 bytes
Max. no of bytes per HPPT = 7 bytes/msec × 20 msec = 140 bytes
IBBC = 140 − 92 = 48 bytes
$LPP_x$ = 150 bytes FIG. 26 demonstrates an example of how an $LPP_y$ of 128 bytes is multiplexed with pending high priority packet data. The parameters given in this example are listed in Table 26, below. The high priority packet time is given as 20 msec, therefore, with a baud rate of 2.4 bytes/msec, the $HPPT_n$ is 48 bytes. $HPPT_{sum}$ is given as 46 bytes, so IBBC is 48 minus 46 or 2 bytes. Viewing the data transfer as the first byte of $LPP_y$ is being transmitted, 2 bytes (IBBC) of $LPP_y$ are sent in segment 2601. Then, since HPP1 has become available during the transmission of this segment, HPP1 is sent in segment 2602, which is only 23 bytes long. Next, 22 bytes of low priority packet are sent in 11 transmissions of 2 bytes in segment 2604. HPP1 has become available in the 11th transmission, so transmission of $LPP_y$ is paused to transmit 23 bytes of HPP1 in segment 2605. Meanwhile, HPP0 has become available, so the 23 bytes of HPP0 are sent in segment 2606. The remaining bytes of low priority packet will be sent in 2 byte increments interspersed between high priority packet bytes in the same fashion as demonstrated.

TABLE 26

Figure 27:
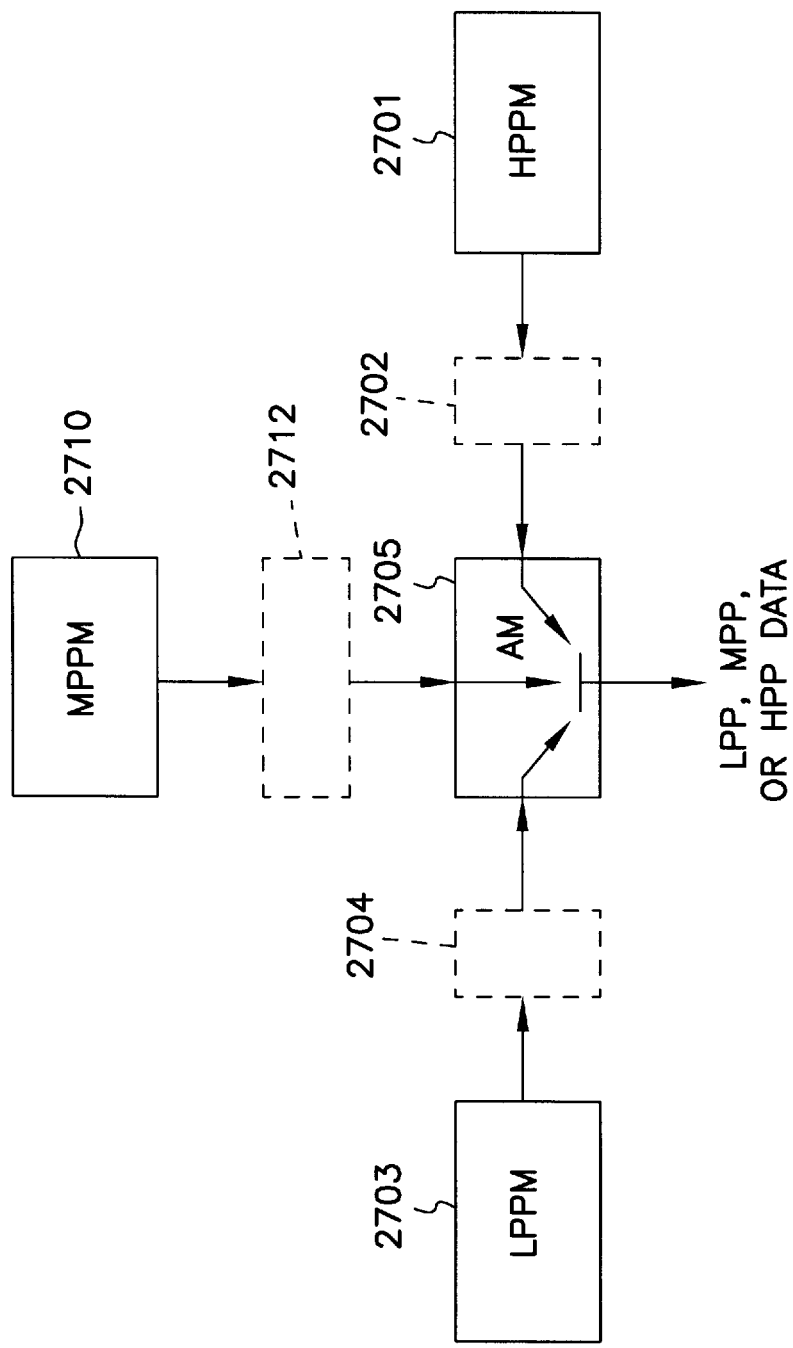
FIG. 27 is one embodiment of a three priority level multiplexer.

Link speed = 19,200 BPS = 2,400 Bytes/sec = 2.4 bytes/msec
HPPT = 20 msec
No. high priority channels in node = 2 (HPP0, HPP1)
No. high priority channels passing through = 0
Max. no. high priority bytes in HPPT = 46 bytes
HPP0 = 23 bytes     HPP1 = 23 bytes
Max. no. bytes per HPPT = 2.4 bytes/msec × 20 msec = 48 bytes
IBBC = 48 − 46 = 2 bytes
$LPP_y$ = 128 Bytes Alternate Embodiments for Transmission Of Intermediate Priority Data FIG. 27 shows the topology of an alternate embodiment of the present invention incorporating a new data priority level. FIG. 27 is similar to FIG. 22 in that it illustrates a low priority packet module 2703, common memories 2704 and 2702, and high priority packet module 2701, but shows the addition of a medium priority packet module (MPPM) 2710 which communicates with an advanced aggregate module 2705 via common memory 2712. MPPM 2710 generates medium priority data, which is data with less time-criticality than high priority data but greater time-criticality than the low priority data. An example of medium priority data is synchronous data or LAN data. The medium priority information is multiplexed with the high priority data and the low priority data by assigning primary priority to high priority data, secondary priority to the medium priority data, and third priority to the low priority data.

The addition of medium priority data to the present invention requires that the excess non-high priority bandwidth be shared between the low priority data and the medium priority data, based on system needs and the particularities of the low priority and medium priority data. In one embodiment of the present invention the medium priority data takes absolute precedence over the low priority data transferred. Therefore, after all the high priority data is transferred, all medium priority data is transferred before low priority data can be transferred. In another embodiment of the present invention low priority data and medium priority data can share the non-high priority bandwidths during transmissions, so as to not transfer all medium priority information prior to the transfer of low priority information. This may be accomplished by setting a medium priority maximum bandwidth, which must be selected to satisfy the transmission requirements of the medium priority data, yet still transfer some low priority data. For instance, the system could transfer high priority information as stated in earlier embodiments and then transfer only 100 byte increments of the medium priority data per interrupt boundary byte count, filling the remaining bandwidth with low priority data.

The aspects taught for the low and high priority data in preceding sections apply directly to intermediate level systems. Calculation of the various transmission indices is for a three level system is identical to that for a two level system, except that the interrupt boundary byte count must be shared between the medium and low priority data. The multiplexing and demultiplexing schemes are similar as well, except new identification bytes must be used to identify intermediate priority packets in the frame. In addition, further checking will be needed to ensure that those new identification bytes are not misinterpreted by the receiver by checking the IBBC+1th byte for both high priority and intermediate priority identification codes.

Other intermediate priority levels are possible and can be arbitrated in a similar fashion. For example, a four level system (two intermediate levels) or five level system (three intermediate levels) is contemplated by different embodiments of the present invention. In addition, time criticality is not the only factor by which data may be segregated, and other factors known to those skilled in the art may be substituted. For example, priority could be assigned to packets according to a priority based on their origination or destination, rather than on a time priority basis. Priority could also be assigned based on the content of the packet information (other than time-criticality).

Several priority hierarchies can be established without departing from the scope and spirit of the present invention and many such variations of priority assignment are possible. Therefore, the examples given are for illustrative purposes and are not limiting or exclusive.

Many of the examples given in this description concern the voice over data application of advanced priority statistical multiplexing, however, several other applications exist and the concepts of low, high, and intermediate priority data apply equally well to those applications as well. In specific voice over data embodiments the words "voice data" and "high priority data" were often used interchangeably, as were "asynchronous data" and "low priority data". Those skilled in the art will readily appreciate that the concepts of the present invention which were applied to high priority, intermediate priority, and low priority data are applicable to a variety of transmissions and are not limited to the specific embodiments presented. High priority data could be video as well as voice. Intermediate priority data could be synchronous data or LAN data. Other variations known to those skilled in the art are included as well.

Voice Over Data Conferencing

One embodiment of the present invention enables voice over data conferencing between two or more users via predetermined data frame protocols. Conferencing is performed by establishing voice over data connections between two or more personal communications system (PCS) users. A variety of PCS modem connection topologies may be employed to facilitate multiple user communications and the ability to simultaneously communicate voice over data with several users raises a number of packet routing and arbitration issues to ensure that time-sensitive data is given priority over other data. The incorporation of advanced priority statistical multiplexing for the voice over data channel ensures timely transmission of time-sensitive data (high priority packet data) while simultaneously increasing the throughput of the channel.

A detailed discussion of a two-node topology will be provided to demonstrate the operation of one embodiment of the present invention, and a detailed discussion of a multiple link topology will follow.

Voice Over Data Conferencing in a Two-Node Topology

In the following paragraphs, one embodiment of the present invention will be discussed. Those skilled in the art will readily recognize that this embodiment is not exclusive nor limiting and that the various parameters and procedures described therein may be changed without departing from the scope and spirit of the present invention.

Figure 28:
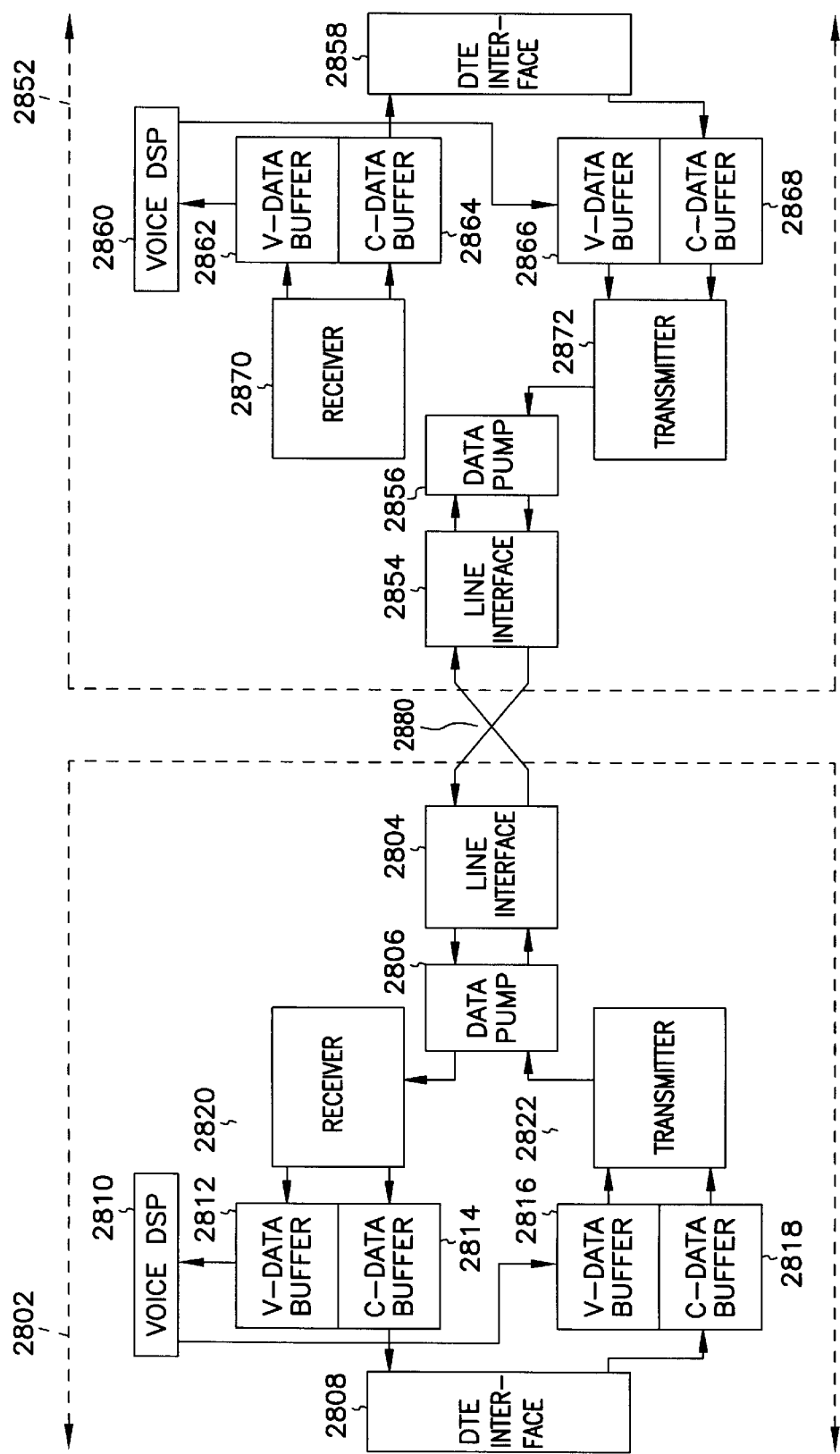
FIG. 28 is a detailed signal flow diagram of one embodiment of a pair of personal communications system data interfaces featuring a two priority level multiplexing configuration.

FIG. 28 shows an interface between two PCS modems incorporating one link. Modem 2802 is identical to modem 2852 and the structure of each modem follows the structure shown in FIG. 15. Therefore, voice DSP 306 may be equated to voice DSPs 2810 and 2860; V-data buffers 1507 and 1511 to V-data buffers 2812 and 2816, and V-data buffers 2862 and 2866; C-data buffers 1509 and 1513 to C-data buffers 2814 and 2818 and C-data buffers 2864 and 2868; and DTE interface 315 to DTE interfaces 2808 and 2858. To demonstrate data storage and transfer between modems in this topology, the operation of modem 2802 will be discussed, however, it should be noted that modem 2852 operates in the identical fashion. Transfer of asynchronous digital data will be discussed, then the transfer of digitized voice data will be discussed, followed by the transfer of voice over data under this embodiment of the present invention.

Asynchronous Digital Data Transfer

Digital data is transceived over DTE interface 2808 using C-data buffers 2814 (transmission to DTE port 2808) and 2818 (receiving from DTE port 2808). C-data is conventional digital data, however, the buffer may contain any low priority or intermediate priority data. Data in C-data buffers 2814 and 2818 is stored in the asynchronous channel data frame 2302 shown in FIG. 23. The header of data frame 2302 identifies the type of frame using block identification number (04h) 2304. The frame 2302 also includes the destination node 2306, channel number 2308, source node number 2310, channel number 2312, sequence number 2314, and byte count 2316. Data frame 2302 may contain an unlimited number of bytes 2318, however, the size of the frame is determined by considerations of link speed and buffer dimensions. Data frame 2302 terminates with error correction bytes 2320 and 2322.

Asynchronous digital data received from DTE interface 2808 is stored in C-data buffer 2818 where it is transmitted to line interface 2804 via transmitter 2822 and data pump 2806. Data transmitted by line interface 2804 is in the format of data frame 2302 as it crosses link 2880. The data is received by line interface 2854 and ultimately stored in C-data buffer 2864 via data pump 2856 and receiver 2870. Data transfer from modem 2852 to modem 2802 proceeds in the identical fashion using the analogous data transmission components of modem 2852 (DTE interface 2858, C-data buffer 2868, transmitter 2872, data pump 2856, and line interface 2854) and data reception components of modem 2802 (line interface 2804, data pump 2806, receiver 2820, C-data buffer 2814 and DTE interface 2802).

Packetized data stored in C-data buffer 2814 is transmitted to DTE interface 2808 for reception by a connected DTE device (not shown). Similarly, packetized data stored in C-data buffer 2864 is transmitted to DTE interface 2858 for reception by a connected DTE device (not shown).

Digitized Voice Data Transfer

Digitized voice data transfer occurs after voice information is sampled and is packetized into voice packets (VPs) by voice DSP 2810 and stored in V-data buffer 2816 as described above in the "Detailed Description of the Speech Compression Algorithm" section (DSP 2810 is analogous to DSP 306 and buffer 2816 is analogous to buffer 1511 of FIG. 15). V-data is voice packet data, however, V-data buffer 2816 can store any high priority data. The voice packets stored in V-data buffer 2816 are formatted in the voice/fax data frame format 2402 shown in FIG. 24. Voice/fax data frame 2402 contains a block identifier (02h) 2404, destination node number 2406, byte count 2408, voice/fax data segment 2410, and CRC bytes 2412 and 2414.

Digitized voice samples are transmitted from modem 2802 to modem 2852 by processing the sampled voice information from DSP 2810 and storing the voice samples in V-data buffer 2816. The voice samples are later transmitted to line interface 2804 via transmitter 2822 and data pump 2806. Modem 2852 receives the voice samples over link 2880 via line interface 2854, data pump 2856, and receiver 2870. The samples are stored in V-data buffer 2862 and are ultimately processed by DSP 2860 before being sent to the telephony equipment connected to modem 2852 (not shown). Transfer of voice samples from modem 2852 to 2802 is performed in the same way by the analogous voice transmission components of modem 2852 (V-data buffer 2866, transmitter 2872, data pump 2856, and line interface 2854) and receive components of modem 2802 (line interface 2804, data pump 2806, receiver 2820, and V-data buffer 2812).

Voice Over Data Transfer Using Advanced Priority Statistical Multiplexing

The transmission of both voice and digital data information from modem 2802 to modem 2852 requires prioritization of voice (high priority packet) and digital (low priority packet) data to ensure that time-critical packets maintain precedence over packets with less time-criticality. Voice data packets are time-sensitive but asynchronous digital data packets are typically not time-sensitive and may be sent and received without the need to be instantaneously processed. Voice packets also do not require error detection, but digitized data packets typically require error detection and retransmission. A further consideration is that the amount of voice data will fluctuate, leaving gaps between voice samples which could be filled with data transfer to maximize channel throughput.

This embodiment of the present invention includes the above-described advanced priority statistical multiplexing method (APSM) which allows the transfer of both high priority packet (voice) and low priority packet (digital data) data, satisfying the time constraints of the high priority packet data while simultaneously filling the bandwidth of the transmission channel with as much high priority packet and low priority packet data as possible.

Figure 31:
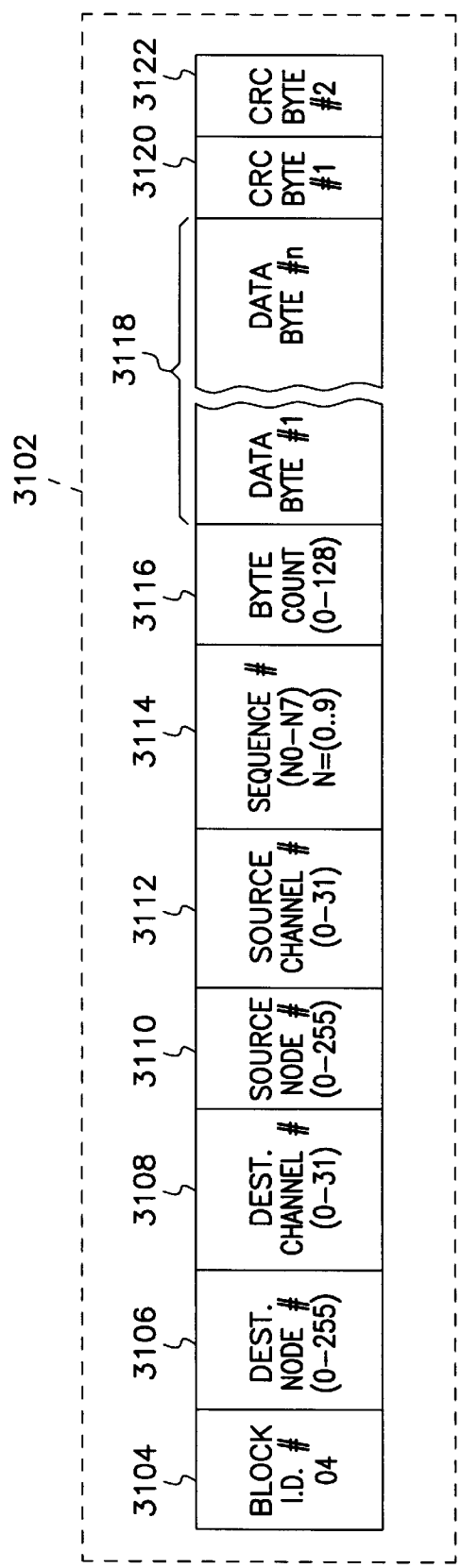
FIG. 31 shows a Hybrid Data Frame used to transmit high priority data, low priority data, and intermediate priority level data.

Transmitter 2822 multiplexes data resident in V-data buffer 2816 and C-data buffer 2818 and transmits the data in a hybrid frame 3102, shown in FIG. 31, when both voice data and digital data are pending. Pending voice data is data in V-data buffer 2816 awaiting transmission by transmitter 2822. V-data is transmitted from V-data buffer 2816 to V-data buffer 2862 of modem 2852 using transmitter 2822, data pump 2806, and line interface 2804 of modem 2802 to line interface 2854, data pump 2856 and receiver 2870 of modem 2852. Use of a hybrid frame 3102 decreases the amount of transmission overhead dedicated to error correction and header information bytes by combining the voice and asynchronous data packets into a single frame. Transmitter 2822 transmits a voice data frame 2402 per FIG. 23 when only voice data is pending. V-data buffer 2816 is analogous to V-data buffer 2866 for transmissions from modem 2852 to modem 2802. The voice packets received from modem 2852 are stored in V-data buffer 2812.

The following discussion explains how the voice and data packets are multiplexed into the hybrid frame 3102.

Voice Data Multiplex

The following discussion demonstrates how modem 2802 sends voice over data information to modem 2852. The method is identical for voice over data transmissions from modem 2852 to modem 2802.

Transmitter 2822 monitors the information in both V-data buffer 2816 and C-data buffer 2818. When transmitter 2822 detects only voice data awaiting transfer (i.e., C-data buffer 2818 is empty) the system transfers the pending voice data using the voice transmission protocol described above in the section entitled "Transmit Mode" (voice data frame 2402, FIG. 24). When transmitter 2822 detects digital data to be transferred it must then prioritize the data in order to ensure that the voice data and digital data are multiplexed so that the voice data receives priority over the digital data, as described in the "HYBRID FRAME PROTOCOL AND MULTIPLEXING ALGORITHM" section above.

Voice data is periodically generated by the voice DSP 2810. The period is set by the compression algorithm and is called the high priority packet time (HPPT), described in the "CALCULATION OF THE INTERRUPT PERIOD" section above, which is the time it takes the DSP 2810 to construct and load a voice packet into V-data buffer 2816. The interrupt boundary byte count (IBBC) is calculated in the same manner as described above once the high priority packet time is determined. FIG. 29 illustrates the calculation of the interrupt boundary byte count. The IBBC 2924 is calculated by subtracting the maximum number of high priority bytes transmitted in one high priority packet time (HPPT$_{sum}$ 2922) from the maximum possible number of bytes transmitted per high priority packet time (HPPT$_n$ 2912).

Figure 30:
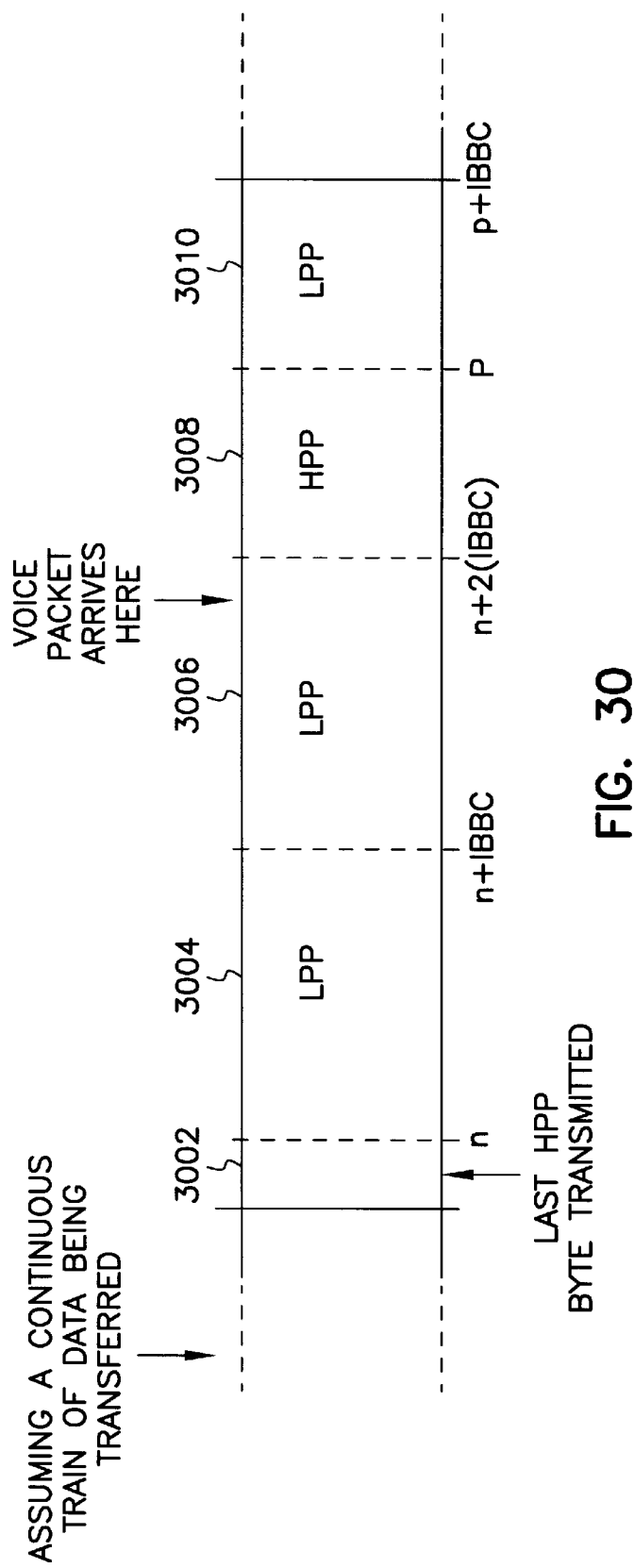
FIG. 30 is a detailed block diagram demonstrating one method of multiplexing low priority data and high priority data according to one embodiment of the present invention.

FIG. 30 illustrates the transmission of digital and voice data using this method. Digital data is transmitted in IBBC byte intervals 3004 and 3006 following the last transmission of voice packet data 3002. If no voice data has arrived at V-data buffer 2816 by the IBBCth byte of digital data transfer, then transmitter 2822 transmits an additional IBBC bytes before checking V-data buffer 2816. This is illustrated in FIG. 30 as the transmission of digital data packet 3006 following 3004, since no voice packets arrived during the transmission of 3004. However, when voice data arrives in V-data buffer 2816, as shown occurring in transfer of digital data packet 3006, the transmitter 2822 will suspend the transmission of IBBC data on the IBBC byte boundary and begin transmission of the voice packet data. This is shown as voice packet 3008 in FIG. 30. After the last byte of voice data is sent, the digital data may be sent for up to IBBC bytes before allowing another interruption for voice packet data, as shown by packet 3010.

The process of multiplexing the voice and data packets may continue for as long as the frame permits. Frame boundaries may be selected by considering the sizes of buffers 2816 and 2818 (and, of course, the sizes of the counterpart receive buffers 2862 and 2864).

In this embodiment of the present invention, the hybrid voice/data frame 3102 is illustrated in FIG. 31. It is essentially the same digital data frame 2302 as shown in FIG. 23. Transmitter 2822 provides the header bytes 3104–3116 and the CRC error checking bytes 3120 and 3122. Other frame protocols are possible, as long as they contain compatible identification and error checking bytes, and this particular example is not limiting nor exclusive, since others skilled in the art will readily recognize that other frame structures may be used without departing from the scope and spirit of the present invention.

Voice Data Demultiplex

Voice over data frames are transmitted by modem 2802 to modem 2852 by transmitter 2822 via data pump 2806 and line interface 2804 over link 2880. The frames are received by receiver 2870 after passing through line interface 2854 and data pump 2856. Receiver 2870 is capable of demultiplexing the frame and performing the error checking on the contents of the frame to determine if a retransmit is necessary.

If the frame is corrupt, the voice data may be used by the voice DSP 2860 or discarded without serious impairment of voice quality provided that the frame contains only small segments of voice information. Typically, the limitations on frame size are driven by buffer sizes as mentioned above, so there is no problem in either using or discarding corrupt voice data.

If the frame is corrupt, the digital data portions of the frame must be retransmitted. In the subsequent retransmission, new voice data may be multiplexed with the retransmitted digital data.

The present invention allows for instantaneous processing of the received voice portions of the frame transmissions by the voice DSP 2860 in concert with V-data buffer 2862. This allows the voice hardware to process the voice portions of a frame without having to delay until transmission of the frame has been completed.

Digital data may be stored in C-data buffer 2864 until it is retrieved by a DTE device (not shown) connected to DTE interface 2858 in FIG. 28. If the received digital data is corrupt, it must be discarded and the new data must be rechecked for errors before allowing storage in C-data buffer 2864.

Voice Over Data in Multiple Link Topologies

Advanced priority statistical multiplexing may be incorporated in multiple link topologies for voice over data communications to increase network efficiency since the volume of high priority data (for example, voice and fax data) transmitted by a given node may be multiplied based on the number of active nodes passing packets through the given node. As the number of nodes passing through increases, $HPPT_{sum}$ increases and IBBC decreases. The increase in active nodes communicating through a given node requires a flexible priority statistical multiplexing routine, since the variation in high priority data volume may be great, depending on the number of parties conferencing and the particular topology established by the conferencing.

Discussion of Daisy Chain, Star, and Hybrid Networks

The daisy chained topology represented by FIG. 21 illustrates one embodiment of the present invention. Voice over data conferencing may be established using any combination of modems connected to the daisy chain network using the advanced priority statistical multiplexing technology to ensure efficient, high quality voice over data communications.

Figure 32:
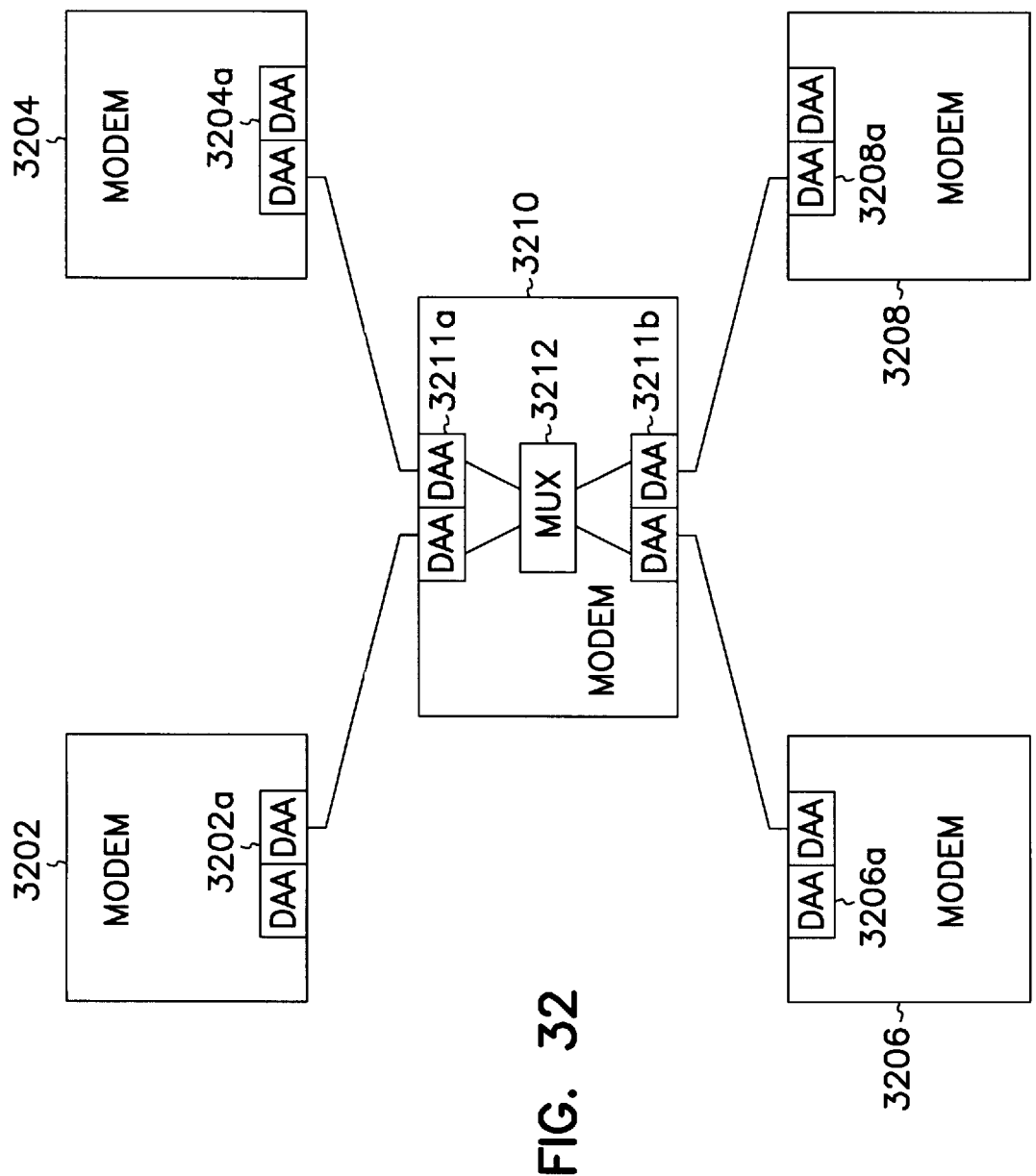
FIG. 32 depicts one embodiment of the present invention where a star-connected network of personal communications systems is used for low priority, high priority, and intermediate priority data conferencing.

Another embodiment of the present invention is the star-connected personal communications topology shown in FIG. 32. This embodiment shows four PCS modems, 3202, 3204, 3206, and 3208 with dual Data Access Arrangements 3202a, 3204a, 3206a, and 3208a, respectively, interconnected with a special PCS modem 3210. The special modem 3210 has four DAAs, in two dual DAA sections 3211a and 3211b, interconnected with a four port bidirectional multiplexer 3212. This design allows the interconnection of any of the four modems on the star network and interconnection of other networks using telephone or other communication lines as well.

Figure 33:
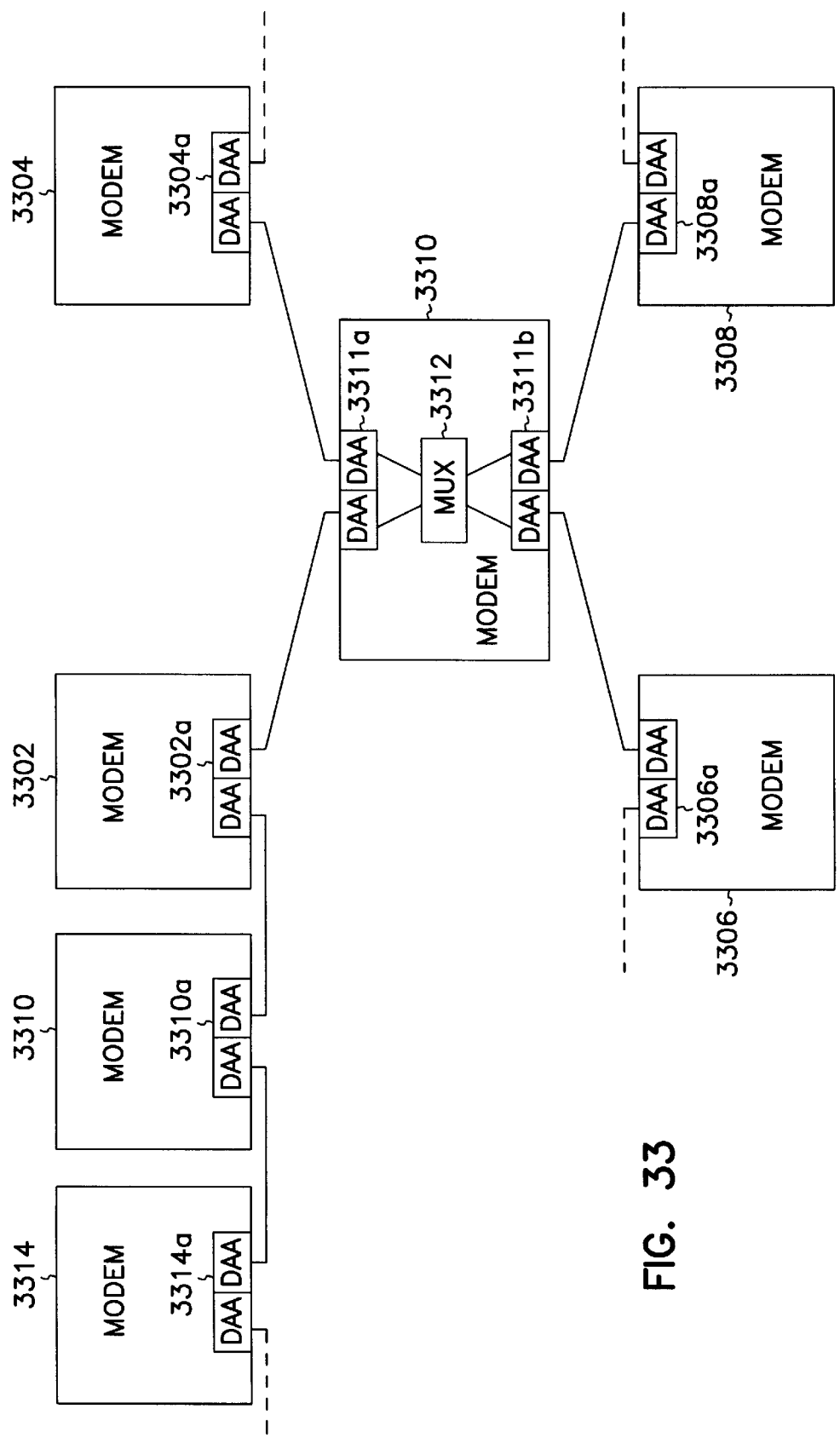
FIG. 33 depicts one embodiment of the present invention where a hybrid network of personal communications systems is used for low priority, high priority, and intermediate priority data conferencing.

Yet another embodiment of the present invention is a hybrid combination of the daisy chained and star topologies as shown in FIG. 33. This embodiment shows four PCS modems 3302, 3304, 3306, and 3308 connected in a star configuration with special PCS modem 3310 which contains dual DAAs 3311a and 3311b interconnected with a four port bidirectional multiplexer 3312. The star configuration is connected to a daisy chain of PCS modems 3310 and 3314. Each PCS modem has its own dual Data Access Arrangement device (3302a, 3304a, 3306a, 3308a, 3310a, and 3314a).

In the daisy chained network, a packet originating from one end of the chain must pass through all of the intermediate nodes prior to reaching a destination at the other end of the chain. The result is a series of packet transfer latencies due to the passage through the intermediate nodes. The intermediate nodes also experience more high priority traffic than the exterior nodes on a daisy chained topology. In the daisy chain topology, high priority packet transfer latencies can be reduced by ensuring that packets which are passing through the node are given priority over those originating from the node. Yet another embodiment of the present invention assigns priority based on the relative distance the packets have to travel to accommodate those packets with a relatively long travel time before passing packets requiring a shorter travel time. This assignment averages the relative travel times of all of the packets traveling in the network.

Broadcast and Selective Conferencee Addressing

Another embodiment of the present invention uses a "broadcast" type packet to connect to all of the active modems on the network. For example, modem 1803 of FIG. 21 transmits a "broadcast" ringdown/ringback supervisory packet structure, as given in Table 24 of the above section entitled "RING-BACK FOR VOICE-OVER DATA CALLING", to alert the other modems on the network to respond to the call (for instance, modems 1801a, as shown in FIG. 21).

Another embodiment employs conferencee addressing ("conferencee" includes a user of a personal communication system who is part of a conference or may be added to a conference), a selective means for contacting only certain other modems on the network for a voice over data conference with select modems. By inserting a destination code in the header bytes of the voice frame 2402 and the hybrid frame 3102, the transmitting node controls which receiving nodes will have access to the voice over data communications. A further modification of this embodiment controls access to the voice or data portion of the communications and limits the interactions to receive only, transmit only, or some other combination of receive and transmit privileges depending on the various modes of communication available (for instance, voice, fax, video, LAN, data, etc.) and a set of programmed privileges. For example, one conferences can be authorized to receive the voice portion of a transmission, but not transmit voice data; however, at the same time be able to transmit digital data, but not receive it. Those skilled in the art will readily recognize that other permutations of privileges and modes of communication are possible without departing from the spirit and scope of the present invention.

Packet Priority Arbitration For Multiple Transmitters

An embodiment of the present invention which enables conferencing introduces risk of overlapping transmissions of high priority data. For example, if two or more conferencees are speaking at the same time, the high priority voice information may be garbled unless measures are taken to ensure that one speaker has priority or the multiple speakers' voices are properly mixed. Of course, since low priority data is not time-sensitive, it may be concurrently transferred from multiple transmitting nodes without prioritization.

Origination Address Prioritization

One embodiment of the present invention incorporates a transmission origination prioritization scheme. In this embodiment, the origination information accompanying each high priority packet is used to assign priority to each of the multiple transmitters during concurrent transmissions. An algorithm, as explained below, is used to detect concurrent transmissions and then allow only one of the high priority transmissions to have priority. Since the high priority information is time-sensitive, the prioritization algorithm must select only one transmitter to be received; the remaining high priority data may be discarded.

Figure 34:
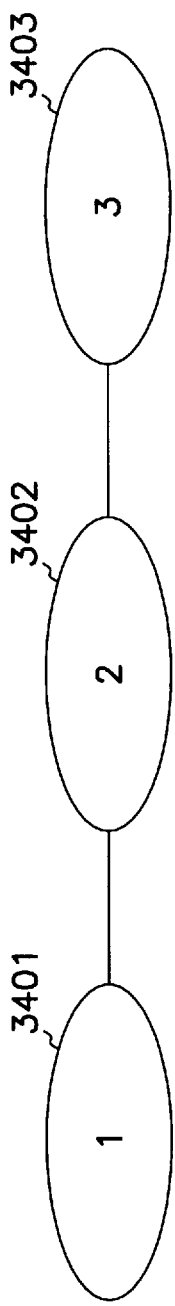
FIG. 34 shows a conferencing example where multiple concurrent transmissions are prioritized by the receiver.

FIG. 34 shows three PCS modems 3401, 3402, and 3403 connected in a daisy chained configuration (however, this discussion applies independent of network topology). Assuming nodes 3401 and 3402 are transmitting voice concurrently, node 3403 will detect the overlapping transmission of the quantized voice data and will not be able to understand either of the speakers, except for brief bursts, as their speech is interrupted.

One embodiment of the present invention solves this problem by detecting the concurrent speech, and then allowing the packets of only one speaker to be received based on origin of the packet. The selection of the speaker can be based on any parameter present or added to the voice frame 2302 or hybrid frame 3102. For example, in one embodiment a hierarchy based on the node number assigned to a speaker selects the preferred speaker. In this case, speaker 3401 would have precedence over speaker 3402, so node 3403 could discard any packets arriving from speaker 3402. Yet another embodiment employs a priority code embedded in the voice frame 2302 or hybrid frame 3102 to select the preferred speaker. The priority code specifies which speaker has priority and must be decoded before selecting a preferred speaker.

One embodiment of the present invention uses a method for detecting concurrent speech which is a program designed to detect a series of alternating voice packets received by a node. For example, if voice packets from nodes 3401 and 3402 were alternating for over 5 high priority packet times (HPPTs), the algorithm could filter out all the speakers but the preferred speaker (based on the above-described selection methods).

Those skilled in the art will readily recognize that other methods known to those practicing in the art could be substituted for the methods provided herein, which are for illustrative purposes and are not offered in an exclusive or limiting sense.

Voice Mixing

Another embodiment of the present invention incorporates an analog mixer to mix voice information after depacketization, rather than selecting a preferred speaker. This embodiment provides for superimposed voice transmissions from each of the transmitting nodes. Yet another embodiment provides a means for digitally mixing the voice signals, rather than selecting a preferred speaker.

CONCLUSION

The present inventions are to be limited only in accordance with the scope of the appended claims, since others skilled in the art may devise other embodiments still within the limits of the claims.

What is claimed is:

1. A method for conferencing, comprising the steps of:
  transmitting low priority data and high priority data from a first modem to one or more second modems in a hybrid frame by the steps including:
  if there is high priority data to be transferred, inserting the high priority data into the hybrid frame;
  if there is low priority data to be transferred, adding up to K bytes of the low priority data to the hybrid frame, K not to exceed an interrupt boundary byte count, wherein the interrupt boundary byte count is equal to a total number of bytes transferable in a high priority packet time minus a maximum number of high priority bytes generated in the high priority packet time, and wherein the high priority packet time is an interval of time between a generation of a plurality of high priority bytes; and
  repeating the steps of inserting and adding to construct the hybrid frame.

2. The method of claim 1, further comprising the step of terminating the hybrid frame upon adding a set number of low priority bytes.

3. The method of claim 1, further comprising the steps of terminating the hybrid frame up on detection that a first byte of the K bytes of low priority data matches a high priority data identifier.

4. The method of claim 1, further comprising the step of transmitting a broadcast packet to establish communication with all active modems.

5. The method of claim 1, further comprising the step of transmitting a destination-coded packet to establish communication with selected other modems.

6. A personal communication system for use with a telephone network and a personal computer to perform voice over data conferencing, comprising:

data interface means connected for transferring data to and from the personal computer;

telephone line interface means for connection to a plurality of telephone lines including a first telephone line and a second telephone line;

telephone handset means for receiving local voice signals from a local user and for conveying remote voice signals from a remote user to the local user;

full-duplex conversion means connected to the telephone handset means for converting the local voice signals into outgoing digital voice data and for converting incoming digital voice data into the remote voice signals;

voice compression means connected to the full-duplex conversion means for compressing the outgoing digital voice data into compressed outgoing digital voice data and for decompressing compressed incoming digital voice data into the incoming digital voice data;

main control means connected for receiving the compressed outgoing digital voice data from the voice compression means, receiving outgoing conventional digital data from the personal computer through the data interface means, multiplexing and transmitting compressed outgoing digital voice data with the outgoing conventional digital data using advanced priority statistical multiplexing, and passing the remote voice signals to the second telephone line.

7. The personal communication system of claim 6, wherein the telephone line interface means comprises a plurality of dual data access arrangements and the main control means further comprises a multiple port bidirectional multiplexer connected to the plurality of dual data access arrangements for programmable interconnection of a plurality of devices to the personal communication system.

8. The personal communication system of claim 6, wherein the telephone line interface means comprises two dual data access arrangements.

9. The personal communication system of claim 8, wherein the interconnection of the plurality of devices is in a star configuration.

10. The personal communication system of claim 8, wherein the interconnection of the plurality of devices is in a daisy chained configuration.

11. The personal communication system of claim 8, wherein the interconnection of the plurality of devices is in a hybrid configuration.

12. A method for conferencing, comprising the steps of:

(1) detecting a hybrid frame by one or more modems, the hybrid frame containing high priority data and low priority data, including the steps:

(2) receiving a byte in the hybrid frame;

(3) if the byte is a high priority data identifier, receiving one or more high priority data bytes following the byte in the hybrid frame;

(4) if the byte in the hybrid frame is not a high priority data identifier, receiving one or more bytes of low priority data, the number of low priority bytes not to exceed the interrupt boundary byte count, wherein the interrupt boundary byte count is equal to a total number of bytes transferable in a high priority packet time minus a maximum number of high priority bytes generated in the high priority packet time, and wherein the high priority packet time is an interval of time between a generation of a plurality of high priority bytes; and (5) returning to step (2) until a last data byte of the hybrid frame is received.

13. The method of claim 12, further comprising the step of terminating receipt of the hybrid frame upon receipt of a set number of low priority data bytes.

14. The method of claim 12, further comprising the step of processing high priority data upon receipt and storing low priority data for later processing.

15. The method of claim 12, wherein the interrupt boundary byte count is calculated by the steps including:

determining a maximum number of bytes transferred across a link in one high priority packet time, B, by multiplying the high priority packet time by a bit rate of the link divided by a number of bits per byte;

determining a maximum number of high priority data bytes transmitted over the link in one high priority packet time, M; and subtracting M from B to obtain the interrupt boundary byte count.

16. The method of claim 12, further comprising the step of error checking the low priority data received using an error correction code in the hybrid frame.

17. The method of claim 12, further comprising the step of detecting a broadcast packet to establish communication with all active modems.

18. The method of claim 12, further comprising the step of detecting a destination-coded packet to establish communication with selected other modems.

* * * * *

UNITED STATES PATENT AND TRADEMARK OFFICE
CERTIFICATE OF CORRECTION

PATENT NO.: 5,812,534
DATED: Sept. 22, 1998
INVENTOR(S): Davis et al.

It is certified that errors appear in the above-identified patent and that said patent is hereby corrected as shown below:

In column 5, line 2, delete "Microsof$^®$ " and insert -- Microsoft$^®$ --, therefor.

In column 12, line 15, delete "unction" and insert -- function --, therefor.

In column 62, line 55, delete "steps" and insert -- step --, therefor.

In column 62, line 55, delete "up on" and insert -- upon --, therefor.

Signed and Sealed this

Twenty-fourth Day of October, 2000

*Attest:*

Q. TODD DICKINSON

*Attesting Officer*　　　*Director of Patents and Trademarks*